United States Patent
Nakajima et al.

(10) Patent No.: US 9,807,363 B2
(45) Date of Patent: *Oct. 31, 2017

(54) TRANSMITTING APPARATUS, STEREO IMAGE DATA TRANSMITTING METHOD, RECEIVING APPARATUS, AND STEREO IMAGE DATA RECEIVING METHOD

(71) Applicant: Sony Corporation, Tokyo (JP)

(72) Inventors: Yasuhisa Nakajima, Kanagawa (JP); Kazuyoshi Suzuki, Tokyo (JP); Akihiko Tao, Kanagawa (JP); Shigehiro Kawai, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,439

(22) Filed: Apr. 19, 2017

(65) Prior Publication Data

US 2017/0223336 A1 Aug. 3, 2017

Related U.S. Application Data

(63) Continuation of application No. 15/217,028, filed on Jul. 22, 2016, which is a continuation of application (Continued)

(30) Foreign Application Priority Data

Jul. 16, 2008 (JP) ................ P2008-184520

(51) Int. Cl.
*H04N 13/00* (2006.01)
(52) U.S. Cl.
CPC ..... *H04N 13/0059* (2013.01); *H04N 13/0062* (2013.01)

(58) Field of Classification Search
CPC ........... H04N 13/0239; H04N 13/0059; H04N 13/0062
See application file for complete search history.

(56) References Cited

U.S. PATENT DOCUMENTS

| 7,277,121 B2 | 10/2007 | Mashitani et al. |
| 8,553,029 B2 | 10/2013 | Kim et al. |

(Continued)

FOREIGN PATENT DOCUMENTS

| CN | 1756317 A | 4/2006 |
| CN | 1942902 A | 4/2007 |

(Continued)

OTHER PUBLICATIONS

High-Definition Multimedia Interface Specification Version 1.3a, Nov. 10, 2006.

(Continued)

*Primary Examiner* — Nam Pham
(74) *Attorney, Agent, or Firm* — Lerner, David, Littenberg, Krumholz & Mentlik, LLP

(57) ABSTRACT

Transmission of stereo image data may be performed between devices, where a source device receives E-EDID from a sink device via DDC of an HDMI cable. This E-EDID contains information on 3D image data transmission modes supportable by the sink device. Based on information on 3D image data transmission modes from the sink device, the source device selects a predetermined transmission mode from among the 3D image data transmission modes supportable by the sink device. The source device transmits 3D image data in the selected transmission mode to the sink device. The source device transmits information on the transmission mode for the 3D image data, to the sink device by using an AVI InfoFrame packet or the like. The sink device processes the 3D image data received from the (Continued)

source device in accordance with its transmission mode, thereby obtaining left and right eye image data.

1 Claim, 43 Drawing Sheets

Related U.S. Application Data

No. 14/882,828, filed on Oct. 14, 2015, now Pat. No. 9,451,235, which is a continuation of application No. 12/733,580, filed as application No. PCT/JP2009/062788 on Jul. 15, 2009, now Pat. No. 9,185,385.

(56) References Cited

U.S. PATENT DOCUMENTS

| | | | |
|---|---|---|---|
| 2006/0062490 A1 | 3/2006 | Ha et al. | |
| 2006/0256239 A1 | 11/2006 | Higashi | |
| 2007/0055876 A1* | 3/2007 | Choi | G06F 13/4081 713/170 |
| 2007/0242062 A1 | 10/2007 | Guo et al. | |
| 2007/0252746 A1 | 11/2007 | Hoffert et al. | |
| 2007/0296859 A1 | 12/2007 | Suzuki | |
| 2008/0225373 A1* | 9/2008 | Hamagishi | H04N 13/0454 359/240 |
| 2008/0309666 A1 | 12/2008 | Chen et al. | |
| 2009/0013095 A1 | 1/2009 | Butcher | |
| 2009/0142041 A1 | 6/2009 | Nagasawa et al. | |
| 2009/0185029 A1 | 7/2009 | Mitsuhashi et al. | |

FOREIGN PATENT DOCUMENTS

| | | |
|---|---|---|
| CN | 101076130 A | 11/2007 |
| JP | 2001061164 A | 3/2001 |
| JP | 2003-111101 A | 4/2003 |
| JP | 2004048293 A | 2/2004 |
| JP | 2005-006114 A | 1/2005 |
| JP | 2005-051547 A | 2/2005 |
| JP | 2005-318490 A | 4/2005 |
| JP | 2005510187 A | 4/2005 |
| JP | 2006033851 A | 2/2006 |
| JP | 2007-336518 A | 12/2007 |
| JP | 2008-042645 A | 2/2008 |
| JP | 2008-145679 A | 6/2008 |
| JP | 2008131282 A | 6/2008 |
| JP | 2008-544679 T | 12/2008 |
| KR | 20060006706 A | 1/2006 |
| WO | 2006/137000 A1 | 12/2006 |
| WO | 2008056719 A1 | 5/2008 |

OTHER PUBLICATIONS

HDMI Licensing LLC, High-Definition Multimedia Interface Specificatino Version 1.3a, Nov. 10, 2006.
Office Action from Japanese Application No. 2008-184520, dated Dec. 4, 2012.
"Digital Video Interface DVI", Apr. 2, 1999 (Apr. 2, 1999), pp. 1-76, XP 055007672, Retrieved from the Internet: URL:http://www.ddwg.org/lib/dvi_10.pdf [retrieved on Sep. 21, 2011].
HDMI : "High-Definition Multimedia Interface. Specification Version 1.4". Internet Citation, Jun. 5, 2009 (Jun. 5, 2009), p. 425 pp, XP 009133650, Retrieved from the Internet: URL:http://wenku.baidu.com?view/e7db77d184254b35eefd34d0.html].
Supplementary European Search Report EP 09797937, dated Nov. 23, 2012.
Office Action from Japanese Application No. 2008-184520, dated Mar. 5, 2013.
Office Action from Korean Application No. 10-2009-7026595, dated Oct. 22, 2013.
Office Action from Japanese Application No. 2014-122193, dated Jul. 15, 2014.
Office Action from Japanese Application No. 2014-003056, dated Jun. 24, 2014.
Chinese Office Action for Application No. 2012-10352343.5 dated Jul. 29, 2014.
Chinese Office Action for CN Application No. 201210352343.5, dated Sep. 7, 2015.
Japanese Office Action for Application No. 2015-152304 dated Jun. 21, 2016.
Extended European Search Report for Application No. EP16207378 dated Mar. 30, 2017.

* cited by examiner

FIG. 8

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect/Ether− |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device)/Ether+ |
| 16 | SDA |
| 18 | +5V Power |

FIG. 10
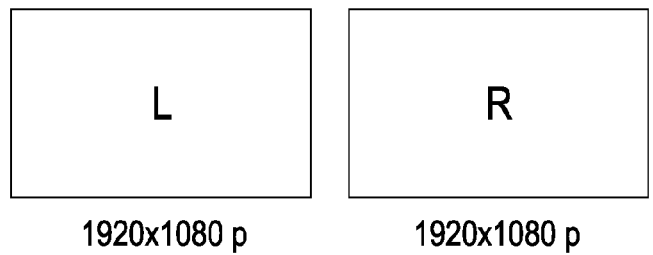
FIG. 11
(a) MODE (1)
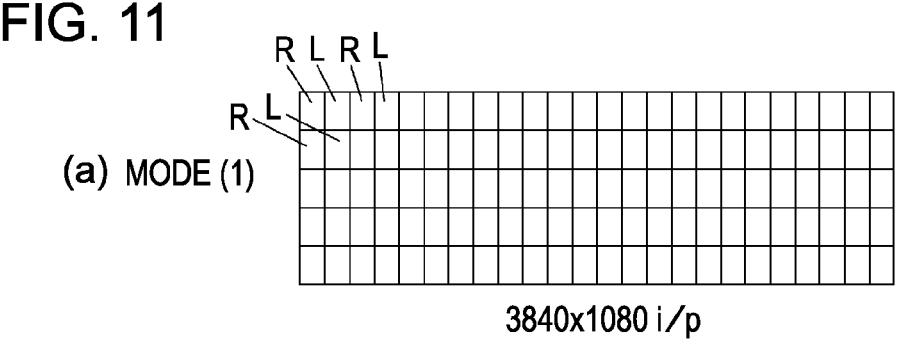
(b) MODE (2)
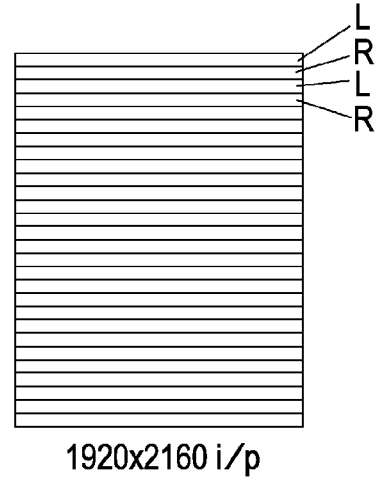
(c) MODE (3)
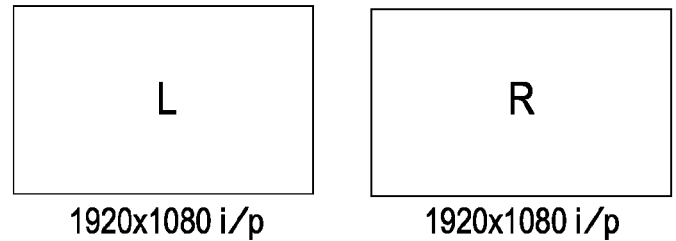

FIG. 12
(a) MODE (4)
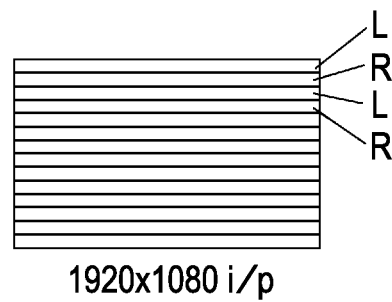
1920x1080 i/p
(b) MODE (5)
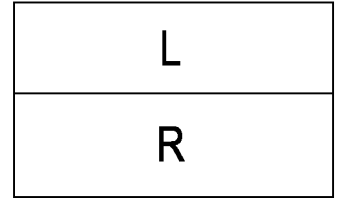
1920x1080 i/p
(c) MODE (6)
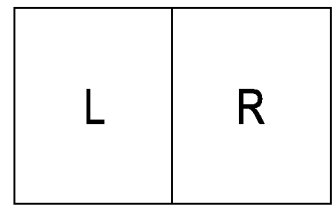
1920x1080 i/p (a)                    (b)

FIG. 32

| Byte# | 7 | 6 | 5 | 4 | 3 | 2 | 1 | 0 |
|---|---|---|---|---|---|---|---|---|
| 0 | Vendor-specific tag code (=3) | | | | | Length (=N) | | |
| 1…3 | 24 bit IEEE Registration Identifier (0x000C03) LSB first | | | | | | | |
| 4 | | A | | | | B | | |
| 5 | | C | | | | D | | |
| 6 | Supports-AI | DC_48 bit | DC_36 bit | DC_30 bit | DC_Y444 | | Reserved (0) | |
| 7 | Max_TMDS_Clock | | | | | | | |
| 8 | RGB Pixel ALT | RGB Simul | RGB Field Seq. | RGB Line Seq. | RGB Top & Bottom | RGB Side by Side | RGB MPEG-C | Reserved (0) |
| 9 | YCC444 Pixel ALT | YCC444 Simul | YCC444 Field Seq. | YCC444 Line Seq. | YCC444 Top & Bottom | YCC444 Side by Side | YCC444 MPEG-C | Reserved (0) |
| 10 | YCC422 Pixel ALT | YCC422 Simul | YCC422 Field Seq. | YCC422 Line Seq. | YCC422 Top & Bottom | YCC422 Side by Side | YCC422 MPEG-C | Reserved (0) |
| 11 | Method A | Method B | Method C | | Reserved (0) | | | |
| 12….N | Reserved (0) | | | | | | | |

FIG. 33

| Byte# | 7 | 6 | 5 | 4 | 3 | 2 | 1 | 0 |
|---|---|---|---|---|---|---|---|---|
| 0 | Packet Type = 0x82 | | | | | | | |
| 1 | Version = 0x03 | | | | | | | |
| 2 | 0 | | | Length = 0x0E | | | | |
| 3 | Check Sum | | | | | | | |
| 4 | Rsvd (0) | Y1 | Y0 | A0 | B1 | B0 | S1 | S0 |
| 5 | C1 | C0 | M1 | M0 | R3 | R2 | R1 | R0 |
| 6 | ITC | EC2 | EC1 | EC0 | Q1 | Q0 | SC1 | SC0 |
| 7 | Rsvd (0) | VIC6 | VIC5 | VIC4 | VIC3 | VIC2 | VIC1 | VIC0 |
| 8 | Reserved (0) | | | | PR3 | PR2 | PR1 | PR0 |
| 9, 10 | Line Number of End of Top Bar | | | | | | | |
| 11, 12 | Line Number of Start of Bottom Bar | | | | | | | |
| 13, 14 | Pixel Number of End of Left Bar | | | | | | | |
| 15, 16 | Pixel Number of Start of Right Bar | | | | | | | |
| 17 | Pixel ALT | Field Simul | Field Seq. | Line Seq. | Top & Bottom | Side by Side | MPEG-C | 0 |
| 18...30 | NA Reserved (0) | | | | | | | |

FIG. 34

| VIC# | Video Format | Pixel Clock | TMDS Clock |
|---|---|---|---|
| 1 | 640x480 p  60 Hz | 74.75 MHz | 74.75 MHz |
| 2 | 720x480 p  59.94 Hz | | |
| 3 | 720x480 p  60 Hz | | |
| 4 | 1280x720 p  59.94/60 Hz | 148.5 MHz | 148.5 MHz |
| 5 | 1920x1080 i  59.94/60 Hz | | |
| ... | ... | ... | ... |
| 59 | 720(1440)x480 i  240 Hz | 148.5 MHz | 148.5 MHz |
| 60 | 1920x2160 p  59.94/60 Hz | 297 MHz | 297 MHz |
| 61 | 1920x2160 p  50 Hz | | |
| 62 | 3840x1080 p  59.94/60 Hz | | |
| 63 | 3840x1080 p  50Hz | | |

FIG. 35

| Byte# | 7 | 6 | 5 | 4 | 3 | 2 | 1 | 0 |
|---|---|---|---|---|---|---|---|---|
| 0 | Packet Type = 0x03 ||||||||
| 1 | 0x00 ||||||||
| 2 | 0x00 ||||||||
| 3 | 0 | 0 | 0 | CLEAR_AV MUTE | 0 | 0 | 0 | SET_AV MUTE |
| 4 | PP3 | PP2 | PP1 | PP0 | CD3 | CD2 | CD1 | CD0 |
| 5 | | | | 0 | | | | Default Phase |
| 6 | 0 ||||||||
| 7 | 0 ||||||||
| 8 | 0 ||||||||
| 9 | 0 ||||||||

CD3 - CD0 FIELD
0x4: 24 bit
0x5: 30 bit
0x6: 36 bit
0x7: 48 bit

FIG. 36

| Byte# | 7 | 6 | 5 | 4 | 3 | 2 | 1 | 0 |
|---|---|---|---|---|---|---|---|---|
| 0 | Packet Type = 0x84 ||||||||
| 1 | Version = 0x02 ||||||||
| 2 | 0 ||||||||
| 3 | Length = 0x0A ||||||||
|   | Checksum ||||||||
| 4 | CT3 | CT2 | CT1 | CT0 | Reserved | CC2 | CC1 | CC0 |
| 5 | Reserved (0) |||| SF1 | SF0 | SS1 | SS0 |
|   | Format depends on coding type ||||||||
| 6 | CA7 | CA6 | CA5 | CA4 | CA3 | CA2 | CA1 | CA0 |
| 7 | DM_INH | LSV3 | LSV2 | LSV1 | LSV0 | Reserved (0) |||
| 8 | Method A | Method B | Method C | Reserved (0) |||||
| 9 | Reserved (0) ||||||||
| 10 | Reserved (0) ||||||||
| 11 | Reserved (0) ||||||||
| 12 | Reserved (0) ||||||||
| 13 | NA Reserved (0) ||||||||
| 14...30 |  ||||||||

TRANSMITTING APPARATUS, STEREO IMAGE DATA TRANSMITTING METHOD, RECEIVING APPARATUS, AND STEREO IMAGE DATA RECEIVING METHOD

CROSS-REFERENCE TO RELATED APPLICATIONS

The present application is a continuation of U.S. application Ser. No. 15/217,028 filed Jul. 22, 2016, which is a continuation of U.S. application Ser. No. 14/882,828 filed Oct. 14, 2015 issued as U.S. Pat. No. 9,451,235, which is a continuation of U.S. application Ser. No. 12/733,580 filed Mar. 8, 2010 issued as U.S. Pat. No. 9,185,385, which is a National Stage Filing of PCT/JP2009/062788 filed Jul. 15, 2009, which claims the benefit of Japan Application No. P2008-184520 filed Jul. 16, 2008, the disclosures of which are incorporated herein by reference.

TECHNICAL FIELD

This invention relates to a transmitting apparatus, a stereo image data transmitting method, a receiving apparatus, and a stereo image data receiving method. More specifically, this invention relates to a transmitting apparatus or the like with which, at the time of transmitting stereo image data to an external device, information on transmission modes for stereo image data that can be supported by the external device is received from this external device to decide the transmission mode for the stereo image data to be transmitted, and also transmission mode information on the stereo image data to be transmitted is transmitted to the external device, thereby making it possible to perform transmission of stereo image data between devices in a favorable manner.

BACKGROUND ART

In recent years, for example, HDMI (High Definition Multimedia Interface) is coming into widespread use as a communications interface for transmitting digital video signals, that is, uncompressed (baseband) video signals (image data), and digital audio signals (audio data) accompanying the video signals, at high speed from DVD (Digital Versatile Disc) recorders, set-top boxes, or other AV sources (Audio Visual sources) to television receivers, projectors, or other displays. For example, Non-Patent Document 1 describes details about the HDMI standard.

FIG. 42 shows an example of the configuration of an AV (Audio Visual) system 10. The AV system 10 has a disc player 11 as a source device, and a television receiver 12 as a sink device. The disc player 11 and the television receiver 12 are connected to each other via an HDMI cable 13. The disc player 11 is provided with an HDMI terminal 11a to which an HDMI transmitting section (HDMI TX) 11b is connected. The television receiver 12 is provided with an HDMI terminal 12a to which an HDMI receiving section (HDMI RX) 12b is connected. One end of the HDMI cable 13 is connected to the HDMI terminal 11a of the disc player 11, and the other end of the HDMI cable 13 is connected to the HDMI terminal 12a of the television receiver 12.

In the AV system 10 shown in FIG. 42, uncompressed image data obtained by being played back on the disc player 11 is transmitted to the television receiver 12 via the HDMI cable 13, and an image based on the image data transmitted from the disc player 11 is displayed on the television receiver 12. Also, uncompressed audio data obtained by being played back on the disc player 11 is transmitted to the television receiver 12 via the HDMI cable 13, and audio based on the audio data transmitted from the disc player 11 is outputted on the television receiver 12.

FIG. 43 shows an example of the configuration of the HDMI transmitting section (HDMI source) 11b of the disc player 11, and the HDMI receiving section (HDMI sink) 12b of the television receiver 12 in the AV system 10 in FIG. 42.

The HDMI transmitting section 11b unidirectionally transmits differential signals corresponding to uncompressed pixel data of one screen's worth of image to the HDMI receiving section 12b on a plurality of channels during an effective image period (hereafter, also referred to as Active Video period as appropriate), which is a period from one vertical sync signal to the next vertical sync signal minus a horizontal blanking period and a vertical blanking period, and also unidirectionally transmits differential signals corresponding to at least audio data and control data accompanying the image, other auxiliary data, or the like to the HDMI receiving section 12b on a plurality of channels during the horizontal blanking period or the vertical blanking period.

That is, the HDMI transmitting section 11b has an HDMI transmitter 81. The transmitter 81 converts uncompressed pixel data of an image into corresponding differential signals, and unidirectionally transmits the differential signals serially to the HDMI receiving section 12b connected via the HDMI cable 13, on a plurality of channels that are three TMDS (Transition Minimized Differential Signaling) channels #0, #1, and #2.

Also, the transmitter 81 converts uncompressed audio data accompanying an image, and further, necessary control data, other auxiliary data, or the like into corresponding differential signals, and unidirectionally transmits the differential signals serially to the HDMI receiving section 12b connected via the HDMI cable 13, on the three TMDS channels #0, #1, and #2.

Further, the transmitter 81 transmits a pixel clock synchronized with pixel data transmitted on the three TMDS channels #0, #1, and #2, to the HDMI receiving section 12b connected via the HDMI cable 13, on a TMDS clock channel. Here, on a single TMDS channel #i (i=0, 1, 2), 10-bit pixel data is transmitted during one clock cycle of the pixel clock.

During an Active Video period, the HDMI receiving section 12b receives differential signals corresponding to pixel data which are unidirectionally transmitted from the HDMI transmitting section 11b on a plurality of channels, and during a horizontal blanking period or a vertical blanking period, receives differential signals corresponding to audio data and control data which are unidirectionally transmitted from the HDMI transmitting section 11b on a plurality of channels.

That is, the HDMI receiving section 12b has an HDMI receiver 82. The receiver 82 receives differential signals corresponding to pixel data and differential signals corresponding to audio data and control data, which are unidirectionally transmitted from the HDMI transmitting section 11b connected via the HDMI cable 13, on the TMDS channels #0, #1, and #2 in synchronization with a pixel clock that is similarly transmitted from the HDMI transmitting section 11b on the TMDS clock channel.

In addition to the three TMDS channels #0 through #2 serving as transmission channels for serially transmitting pixel data and audio data unidirectionally from the HDMI transmitting section 11b to the HDMI receiving section 12b in synchronization with a pixel clock, and the TMDS clock channel serving as a transmission channel for transmitting the pixel clock, transmission channels of an HDMI system formed by the HDMI source transmitting section 11b and the HDMI receiving section 12b include transmission channels called a DDC (Display Data Channel) 83 and a CEC (Consumer Electronics Control) line 84.

The DDC 83 is formed by two unillustrated signal lines included in the HDMI cable 13, and is used for the HDMI transmitting section 11b to read E-EDID (Enhanced Extended Display Identification Data) from the HDMI receiving section 12b that is connected via the HDMI cable 13.

That is, in addition to the HDMI receiver 81, the HDMI receiving section 12b has an EDID ROM (Read Only Memory) 85 that stores E-EDID, which is performance information related to the performance (Configuration/capability) of the HDMI receiving section 12b itself. The HDMI transmitting section 11b reads, via the DDC 83, the E-EDID of the HDMI receiving section 12b from the HDMI receiving section 12b connected via the HDMI cable 13 and, on the basis of this E-EDID, recognizes the performance settings of the HDMI receiving section 12b, that is, for example, image formats (or profiles) supported by an electronic device having the HDMI receiving section 12b, for example, RGB, YCbCr4:4:4, YCbCr4:2:2, and the like.

The CEC line 84 is formed by an unillustrated single signal line included in the HDMI cable 13, and is used for performing bidirectional communication of control data between the HDMI transmitting section 11b and the HDMI receiving section 12b.

Also, the HDMI cable 13 includes a line (HPD line) 86 that is connected to a pin called HPD (Hot Plug Detect). By using the line 86, a source device can detect the connection of a sink device. Also, the HDMI cable 13 includes a line 87 (power line) that is used to supply power from the source device to the sink device. Further, the HDMI cable 13 includes a reserved line 88.

FIG. 44 shows an example of TMDS transmission data. FIG. 44 shows various periods of transmission data in the case when image data in a horizontal×vertical format of 1920 pixels×1080 lines is transmitted on the three TMDS channels #0, #1, and #2 of HDMI.

During a Video Field in which transmission data is transmitted on the three TMDS channels #0, #1, and #2 of HDMI, three kinds of periods, a Video Data period, a Data Island period, and a Control period exist depending on the kind of transmission data.

Here, the Video Field period is the period from the rising edge (active edge) of a given vertical sync signal to the rising edge of the next vertical sync signal, and is divided into horizontal blanking, vertical blanking, and Active Video that is the period of the Video Field period minus horizontal blanking and vertical blanking.

The Video Data period is allocated to the Active Video period. In this Video Data period, data of 1920 pixels×1080 lines of active pixels constituting one screen's worth of uncompressed image data is transmitted.

The Data Island period and the Control period are allocated to horizontal blanking and vertical blanking. In this Data Island period and Control period, auxiliary data is transmitted. That is, a Data Island period is allocated to a portion of each of horizontal blanking and vertical blanking. In this Data Island period, of the auxiliary data, data not related to control, for example, an audio data packet and the like, is transmitted.

The Control period is allocated to the other portion of each of horizontal blanking and vertical blanking. In this Control period, of the auxiliary data, data related to control, for example, a vertical sync signal and a horizontal sync signal, a control packet, and the like, is transmitted.

FIG. 45 shows an example of packing format when image data (24 bits) is transmitted on the three TMDS channels #0, #1, and #2 of HDMI. Three modes, RGB 4:4:4, YCbCr 4:4:4, and YCbCr 4:2:2, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data are placed in the data areas of individual pixels in the TMDS channels #0, #1, and #2. In the YCbCr 4:4:4 mode, 8-bit blue chrominance (Cb) data, 8-bit luminance (Y) data, and 8-bit red chrominance (Cr) data are placed in the data areas of individual pixels in the TMDS channels #0, #1, and #2.

In the YCbCr 4:2:2 mode, in the data areas of individual pixels in the TMDS channel #0, the data of bit 0 to bit 3 of luminance (Y) data is placed, and also the data of bit 0 to bit 3 of blue chrominance (Cb) data and the data of bit 0 to bit 3 of red chrominance (Cr) data are placed alternately pixel by pixel. Also, in the YCbCr 4:2:2 mode, in the data areas of individual pixels in the TMDS channel #1, the data of bit 4 to bit 11 of luminance (Y) data is placed. Also, in the YCbCr 4:2:2 mode, in the data areas of individual pixels in the TMDS channel #2, the data of bit 4 to bit 11 of blue chrominance (Cb) data and the data of bit 4 to bit 11 of red chrominance (Cr) data are placed alternately pixel by pixel.

FIG. 46 shows an example of packing format when deep color image data (48 bits) is transmitted on the three TMDS channels #0, #1, and #2 of HDMI. Two modes, RGB 4:4:4 and YCbCr 4:4:4, are shown as transmission modes for image data. Here, the relationship between a TMDS clock and a pixel clock is such that TMDS clock=2×pixel clock.

In the RGB 4:4:4 mode, the data of bit 0 to bit 7 and data of bit 8 to bit 15 of 16-bit blue (B) data are placed in the first half and second half of the data area of each pixel in the TMDS channel #0. Also, in the RGB 4:4:4 mode, the data of bit 0 to bit 7 and data of bit 8 to bit 15 of 16-bit green (G) data are placed in the first half and second half of the data area of each pixel in the TMDS channel #1. Also, in the RGB 4:4:4 mode, the data of bit 0 to bit 7 and data of bit 8 to bit 15 of 16-bit red (R) data are placed in the first half and second half of the data area of each pixel in the TMDS channel #2.

Also, in the YCbCr 4:4:4 mode, the data of bit 0 to bit 7 and data of bit 8 to bit 15 of 16-bit blue chrominance (Cb) data are placed in the first half and second half of the data area of each pixel in the TMDS channel #0. Also, in the YCbCr 4:4:4 mode, the data of bit 0 to bit 7 and data of bit 8 to bit 15 of 16-bit luminance (Y) data are placed in the first half and second half of the data area of each pixel in the TMDS channel #1. Also, in the YCbCr 4:4:4 mode, the data of bit 0 to bit 7 and data of bit 8 to bit 15 of 16-bit red chrominance (Cr) data are placed in the first half and second half of the data area of each pixel in the TMDS channel #2.

Since there are no specifications for transmission of stereo image data between HDMI-connected devices which will be put into practice in the coming years, only connections between those of the same manufacture can be realized. In particular, there is no interconnection guarantee for connections with other manufactures' sets. For example, in Patent Document 1, although a proposal is made with regard to the transmission mode for stereo image data and its determination, no proposal is made about transmission via a digital interface such as HDMI. Also, in Patent Document 2, although a proposal is made about the transmission mode for stereo image data using television broadcast radio waves, no proposal is made about transmission via a digital interface.

Patent Document 1: Japanese Unexamined Patent Application Publication No. 2003-111101

Patent Document 2: Japanese Unexamined Patent Application Publication No. 2005-6114

Non-Patent Document 1: High-Definition Multimedia Interface Specification Version 1.3a, Nov. 10, 2006

DISCLOSURE OF INVENTION

Technical Problem

As described above, in the related art, no proposal has been made about specifications for transmission of stereo image data via a digital interface such as HDMI.

An object of this invention is to make it possible to perform transmission of stereo image data between devices in a favorable manner.

Technical Solution

The concept of this invention resides in a transmitting apparatus including: a data transmitting section that transmits stereo image data for displaying a stereoscopic image, to an external device via a transmission path; a transmission-mode-information receiving section that receives transmission mode information transmitted from the external device via the transmission path, the transmission mode information indicating transmission modes for stereo image data that can be supported by the external device; a transmission mode selecting section that selects a predetermined transmission mode as a transmission mode for the stereo image data transmitted by the data transmitting section, from among the transmission modes for stereo image data that can be supported by the external device, on the basis of the transmission mode information received by the transmission-mode-information receiving section; and a transmission-mode-information transmitting section that transmits transmission mode information on the stereo image data transmitted by the data transmitting section, to the external device via the transmission path.

Also, the concept of this invention resides in a receiving apparatus including: a data receiving section that receives stereo image data for displaying a stereoscopic image, from an external device via a transmission path; a transmission-mode-information receiving section that receives transmission mode information on the stereo image data received by the data receiving section, from the external device; a data processing section that processes the stereo image data received by the data receiving section, on the basis of the transmission mode information received by the transmission-mode-information receiving section, to generate left eye image data and right eye image data; a transmission-mode-information storing section that stores transmission mode information on transmission modes for stereo image data that can be supported by the receiving apparatus itself; and a transmission-mode-information transmitting section that transmits the transmission mode information stored by the transmission-mode-information storing section, to the external device via the transmission path.

In this invention, the transmitting apparatus receives, from the external device (receiving apparatus), information on transmission modes for stereo image data that can be supported by this external device, via the transmission path. In this case, the receiving apparatus stores, in the storing section, information on transmission modes for stereo image data supported by the receiving apparatus itself, and transmits this transmission mode information to the external device (transmitting apparatus) via the transmission path.

On the basis of the transmission mode information received from the external device (receiving apparatus), the transmitting apparatus selects a predetermined transmission mode from among the transmission modes for stereo image data that can be supported by the external device. In this case, for example, if there are a plurality of transmission modes for stereo image data that can be supported by the external device, the transmitting apparatus selects a transmission mode with the least image degradation.

For example, the transmitting apparatus receives transmission rate information on the transmission path from the external device (receiving apparatus). In this case, the receiving apparatus acquires the transmission rate information on the transmission path on the basis of the data reception status such as error rate, and transmits this transmission rate information to the external device (transmitting apparatus) via the transmission path.

Upon receiving the transmission rate information on the transmission path from the external device, as described above, the transmitting apparatus selects a predetermined transmission mode on the basis of the transmission rate information on the transmission path, in addition to the information on transmission modes for stereo image data that can be supported by the external device. For example, the transmitting apparatus selects, as the predetermined transmission mode, a transmission mode which is a transmission mode for stereo image data that can be supported by the external device, and with which the transmission rate required for transmission of stereo image data falls within the transmission rate of the transmission path. Thus, the transmitting apparatus can transmit stereo image data to the receiving apparatus in a favorable manner at all times irrespective of a change in the status of the transmission path.

The transmitting apparatus transmits stereo image data in the selected transmission mode to the external device (receiving apparatus) via the transmission path. For example, the transmitting apparatus transmits the stereo image data to the external apparatus by differential signals on a plurality of channels via the transmission path. For example, in the case in which the stereo image data includes two-dimensional image data and depth data corresponding to each pixel, the transmitting apparatus transmits by placing, in a data area of each pixel, pixel data constituting the two-dimensional data and the depth data corresponding to the pixel data.

Also, for example, the stereo image data includes first data and second data, and the transmitting apparatus transmits the first data to the external device via a first transmission path, and transmits the second data to the external device via a second transmission path. For example, the second transmission path is a bidirectional communication path formed by using a predetermined line of the first transmission path, and the transmitting apparatus transmits the first data to the external device via the first transmission path by differential signals on a plurality of channels, and transmits the second data to the external device via the bidirectional transmission path. For example, the first data is left eye image data or right eye image data, and the second data is the right eye image data or the left eye image data. Also, for example, the first data is two-dimensional image data, and the second data is depth data corresponding to each pixel.

The transmitting apparatus transmits information on the transmission mode for stereo image data to be transmitted, to the external device (receiving apparatus) via the transmission path. For example, the transmitting apparatus transmits transmission mode information to the external device by inserting the information in the blanking period of the stereo image data. Also, for example, the transmitting apparatus transmits transmission mode information to the external device via a control data line constituting the transmission path.

Also, for example, the transmitting apparatus transmits transmission mode information to the external device via a bidirectional communication path formed by using a predetermined line of the transmission path. For example, the bidirectional communication path is a pair of differential transmission paths, and at least one of the pair of differential transmission paths has a function of notifying a connection status of the external device by a DC bias potential (HPD line and the like of the HDMI cable).

The receiving apparatus receives stereo image data transmitted from the external device (transmitting apparatus). Also, the receiving apparatus receives transmission mode information on the stereo image data transmitted from the external device. Then, the receiving apparatus processes the received stereo image data on the basis of the transmission mode information, thereby generating left eye image data and right eye image data.

In this way, when transmitting stereo image data from the transmitting apparatus to the receiving apparatus, the transmitting apparatus decides the transmission mode for the stereo image data to be transmitted, by receiving information on transmission modes for stereo image data that can be supported by the receiving apparatus. Also, at this time, the transmitting apparatus transmits transmission mode information on the stereo image data to be transmitted, to the receiving apparatus. Thus, transmission of stereo image data between the transmitting apparatus and the receiving apparatus (between devices) can be performed in a favorable manner.

Advantageous Effects

According to this invention, when the transmitting apparatus transmits stereo image data to the receiving apparatus (external device), the transmitting apparatus receives, from this external device, information on transmission modes for stereo image data that can be supported by the external device, and decides the transmission mode for the stereo image data to be transmitted. Also, the transmitting apparatus transmits, to the external device, information on the transmission mode for the stereo image data to be transmitted, thereby making it possible to perform transmission of stereo image data between devices in a favorable manner.

BRIEF DESCRIPTION OF DRAWINGS

FIG. 8 is a diagram showing the pin arrangement (type A) of HDMI terminals to which HDMI cables of a source device and a sink device are connected.

FIG. 10 is a diagram showing left eye (L) and right eye (R) image data (image data in a 1920×1080p pixel format).

FIG. 11 is a diagram for explaining, as transmission modes for 3D (stereo) image data, (a) a mode in which the pixel data of left eye image data and the pixel data of right eye image data are transmitted while being switched sequentially at every TMDS clock, (b) a mode in which one line of left eye image data and one line of right eye image data are transmitted alternately, and (c) a mode in which left eye image data and right eye image data are transmitted while being switched sequentially field by field.

FIG. 12 is a diagram for explaining, as transmission modes for 3D (stereo) image data, (a) a mode in which one line of left eye image data and one line of right eye image data are transmitted alternately, (b) a mode in which the data of each line of left eye image data is transmitted in the first half of the vertical direction, and the data of each line of left eye image data is transmitted in the second half of the vertical direction, and (c) a mode in which the pixel data of left eye image data is transmitted in the first half of the horizontal direction, and the pixel data of left eye image data is transmitted in the second half of the horizontal direction.

FIG. 32 is a diagram showing an example of the data structure of a Vender Specific area of E-EDID.

FIG. 33 is a diagram showing an example of the data structure of an AVI InfoFrame packet, which is placed in a Data Island period.

FIG. 34 is a diagram showing an example of video format data.

FIG. 35 is a diagram showing an example of the structure of a GCP (General Control Protocol) packet for transmitting Deep Color information.

FIG. 36 is a diagram showing an example of the data structure of an Audio InfoFrame packet, which is placed in a Data Island period.

BEST MODES FOR CARRYING OUT THE INVENTION

Figure 1:
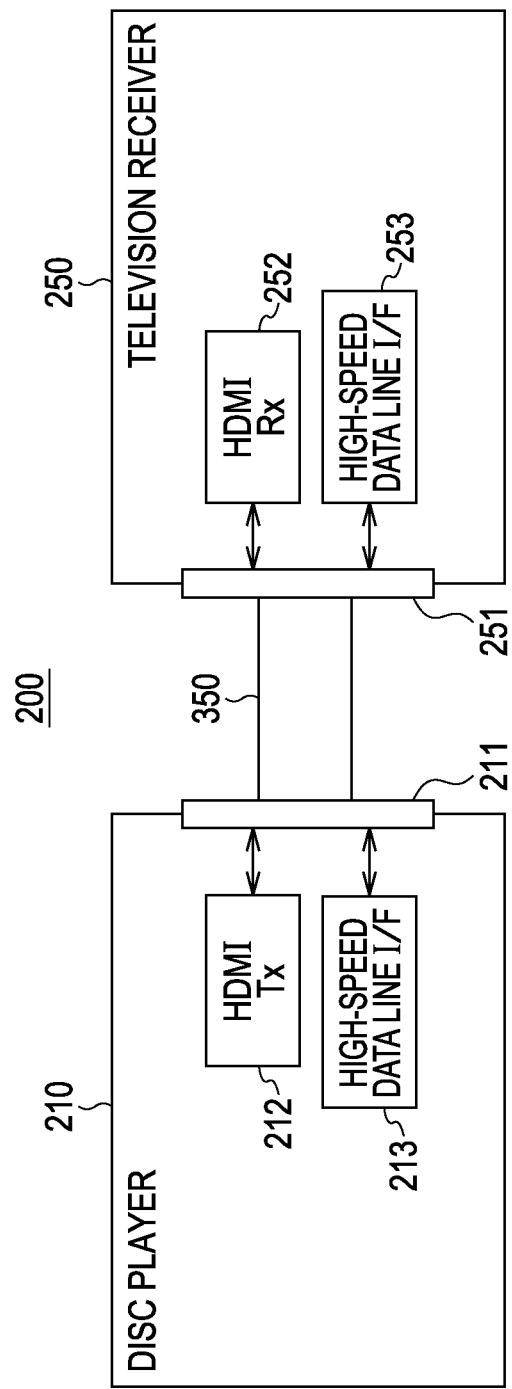
FIG. 1 is a block diagram showing an example of the configuration of an AV system according to an embodiment of this invention.

Hereinbelow, embodiments of this invention will be described with reference to the drawings. FIG. 1 shows an example of the configuration of an AV (Audio Visual) system 200 as an embodiment. The AV system 200 has a disc player 210 as a source device, and a television receiver 250 as a sink device.

The disc player 210 and the television receiver 250 are connected to each other via an HDMI cable 350. The disc player 210 is provided with an HDMI terminal 211 connected with an HDMI transmitting section (HDMI TX) 212 and a high-speed data line interface (I/F) 213. The television receiver 250 is provided with an HDMI terminal 251 connected with an HDMI receiving section (HDMI RX) 252 and a high-speed data line interface (I/F) 253. One end of the HDMI cable 350 is connected to the HDMI terminal 211 of the disc player 210, and the other end of the HDMI cable 350 is connected to the HDMI terminal 251 of the television receiver 250.

In the AV system 200 shown in FIG. 1, uncompressed (baseband) image data obtained by being played back on the disc player 210 is transmitted to the television receiver 250 via the HDMI cable 350, and an image based on the image data transmitted from the disc player 210 is displayed on the television receiver 250. Also, uncompressed audio data obtained by being played back on the disc player 210 is transmitted to the television receiver 250 via the HDMI cable 350, and audio based on the audio data transmitted from the disc player 210 is outputted on the television receiver 250.

It should be noted that in the case where image data transmitted from the disc player 210 is 3D image data (stereo image data) for displaying a stereoscopic image, on the television receiver 250, a stereoscopic image for presenting a stereo image to the user is displayed.

Figure 2:
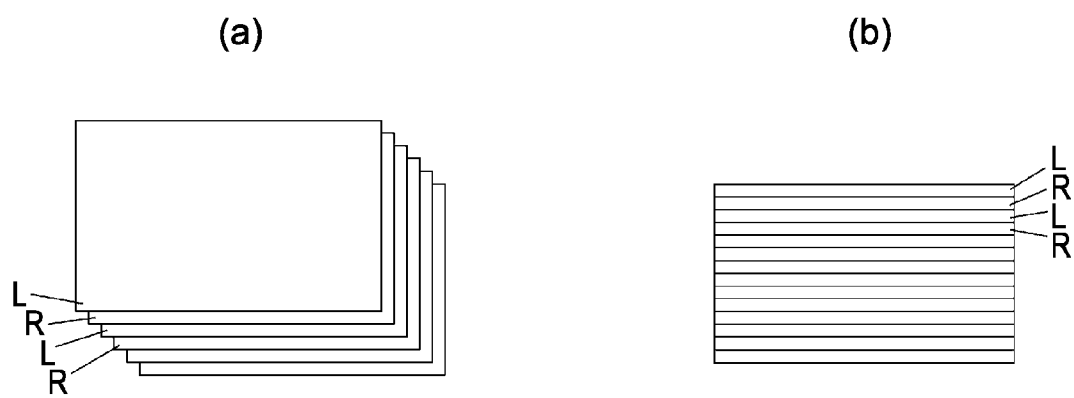
FIG. 2 is a diagram showing a "field sequential mode" and a "phase difference plate mode", which are examples of display modes for a stereoscopic image.

A further description will be given of an example of display mode for this stereoscopic image. As a display mode for a stereoscopic image, there is, for example, a so-called "field sequential mode" that is a mode in which, as shown in FIG. 2(a), a left-eye (L) image and a right-eye (R) image are displayed alternately field by field. In this display mode, driving at twice the normal frame rate is necessary on the television receiver side. Also, in this display mode, while there is no need to attach an optical film to the display section, it is necessary to switch the opening and closing of the shutters of left and right lens sections on the side of glasses worn by the user, in synchronization with the fields on the display section.

Also, as a display mode for a stereoscopic image, there is, for example, a so-called "phase difference plate mode" that is a mode in which, as shown in FIG. 2(b), a left-eye (L) image and a right-eye (R) image are switched line by line. In this display mode, such a polarizing plate that the orientation of polarization differs by 90 degrees for every line is attached to the display section on the television receiver side. Stereoscopic vision is realized by blocking the light of an image to the other eye with polarizing glasses worn by the user.

Figure 3:
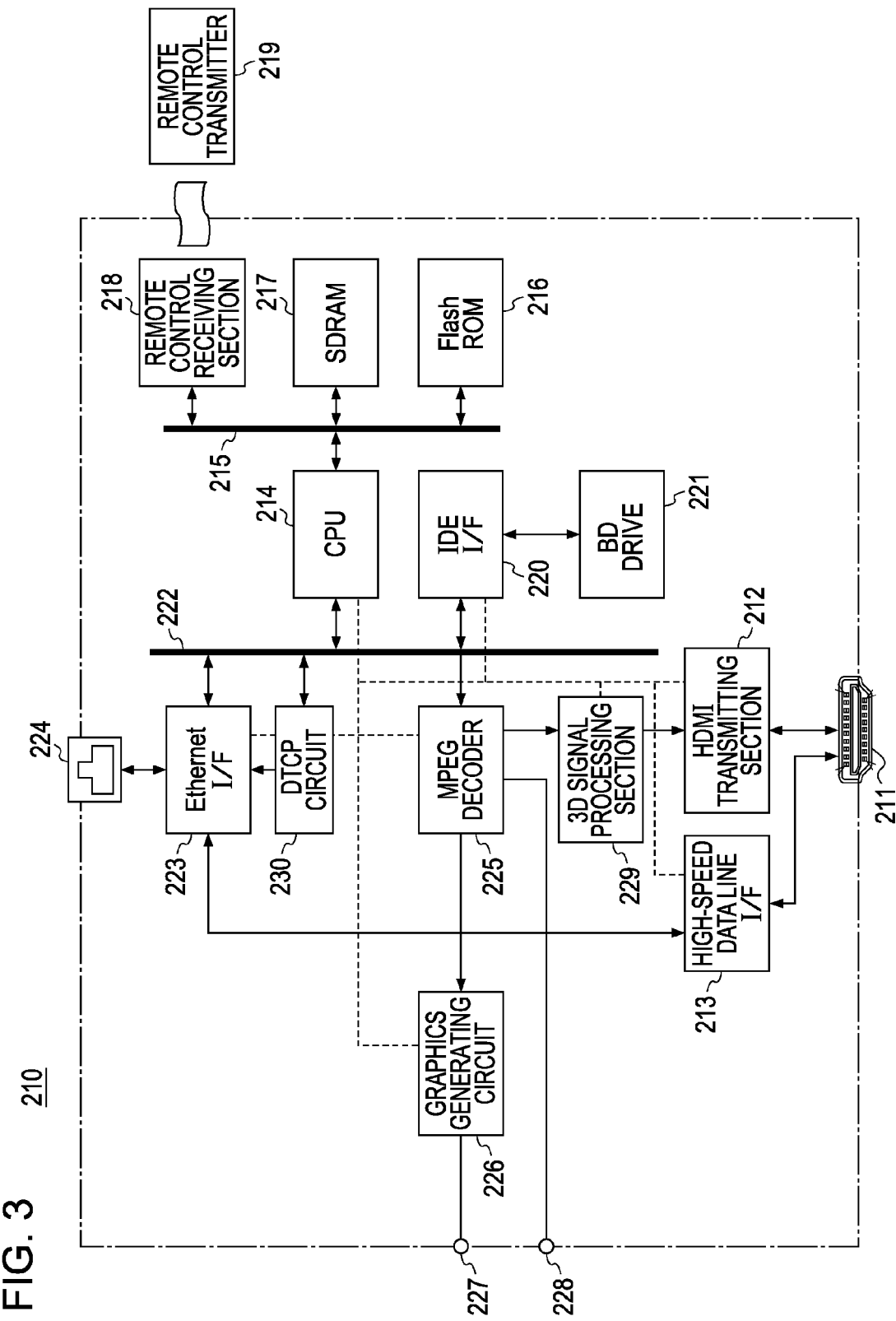
FIG. 3 is a block diagram showing an example of the configuration of a disc player (source device) constituting an AV system.

FIG. 3 shows an example of the configuration of the disc player 210. The disc player 210 has the HDMI terminal 211, the HDMI transmitting section 212, the high-speed data line interface 213, and a DTCP (Digital Transmission Content Protection) circuit 230. Also, the disc player 210 includes a CPU (Central Processing Unit) 214, a CPU bus 215, a flash ROM (Read Only Memory) 216, an SDRAM (Synchronous DRAM) 217, a remote control receiving section 218, and a remote control transmitter 219.

Also, the disc player 210 has an IDE interface 220, a BD (Blu-ray Disc) driver 221, an internal bus 222, an Ethernet interface (Ethernet I/F) 223, and a network terminal 224. Also, the disc player 210 has an MPEG (Moving Picture Expert Group) decoder 225, a graphics generating circuit 226, a video output terminal 227, an audio output terminal 228, and a 3D signal processing section 229. It should be noted that "Ethernet" is a registered trademark.

The CPU 214, the flash ROM 216, the SDRAM 217, and the remote control receiving section 218 are connected to the CPU bus 215. Also, the CPU 214, the IDE interface 220, the Ethernet interface 223, the DTCP circuit 230, and the MPEG decoder 225 are connected to the internal bus 222.

The CPU 214 controls the operation of each section of the disc player 210. The flash ROM 216 performs storage of control software and saving of data. The SDRAM 217 constitutes a work area for the CPU 214. The CPU 214 expands software and data read from the flash ROM 216 onto the DRAM 217 to activate the software, thereby controlling each section of the disc player 210. The remote control receiving section 218 receives a remote control signal (remote control code) transmitted from the remote control transmitter 219, and supplies the remote control signal to the CPU 214. The CPU 214 controls each section of the disc player 210 in accordance with the remote control code.

The BD drive 221 records content data onto a BD (not shown) as a disc-shaped recording medium, or plays back content data from this BD. The BD drive 221 is connected to the internal bus 222 via the IDE interface 220. The MPEG decoder 225 performs a decoding process on an MPEG2 stream played back by the BD drive 221 to thereby obtain image and audio data.

The DTCP circuit 230 performs encryption as required when transmitting content data played back by the BD drive 221 to a network via the network terminal 224, or from the high-speed data line interface 213 to a bidirectional communication path via the HDMI terminal 211.

The graphics generating circuit 226 performs a graphics data superimposing process or the like as required, on image data obtained by the MPEG decoder 225. The video output terminal 227 outputs image data outputted from the graphics generating circuit 226. The audio output terminal 228 outputs audio data obtained by the MPEG decoder 225.

The HDMI transmitting section (HDMI source) 212 transmits baseband image (video) and audio data from the HDMI terminal 211 through HDMI-compliant communication. Details of the HDMI transmitting section 212 will be described later. The high-speed data line interface 213 is an interface for a bidirectional communication path formed by using predetermined lines (reserved line and HPD line in this embodiment) constituting the HDMI cable 350.

The high-speed data line interface 213 is inserted between the Ethernet interface 223 and the HDMI terminal 211. The high-speed data line interface 213 transmits transmission data supplied from the CPU 214, to the device on the other party side via the HDMI cable 350 from the HDMI terminal 211. Also, the high-speed data line interface 213 supplies reception data received from the device on the other party side via the HDMI terminal 211 from the HDMI cable 350, to the CPU 214. Details of the high-speed data line interface 213 will be described later.

The 3D signal processing section 229 processes, of the image data obtained by the MPEG decoder 225, 3D image data for displaying a stereoscopic image into a state appropriate to a transmission mode when transmitting the 3D image data on TMDS channels of HDMI. Here, 3D image data is formed by left eye image data and right eye image data, or two-dimensional data and depth data corresponding to each pixel (MPEG-C mode). Details about the kinds of 3D image data transmission mode, selection of a transmissions mode, the packing format in each mode, and the like will be described later.

Operation of the disc player 210 shown in FIG. 3 will be briefly described. At the time of recording, content data to be recorded is acquired from the MPEG stream of an unillustrated digital tuner, or from the network terminal 224 via the Ethernet interface 223, or from the HDMI terminal 211 via the high-speed data line interface 213 and the Ethernet interface 223. This content data is inputted to the IDE interface 220, and recorded onto a BD by the BD drive 221. Depending on the case, the content data may be recorded onto an unillustrated HDD (Hard Disk Drive) that is connected to the IDE interface 220.

At the time of playback, content data (MPEG stream) played back from a BD by the BD drive 221 is supplied to the MPEG decoder 225 via the IDE interface 220. In the MPEG decoder 225, a decoding process is performed on the played back content data, thereby obtaining baseband image and audio data. The image data is outputted to the video output terminal 227 through the graphics generating circuit 226. Also, the audio data is outputted to the audio output terminal 228.

Also, in the case where, at the time of this playback, the image and audio data obtained by the MPEG decoder 225 are transmitted on TMDS channels of HDMI, these image and audio data are supplied to the HDMI transmitting section 212 and packed, and are outputted from the HDMI transmitting section 212 to the HDMI terminal 211. It should be noted that in the case where the image data is 3D image data, this 3D image data is processed by the 3D signal processing section 229 into a state appropriate to a selected transmission mode, before being supplied to the HDMI transmitting section 212.

Also, when transmitting content data played back by the BD drive 221 to the network at the time of playback, the content data is encrypted in the DTCP circuit 230, before being outputted to the network terminal 224 via the Ethernet interface 223. Likewise, when transmitting content data played back by the BD drive 221 to the bidirectional communication path of the HDMI cable 350 at the time of playback, the content data is encrypted in the DTCP circuit 230, before being outputted to the HDMI terminal 211 via the Ethernet interface 223 and the high-speed data line interface 213.

Figure 4:
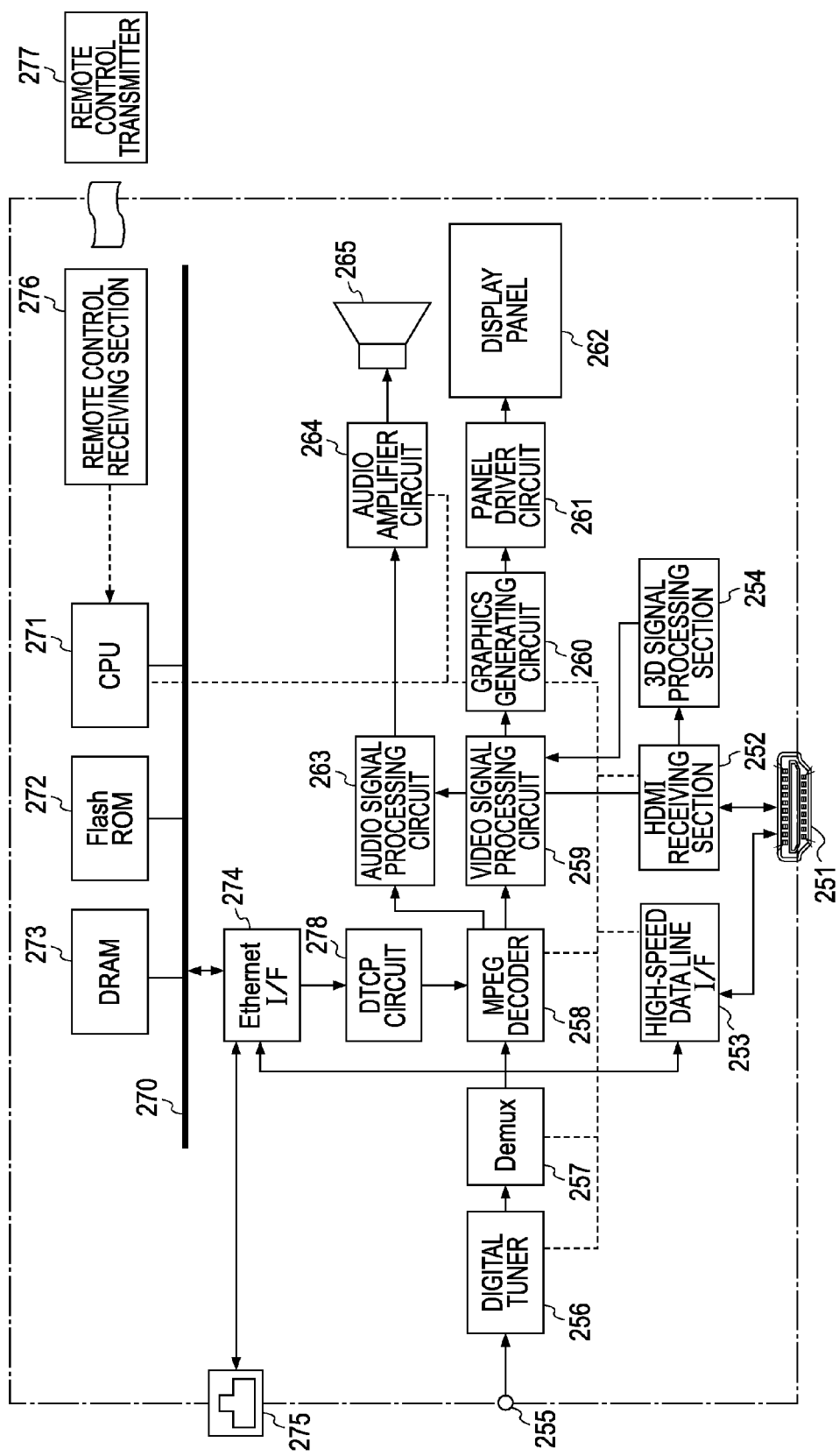
FIG. 4 is a block diagram showing an example of the configuration of a television receiver (sink device) constituting an AV system.

FIG. 4 shows an example of the configuration of the television receiver 250. The television receiver 250 has the HDMI terminal 251, the HDMI receiving section 252, the high-speed data line interface 253, and a 3D signal processing section 254. Also, the television receiver 250 has an antenna terminal 255, a digital tuner 256, a demultiplexer 257, an MPEG decoder 258, a video signal processing circuit 259, a graphics generating circuit 260, a panel driver circuit 261, and a display panel 262.

Also, the television receiver 250 has an audio signal processing circuit 263, an audio amplifier circuit 264, a loudspeaker 265, an internal bus 270, a CPU 271, a flash ROM 272, and a DRAM (Dynamic Random Access Memory) 273. Also, the television receiver 250 has an Ethernet interface (Ethernet I/F) 274, a network terminal 275, a remote control receiving section 276, a remote control transmitter 277, and a DTCP circuit 278.

The antenna terminal 255 is a terminal to which a television broadcast signal received by a receive antenna (not shown) is inputted. The digital tuner 256 processes the television broadcast signal inputted to the antenna terminal 255, and outputs a predetermined transport stream corresponding to a user-selected channel. The demultiplexer 257 extracts a partial TS (Transport Stream) (a TS packet of video data and a TS packet of audio data) corresponding to the user-selected channel, from the transport stream obtained by the digital tuner 256.

Also, the demultiplexer 257 extracts PSI/SI (Program Specific Information/Service Information) from the transport stream obtained by the digital tuner 256, and outputs the PSI/SI to the CPU 271. The transport stream obtained by the digital tuner 256 is multiplexed with a plurality of channels. The process of extracting a partial TS on an arbitrary channel from the transport stream by the demultiplexer 257 can be performed by obtaining information on the packet ID (PID) of the arbitrary channel from the PSI/SI (PAT/PMT).

The MPEG decoder 258 performs a decoding process on a video PES (Packetized Elementary Stream) packet formed by a TS packet of video data obtained by the demultiplexer 257, thereby obtaining image data. Also, the MPEG decoder 258 performs a decoding process on an audio PES packet formed by a TS packet of audio data obtained by the demultiplexer 257, thereby obtaining audio data.

The video signal processing circuit 259 and the graphics generating circuit 260 perform a scaling process (resolution conversion process), a graphics data superimposing process, or the like on the image data obtained by the MPEG decoder 258, or the image data received by the HDMI receiving section 252, as required. Also, in the case when image data received by the HDMI receiving section 252 is 3D image data, the video signal processing circuit 259 performs a process for displaying a stereoscopic image (see FIG. 2), on the left eye image data and the right eye image data. The panel driver circuit 261 drives the display panel 262 on the basis of the video (image) data outputted from the graphics generating circuit 260.

The display panel 262 is formed by, for example, an LCD (Liquid Crystal Display), a PDP (Plasma Display Panel), or the like. The audio signal processing circuit 263 performs necessary processing such as D/A conversion on the audio data obtained by the MPEG decoder 258. The audio amplifier circuit 264 amplifies an audio signal outputted from the audio signal processing circuit 263 and supplies the audio signal to the loudspeaker 265.

The CPU 271 controls the operation of each section of the television receiver 250. The flash ROM 272 performs storage of control software and saving of data. The DRAM 273 constitutes a work area for the CPU 271. The CPU 271 expands software and data read from the flash ROM 272 onto the DRAM 273 to activate the software, thereby controlling each section of the television receiver 250.

The remote control receiving section 276 receives a remote control signal (remote control code) supplied from the remote control transmitter 277, and supplies the remote control signal to the CPU 271. The CPU 271 controls each section of the television receiver 250 on the basis of this remote control code. The network terminal 275 is a terminal that connects to a network, and is connected to the Ethernet interface 274. The CPU 271, the flash ROM 272, the DRAM 273, and the Ethernet interface 274 are connected to the internal bus 270.

The DTCP circuit 278 decrypts encrypted data supplied from the network terminal 275 or the high-speed data line interface 253 to the Ethernet interface 274.

The HDMI receiving section (HDMI sink) 252 receives baseband image (video) and audio data to be supplied to the HDMI terminal 251 via the HDMI cable 350, through HDMI-compliant communication. Details of the HDMI receiving section 252 will be described later. Like the high-speed data line interface 213 of the disc player 210 described above, the high-speed data line interface 253 is an interface for a bidirectional communication path formed by using predetermined lines (reserved line and HPD line in this embodiment) constituting the HDMI cable 350.

The high-speed data line interface 253 is inserted between the Ethernet interface 274 and the HDMI terminal 251. The high-speed data line interface 253 transmits transmission data supplied from the CPU 271, to the device on the other party side via the HDMI cable 350 from the HDMI terminal 251. Also, the high-speed data line interface 253 supplies reception data received from the device on the other party side via the HDMI terminal 251 from the HDMI cable 350, to the CPU 271. Details of the high-speed data line interface 253 will be described later.

The 3D signal processing section 254 performs a process (decoding process) according to a transmission mode, on 3D image data received by the HDMI receiving section 252, thereby generating left eye image data and right eye image data. That is, the 3D signal processing section 254 acquires left eye image data and right eye image data, or two-dimensional image data and depth data, which constitute 3D image data, by performing a process reverse to that in the 3D signal processing section 229 of the disc player 210 described above. Also, in the case when two-dimensional data and depth data are acquired (MPEG-C mode), the 3D signal processing section 229 performs a computation for generating left eye image data and right eye image data by using the two-dimensional data and the depth data.

Operation of the television receiver 250 shown in FIG. 4 will be briefly described. A television broadcast signal inputted to the antenna terminal 255 is supplied to the digital tuner 256. In the digital tuner 256, the television signal is processed to output a predetermined transport stream corresponding to a user-selected channel, and the predetermined transport stream is supplied to the demultiplexer 257. In the demultiplexer 257, a partial TS (a TS packet of video data and a TS packet of audio data) corresponding to the user-selected channel is extracted from the transport stream, and the partial TS is supplied to the MPEG decoder 258.

In the MPEG decoder 258, a decoding process is performed on the video PES packet formed by the TS packet of video data, thereby obtaining video data. This video data undergoes a scaling process (resolution conversion process), a scaling process, a graphics data superimposing process, and the like as required in the video signal processing circuit 259 and the graphics generating circuit 260, before being supplied to the panel driver circuit 261. Consequently, an image corresponding to the user-selected channel is displayed on the display panel 262.

Also, in the MPEG decoder 258, a decoding process is performed on the audio PES packet formed by the TS packet of audio data, thereby obtaining audio data. This audio data undergoes necessary processing, such as D/A conversion, in the audio signal processing circuit 263, and is further amplified in the audio amplifier circuit 264, before being supplied to the loudspeaker 265. Consequently, audio corresponding to the user-selected channel is outputted from the loudspeaker 265.

Also, encrypted content data (image data and audio data) supplied from the network terminal 275 to the Ethernet interface 274, or supplied from the HDMI terminal 251 to the Ethernet interface 274 via the high-speed data line interface 253, is decrypted in the DTCP circuit 274, before being supplied to the MPEG decoder 258. Thereafter, the operation is the same as that at the time of receiving a television broadcast signal described above, so that an image is displayed on the display panel 262, and audio is outputted from the loudspeaker 265.

Also, in the HDMI receiving section 252, image data and audio data transmitted from the disc player 210 connected to the HDMI terminal 251 via the HDMI cable 350 are acquired. The image data is supplied to the video signal processing circuit 259 via the 3D signal processing section 254. Also, the audio data is directly supplied to the audio signal processing circuit 263. Thereafter, the operation is the same as that at the time of receiving a television broadcast signal described above, so that an image is displayed on the display panel 262, and audio is outputted from the loudspeaker 265.

It should be noted that in the case when image data received by the HDMI receiving section 252 is 3D image data, in the 3D signal processing section 254, a process (decoding process) corresponding to a transmission mode is performed on the 3D image data, and left eye image data and right eye image data are generated. Then, the left eye image data and right eye image data are supplied from the 3D signal processing section 254 to the video signal processing circuit 259. Also, in the case when the left eye image data and right eye image data that constitute 3D image data are supplied, in the video signal processing circuit 259, image data for displaying a stereoscopic image (see FIG. 2) is generated on the basis of the left eye image data and the right eye image data. Consequently, a stereoscopic image is displayed on the display panel 262.

Figure 5:
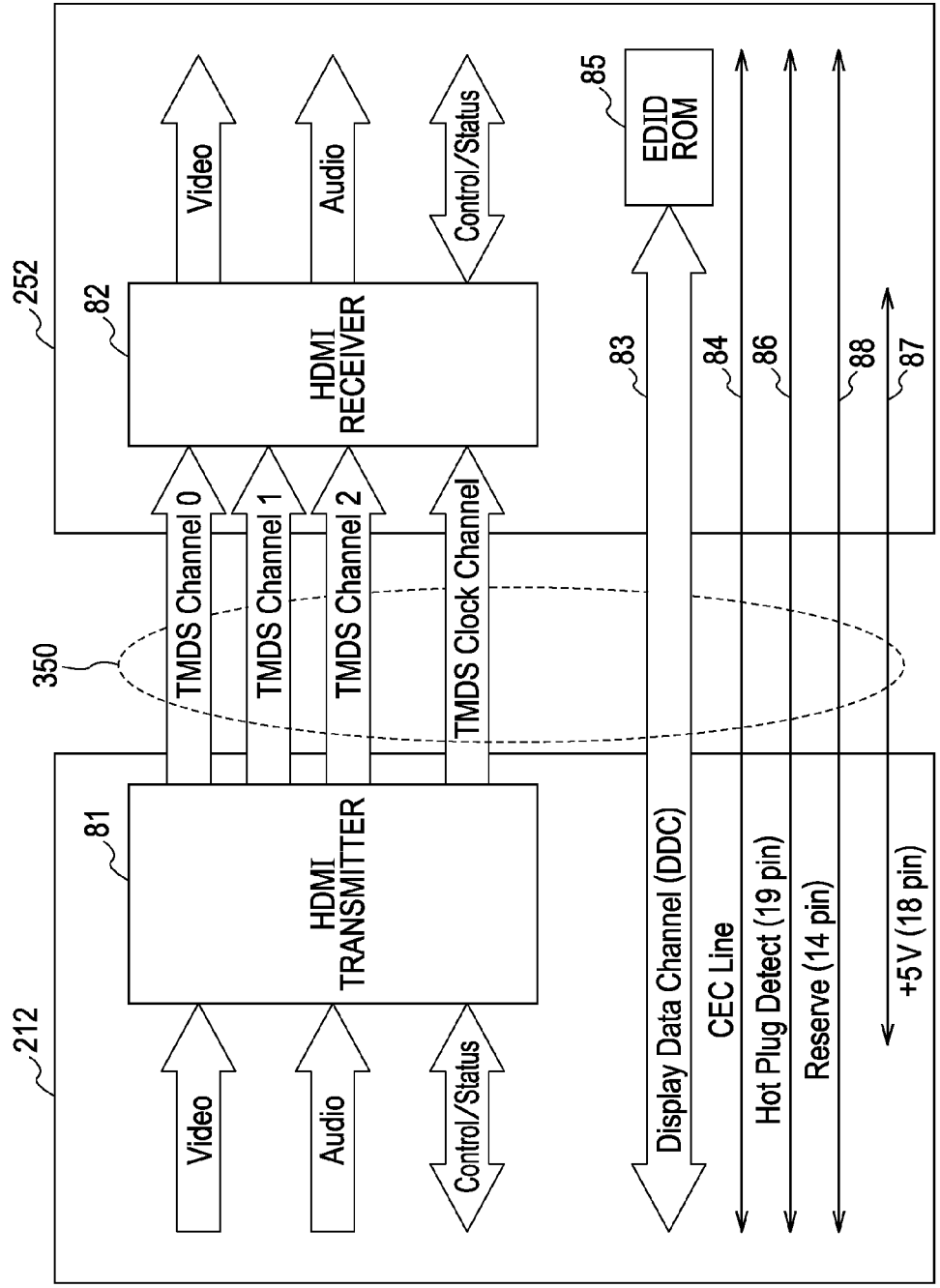
FIG. 5 is a block diagram showing an example of the configuration of an HDMI transmitting section (HDMI source) and an HDMI receiving section (HDMI sink).

FIG. 5 shows an example of the configuration of the HDMI transmitting section (HDMI source) 212 of the disc player 210, and the HDMI receiving section (HDMI sink) 252 of the television receiver 250 in the AV system 200 in FIG. 1.

The HDMI transmitting section 212 unidirectionally transmits differential signals corresponding to uncompressed pixel data of one screen's worth of image to the HDMI receiving section 252 on a plurality of channels during a valid image period (hereafter, also referred to as Active Video period as appropriate), which is a period from one vertical sync signal to the next vertical sync signal minus a horizontal blanking period and a vertical blanking period, and also unidirectionally transmits differential signals corresponding to at least audio data and control data accompanying the image, other auxiliary data, or the like to the HDMI receiving section 252 on a plurality of channels during the horizontal blanking period or the vertical blanking period.

That is, the HDMI transmitting section 212 has the HDMI transmitter 81. The transmitter 81 converts uncompressed pixel data of an image into corresponding differential signals, and unidirectionally transmits the differential signals serially to the HDMI receiving section 252 connected via the HDMI cable 350, on a plurality of channels that are three TMDS channels #0, #1, and #2.

Also, the transmitter 81 converts uncompressed audio data accompanying an image, and further, necessary control data, other auxiliary data, and the like into corresponding differential signals, and unidirectionally transmits the differential signals serially to the HDMI sink 252 connected via the HDMI cable 350, on the three TMDS channels #0, #1, and #2.

Further, the transmitter 81 transmits a pixel clock synchronized with pixel data transmitted on the three TMDS channels #0, #1, and #2, to the HDMI receiving section 252 connected via the HDMI cable 350, on a TMDS clock channel. Here, on a single TMDS channel #i (i=0, 1, 2), 10-bit pixel data is transmitted during one clock cycle of the pixel clock.

During an Active Video period, the HDMI receiving section 252 receives differential signals corresponding to pixel data unidirectionally transmitted from the HDMI transmitting section 212 on a plurality of channels, and during a horizontal blanking period or a vertical blanking period, receives differential signals corresponding to audio data and control data unidirectionally transmitted from the HDMI transmitting section 212 on a plurality of channels.

That is, the HDMI receiving section 252 has the HDMI receiver 82. The receiver 82 receives differential signals corresponding to pixel data and differential signals corresponding to audio data and control data, which are unidirectionally transmitted from the HDMI transmitting section 212 connected via the HDMI cable 350, on the TMDS channels #0, #1, and #2 in synchronization with a pixel clock that is similarly transmitted from the HDMI transmitting section 212 on the TMDS clock channel.

In addition to the three TMDS channels #0 through #2 serving as transmission channels for serially transmitting pixel data and audio data unidirectionally from the HDMI transmitting section 212 to the HDMI receiving section 252 in synchronization with a pixel clock, and the TMDS clock channel serving as a transmission channel for transmitting the pixel clock, transmission channels in an HDMI system formed by the HDMI transmitting section 212 and the HDMI receiving section 252 include transmission channels called the DDC (Display Data Channel) 83 and the CEC (Consumer Electronics Control) line 84.

The DDC 83 is formed by two unillustrated signal lines included in the HDMI cable 350, and is used for the HDMI transmitting section 212 to read E-EDID (Enhanced Extended Display Identification Data) from the HDMI receiving section 252 that is connected via the HDMI cable 350.

That is, in addition to the HDMI receiver 81, the HDMI receiving section 252 has the EDID ROM (Read Only Memory) 85 that stores E-EDID, which is performance information related to the performance (Configuration/capability) of the HDMI receiving section 252 itself. The HDMI transmitting section 212 reads, via the DDC 83, the E-EDID of the HDMI receiving section 252 from the HDMI receiving section 252 connected via the HDMI cable 350, in response to a request from the CPU 214, for example. The HDMI transmitting section 212 transmits the read E-EDID to the CPU 214. The CPU 214 stores this E-EDID onto the flash ROM 272 or the DRAM 273.

The CPU 214 can recognize the performance settings of the HDMI receiving section 252 on the basis of this E-EDID. For example, the CPU 214 recognizes image formats (or profiles) supported by an electronic device having the HDMI receiving section 252, for example, RGB, YCbCr4:4:4, YCbCr4:2:2, and the like. Also, in this embodiment, on the basis of 3D image data transmission mode information included in the E-EDID, the CPU 214 recognizes the transmission modes for 3D image/audio data that can be supported by the electronic device having the HDMI receiving section 252.

The CEC line 84 is formed by an unillustrated single signal line included in the HDMI cable 350, and is used for performing bidirectional communication of control data between the HDMI transmitting section 212 and the HDMI receiving section 252.

Also, the HDMI cable 350 includes the line (HPD line) 86 that is connected to a pin called HPD (Hot Plug Detect). By using the line 86, a source device can detect the connection of a sink device. Also, the HDMI cable 350 includes the line 87 (power line) that is used to supply power from the source device to the sink device. Further, the HDMI cable 350 includes the reserved line 88.

Figure 6:
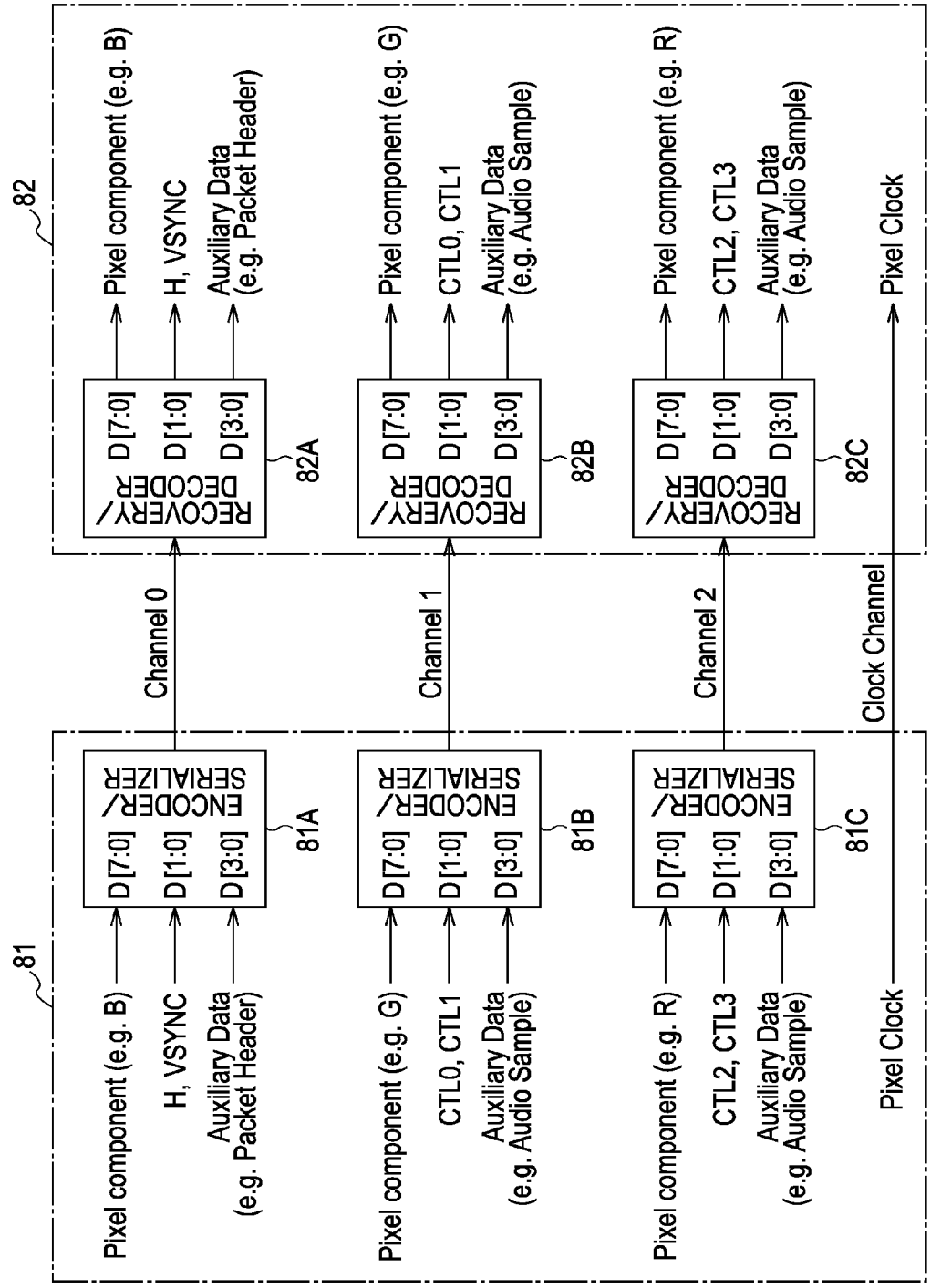
FIG. 6 is a block diagram showing an example of the configuration of an HDMI transmitter constituting an HDMI transmitting section, and an HDMI receiver constituting an HDMI receiving section.

FIG. 6 shows an example of the configuration of the HDMI transmitter 81 and the HDMI receiver 82 in FIG. 5.

The HDMI transmitter 81 has three encoders/serializers 81A, 81B, and 81C corresponding to the three TMDS channels #0, #1, and #2, respectively. Further, each of the three encoders/serializers 81A, 81B, and 81C encodes image data, auxiliary data, and control data supplied thereto and perform conversion from parallel data to serial data, and transmits the serial data by differential signals. Here, if the image data has three components, R (Red), G (Green), and B (Blue), for example, the B component is supplied to the encoder/serializer 81A, the G component is supplied to the encoder/serializer 81B, and the R component is supplied to the encoder/serializer 81C.

Also, the auxiliary data include, for example, audio data and control packets. For example, the control packets are supplied to the encoder/serializer 81A, and the audio data is supplied to the encoder/serializers 81B and 81C.

Further, the control data includes a 1-bit vertical sync signal (VSYNC), a 1-bit horizontal sync signal (HSYNC), and control bits CTL0, CTL1, CTL2, and CTL3 each having 1 bit. The vertical sync signal and the horizontal sync signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of image data, a vertical sync signal and a horizontal sync signal, and auxiliary data which are supplied thereto, in a time division manner. That is, the encoder/serializer 81A converts the B component of image data supplied thereto into parallel data in units of 8 bits as a fixed number of bits. Further, the encoder/serializer 81A encodes and converts the parallel data into serial data, and transmits the serial data on the TMDS channel #0.

Also, the encoder/serializer 81A encodes and converts 2-bit parallel data of a vertical sync signal and a horizontal sync signal supplied thereto into serial data, and transmits the serial data on the TMDS channel #0. Further, the encoder/serializer 81A converts auxiliary data supplied thereto into parallel data in units of 4 bits. Then, the encoder/serializer 81A encodes and converts the parallel data into serial data, and transmits the serial data on the TMDS channel #0.

The encoder/serializer 81B transmits the G component of image data, control bits CTL0 and CTL1, and auxiliary data which are supplied thereto, in a time division manner. That is, the encoder/serializer 81B converts the G component of image data supplied thereto into parallel data in units of 8 bits as a fixed number of bits. Further, the encoder/serializer 81B encodes and converts the parallel data into serial data, and transmits the serial data on the TMDS channel #1.

Also, the encoder/serializer 81B encodes and converts 2-bit parallel data of control bits CTL0 and CTL1 supplied thereto into serial data, and transmits the serial data on the TMDS channel #1. Further, the encoder/serializer 81B converts the auxiliary data supplied thereto into parallel data in units of 4 bits. Then, the encoder/serializer 81B encodes and converts the parallel data into serial data, and transmits the serial data on the TMDS channel #1.

The encoder/serializer 81C transmits the R component of image data, control bits CTL2 and CTL3, and auxiliary data which are supplied thereto, in a time division manner. That is, the encoder/serializer 81C converts the R component of image data supplied thereto into parallel data in units of 8 bits as a fixed number of bits. Further, the encoder/serializer 81C encodes and converts the parallel data into serial data, and transmits the serial data on the TMDS channel #2.

Also, the encoder/serializer 81C encodes and converts 2-bit parallel data of control bits CTL2 and CTL3 supplied thereto into serial data, and transmits the serial data on the TMDS channel #2. Further, the encoder/serializer 81C converts the auxiliary data supplied thereto into parallel data in units of 4 bits. Then, the encoder/serializer 81C encodes and converts the parallel data into serial data, and transmits the serial data on the TMDS channel #2.

The HDMI receiver 82 has three recoveries/decoders 82A, 82B, and 82C corresponding to the three TMDS channels #0, #1, and #2, respectively. Each of the recoveries/decoders 82A, 82B, and 82C receives image data, auxiliary data, and control data transmitted by differential signals on the TMDS channels #0, #1, and #2. Further, each of the recoveries/decoders 82A, 82B, and 82C converts the received image data, auxiliary data, and control data from serial data to parallel data, and decodes and outputs the parallel data.

That is, the recovery/decoder 82A receives the B component of image data, a vertical sync signal, a horizontal sync signal, and auxiliary data which are transmitted by differential signals on the TMDS channel #0. Then, the recovery/decoder 82A converts the B component of image data, the vertical sync signal, the horizontal sync signal, and the auxiliary data from serial data to parallel data, and decodes and outputs the parallel data.

The recovery/decoder 82B receives the G component of image data, control bits CTL0 and CTL1, and auxiliary data which are transmitted by differential signals on the TMDS channel #1. Then, the recovery/decoder 82B converts the G component of image data, the control bits CTL0 and CTL1, and the auxiliary data from serial data to parallel data, and decodes and outputs the parallel data.

The recovery/decoder 82C receives the R component of image data, control bits CTL2 and CTL3, and auxiliary data which are transmitted by differential signals on the TMDS channel #2. Then, the recovery/decoder 82C converts the R component of image data, the control bits CTL2 and CTL3, and the auxiliary data from serial data to parallel data, and decodes and outputs the parallel data.

Figure 7:
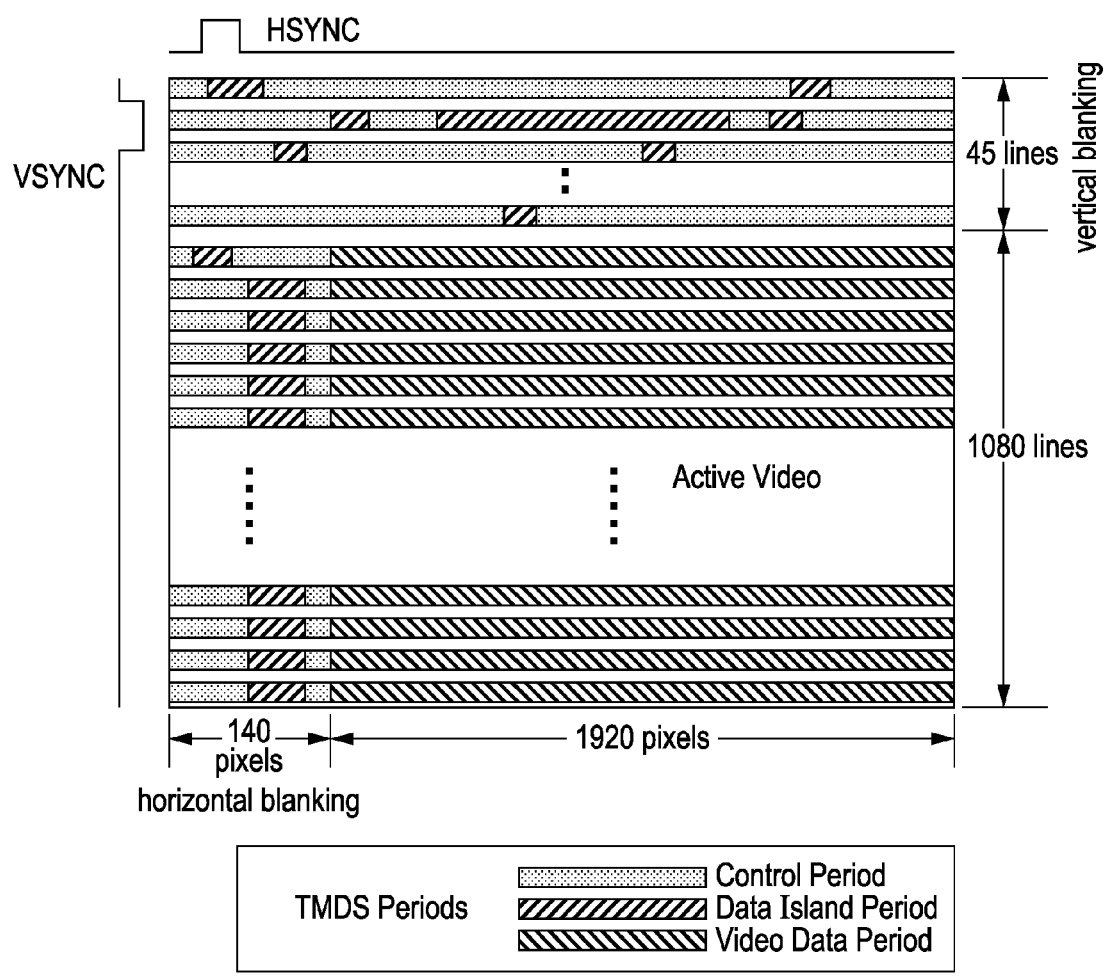
FIG. 7 is a diagram showing an example of the structure of TMDS transmission data (in the case when image data in a horizontal×vertical format of 1920 pixels×1080 lines is transmitted).

FIG. 7 shows an example of the structure of TMDS transmission data. FIG. 7 shows various periods of transmission data in the case when image data in a horizontal× vertical format of 1920 pixels×1080 lines is transmitted on the three TMDS channels #0, #1, and #2.

During a Video Field in which transmission data is transmitted on the three TMDS channels #0, #1, and #2 of HDMI, three kinds of periods, a Video Data period, a Data Island period, and a Control period exist depending on the kind of transmission data.

Here, the Video Field period is the period from the rising edge (active edge) of a given vertical sync signal to the rising edge of the next vertical sync signal, and is divided into horizontal blanking, vertical blanking, and Active Video that is the period of the Video Field period minus the horizontal blanking and the vertical blanking.

The Video Data period is allocated to the Active Video period. In this Video Data period, data of 1920 pixels×1080 lines of active pixels constituting one screen's worth of uncompressed image data is transmitted.

The Data Island period and the Control period are allocated to horizontal blanking and vertical blanking. In this Data Island period and Control period, auxiliary data is transmitted. That is, a Data Island period is allocated to a portion of each of horizontal blanking and vertical blanking. In this Data Island period, of the auxiliary data, data not related to control, for example, an audio data packet and the like, is transmitted.

The Control period is allocated to the other portion of each of horizontal blanking and vertical blanking. In this Control period, of the auxiliary data, data related to control, for example, a vertical sync signal, a horizontal sync signal, a control packet, and the like, is transmitted.

FIG. 8 shows pin arrangement of the HDMI terminals 211 and 251. The pin arrangement shown in FIG. 8 is called type-A.

Two lines as differential lines along which TMDS Data #i+ and TMDS Data #i− as differential signals on TMDS channel #i are transmitted are connected to pins (pins whose pin numbers are 1, 4, and 7) to which TMDS Data #i+ is allocated, and pins (pins whose pin numbers are 3, 6, and 9) to which TMDS Data #i− is allocated.

Also, the CEC line 84 along which a CEC signal as control data is transmitted is connected to a pin whose pin number is 13. A pin whose pin number is 14 is a reserved pin. Also, a line along which an SDA (Serial Data) signal such as E-EDID is transmitted is connected to a pin whose pin number is 16. A line along which an SCL (Serial Clock) signal as a clock signal used for synchronization at the time of SDA signal transmission and reception is transmitted is connected to a pin whose pin number is 15. The above-mentioned DDC 83 is formed by the line along which an SDA signal is transmitted and the line along which an SCL signal is transmitted.

Also, the HPD line 86 for a source device to detect the connection of a sink device as described above is connected to a pin whose pin number is 19. Also, the line 87 for supplying power as described above is connected to a pin whose pin number is 18.

Next, a description will be given of the high-speed data interface 213 of the disc player 210 and the high-speed data interface 253 of the television receiver 250. It should be noted that here, the description will be given with the disc player 210 as a source device and the television receiver 250 as a sink device.

Figure 9:
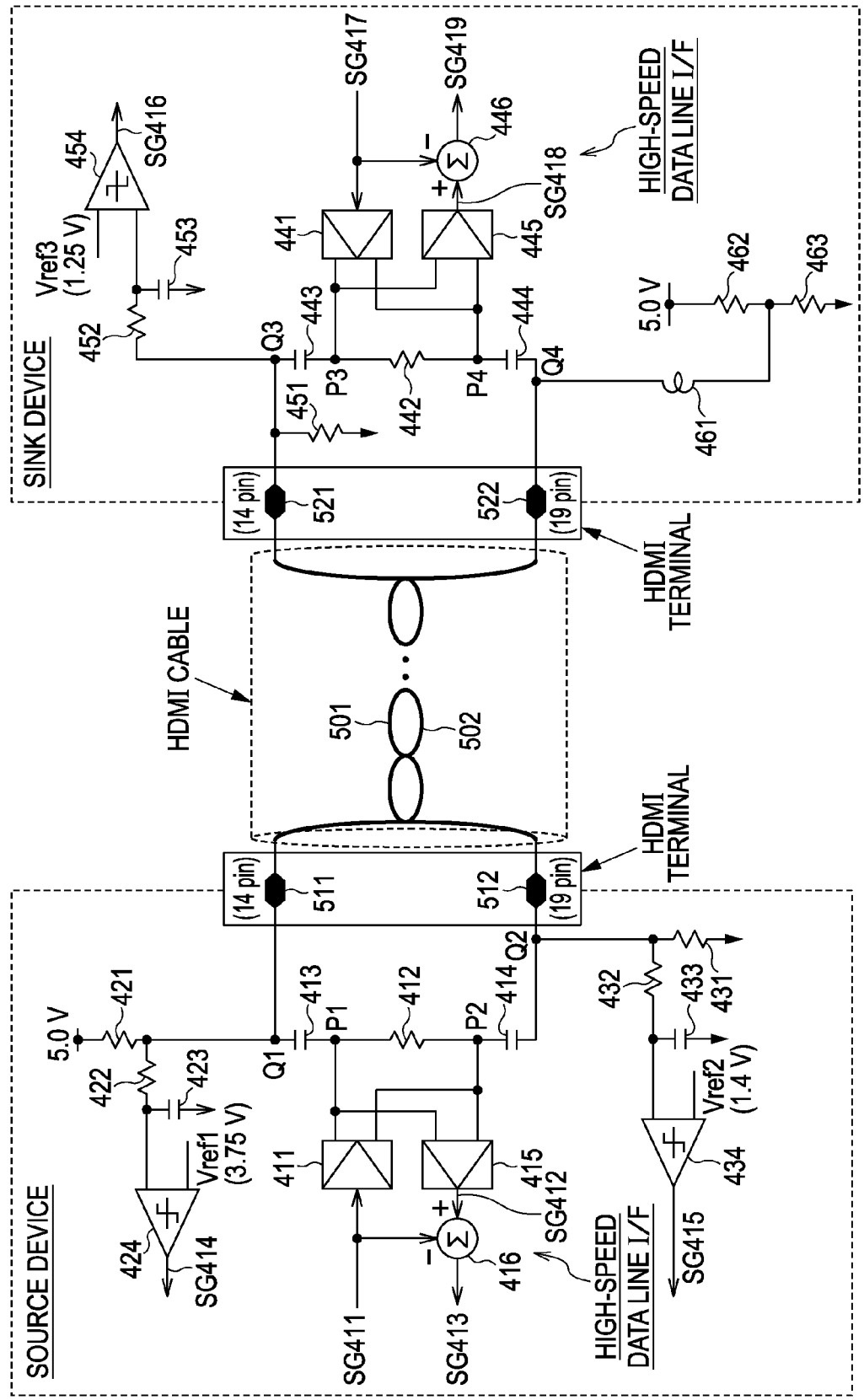
FIG. 9 is a connection diagram showing an example of the configuration of a high-speed data line interface, which is a bidirectional communication path formed by using a reserved line and HDD line of an HDMI cable, in a source device and a sink device.

FIG. 9 shows an example of the configuration of the high-speed data line interface of a source device and a sink device. This high-speed data line interface constitutes a communication section that performs LAN (Local Area Network) communication. This communication section performs communication by use of a bidirectional communication path formed by, among a plurality of lines constituting the HDMI cable, a pair of differential transmission lines, which in this embodiment are the reserved line (Ethernet+ line) corresponding to the reserve pin (14-pin), and the HPD line (Ethernet− line) corresponding to the HPD pin (19-pin).

The source device has a LAN signal transmitting circuit 411, a terminal resistor 412, AC coupling capacitors 413 and 414, a LAN signal receiving circuit 415, a subtraction circuit 416, a pullup resistor 421, a resistor 422 and a capacitor 423 that constitute a lowpass filter, a comparator 424, a pulldown resistor 431, a resistor 432 and a capacitor 433 that constitute a lowpass filter, and a comparator 434. Here, the high-speed data line interface (high-speed data line I/F) includes the LAN signal transmitting circuit 411, the terminal resistor 412, the AC coupling capacitors 413 and 414, the LAN signal receiving circuit 415, and the subtraction circuit 416.

A series circuit of the pullup resistor 421, the AC coupling capacitor 413, the terminal resistor 412, the AC coupling capacitor 414, and the pulldown resistor 431 is connected between a power supply line (+5.0 V) and a ground line. A connection point P1 between the AC coupling capacitor 413 and the terminal resistor 412 is connected to the positive output side of the LAN signal transmitting circuit 411, and is connected to the positive input side of the LAN signal receiving circuit 415. Also, a connection point P2 between the AC coupling capacitor 414 and the terminal resistor 412 is connected to the negative output side of the LAN signal transmitting circuit 411, and is connected to the negative input side of the LAN signal receiving circuit 415. The input side of the LAN signal transmitting circuit 411 is supplied with a transmission signal (transmission data) SG411.

Also, the positive terminal of the subtraction circuit 416 is supplied with an output signal SG412 of the LAN signal receiving circuit 415, and the negative terminal of this subtraction circuit 416 is supplied with the transmission signal (transmission data) SG411. In the subtraction circuit 416, the transmission signal SG411 is subtracted from the output signal SG412 of the LAN signal receiving circuit 415, and a reception signal (reception data) SG413 is obtained.

Also, a connection point Q1 between the pullup resistor 421 and the AC coupling capacitor 413 is connected to the ground line via a series circuit of the resistor 422 and the capacitor 423. Further, the output signal of a lowpass filter obtained at the connection point between the resistor 422 and the capacitor 423 is supplied to one input terminal of the comparator 424. In the comparator 424, the output signal of the lowpass filter is compared with a reference voltage Vref1 (+3.75 V) supplied to the other input terminal. An output signal SG414 of the comparator 424 is supplied to the control section (CPU) of the source device.

Also, a connection point Q2 between the AC coupling capacitor 414 and the pulldown resistor 431 is connected to the ground line via a series circuit of the resistor 432 and the capacitor 433. Further, the output signal of a lowpass filter obtained at the connection point between the resistor 432 and the capacitor 433 is supplied to one input terminal of the comparator 434. In the comparator 434, the output signal of the lowpass filter is compared with a reference voltage Vref2 (+1.4 V) supplied to the other input terminal. An output signal SG415 of the comparator 434 is supplied to the control section (CPU) of the source device.

The sink device has a LAN signal transmitting circuit 441, a terminal resistor 442, AC coupling capacitors 443 and 444, a LAN signal receiving circuit 445, a subtraction circuit 446, a pulldown resistor 451, a resistor 452 and a capacitor 453 that constitute a lowpass filter, a comparator 454, a choke coil 461, a resistor 462, and a resistor 463. Here, the high-speed data line interface (high-speed data line I/F) includes the LAN signal transmitting circuit 441, the terminal resistor 442, the AC coupling resistors 443 and 444, the LAN signal receiving circuit 445, and the subtraction circuit 446.

A series circuit of the resistor 462 and the resistor 463 is connected between the power supply line (+5.0 V) and the ground line. Further, a series circuit of the choke coil 461, the AC coupling resistor 444, the terminal resistor 442, the AC coupling resistor 443, and the pulldown resistor 451 is connected between the connection point between the resistor 462 and the resistor 463, and the ground line.

A connection point P3 between the AC coupling resistor 443 and the terminal resistor 442 is connected to the positive output side of the LAN signal transmitting circuit 441, and is connected to the positive input side of the LAN signal receiving circuit 445. Also, a connection point P4 between the AC coupling resistor 444 and the terminal resistor 442 is connected to the negative output side of the LAN signal transmitting circuit 441, and is connected to the negative input side of the LAN signal receiving circuit 445. The input side of the LAN signal transmitting circuit 441 is supplied with a transmission signal (transmission data) SG417.

Also, the positive terminal of the subtraction circuit 446 is supplied with an output signal SG418 of the LAN signal receiving circuit 445, and the negative terminal of the subtraction circuit 446 is supplied with the transmission signal SG417. In the subtraction circuit 446, the transmission signal SG417 is subtracted from the output signal SG418 of the LAN signal receiving circuit 445, and a reception signal (reception data) SG419 is obtained.

Also, a connection point Q3 between the pulldown resistor 451 and the AC coupling resistor 443 is connected to the ground line via a series circuit of the resistor 452 and the capacitor 453. Further, the output signal of a lowpass filter obtained at the connection point between the resistor 452 and the capacitor 453 is connected to one input terminal of the comparator 454. In the comparator 454, the output signal of the lowpass filter is compared with a reference voltage Vref3 (+1.25 V) supplied to the other input terminal. An output signal SG416 of the comparator 454 is supplied to the control section (CPU) of the sink device.

A reserved line 501 and an HPD line 502 included in the HDMI cable constitute a differential twisted pair. A source-side end 511 of the reserved line 501 is connected to 14-pin of the HDMI terminal of the source device, and a sink-side end 521 of the reserved line 501 is connected to 14-pin of the HDMI terminal of the sink device. Also, a source-side end 512 of the HPD line 502 is connected to 19-pin of the HDMI terminal of the source device, and a sink-side end 522 of the HPD line 502 is connected to 19-pin of the HDMI terminal of the sink device.

In the source device, the above-mentioned connection point Q1 between the pullup resistor 421 and the AC coupling capacitor 413 is connected to 14-pin of the HDMI terminal and, also, the above-mentioned connection point Q2 between the pulldown resistor 431 and the AC coupling capacitor 414 is connected to 19-pin of the HDMI terminal. On the other hand, in the sink device, the above-mentioned connection point Q3 between the pulldown resistor 451 and the AC coupling resistor 443 is connected to 14-pin of the HDMI terminal and, also, the above-mentioned connection point Q4 between the choke coil 461 and the AC coupling resistor 444 is connected to 19-pin of the HDMI terminal.

Next, a description will be given of operation of LAN communication by the high-speed data line interface configured as described above.

In the source device, the transmission signal (transmission data) SG411 is supplied to the input side of the LAN signal transmitting circuit 411, and differential signals (a positive output signal and a negative output signal) corresponding to the transmission signal SG411 are outputted from the LAN signal transmitting circuit 411. Then, the differential signals outputted from the LAN signal transmitting circuit 411 are supplied to the connection point P1 and P2, and transmitted to the sink device via the pair of differential transmission lines (the reserved line 501 and the HPD line 502) of the HDMI cable.

Also, in the sink device, the transmission signal (transmission data) SG417 is supplied to the input side of the LAN signal transmitting circuit 441, and differential signals (a positive output signal and a negative output signal) corresponding to the transmission signal SG417 are outputted from the LAN signal transmitting circuit 441. Then, the differential signals outputted from the LAN signal transmitting circuit 441 are supplied to the connection points P3 and P4, and transmitted to the source device via the pair of lines (the reserved line 501 and the HPD line 502) of the HDMI cable.

Also, in the source device, since the input side of the LAN signal receiving circuit 415 is connected to the connection points P1 and P2, the sum signal of a transmission signal corresponding to the differential signal (current signal) outputted from the LAN signal transmitting circuit 411, and a reception signal corresponding to the differential signal transmitted from the sink device as described above, is obtained as the output signal SG412 of the LAN signal receiving circuit 415. In the subtraction circuit 416, the transmission signal SG411 is subtracted from the output signal SG412 of the LAN signal receiving circuit 415. Hence, the output signal SG413 of the subtraction circuit 416 corresponds to the transmission signal (transmission data) SG417 of the sink device.

Also, in the sink device, since the input side of the LAN signal receiving circuit 445 is connected to the connection points P3 and P4, the sum signal of a transmission signal corresponding to the differential signal (current signal) outputted from the LAN signal transmitting circuit 441, and a reception signal corresponding to the differential signal transmitted from the source device as described above, is obtained as the output signal SG418 of the LAN signal receiving circuit 445. In the subtraction circuit 446, the transmission signal SG417 is subtracted from the output signal SG418 of the LAN signal receiving circuit 445. Hence, the output signal SG419 of the subtraction circuit 446 corresponds to the transmission signal (transmission data) SG411 of the source device.

In this way, bidirectional LAN communication can be performed between the high-speed data line interface of the source device and the high-speed data line interface of the sink device.

It should be noted that, in FIG. 9, the HPD line 502 notifies the source device of the connection of the HDMI cable with the sink device by means of a DC bias level, in addition to performing the above-mentioned LAN communication. That is, when the HDMI cable is connected to the sink device, the resistors 462 and 463 and the choke coil 461 in the sink device bias the HPD line 502 to approximately 4 V via 19-pin of the HDMI terminal. The source device detects the DC bias of the HPD line 502 through a lowpass filter formed by the resistor 432 and the capacitor 433, which is compared with the reference voltage Vref2 (for example, 1.4 V) through the comparator 434.

If the HDMI cable is not connected to the sink device, the voltage on 19-pin of the HDMI terminal of the source device is lower than the reference voltage Vref2 due to the presence of the pulldown resistor 431 and is, conversely, higher than the reference voltage Vref2 if the HDMI cable is connected to the sink device. Therefore, the output signal SG415 of the comparator 434 is at the high level when the HDMI cable is connected to the sink device, and is otherwise at the low level. Consequently, the control section (CPU) of the source device can recognize whether or not the HDMI cable is connected with the sink device on the basis of the output signal SG415 of the comparator 434.

Also, in FIG. 9, devices connected at both ends of the HDMI cable have the capability of mutually recognizing whether the other device is a device capable of LAN communication (hereafter referred to as "eHDMI compliant device") or a device not capable of LAN communication (hereafter referred to as "eHDMI non-compliant device"), by means of the DC bias potential of the reserved line 501.

As described above, the source device pulls up (+5 V) the reserved line 501 by the resistor 421, and the sink device pulls down the reserved line 501 by the resistor 451. The resistor 421, 451 is not present in an eHDMI non-compliant device.

As described above, the source device compares the DC potential of the reserved line 501 that has passed the lowpass filter formed by the resistor 422 and the capacitor 423, with the reference voltage Vref1 by the comparator 424. If the sink device is an eHDMI compliant device and has the pulldown resistor 451, the voltage of the reserved line 501 is 2.5 V. However, if the sink device is an eHDMI non-compliant device and does not have the pulldown resistor 451, the voltage of the reserved line 501 is 5 V due to the presence of the pullup resistor 421.

Hence, if the reference voltage Vref1 is set as, for example, 3.75 V, the output signal SG414 of the comparator 424 becomes low level when the sink device is an eHDMI compliant device, and otherwise becomes high level. Consequently, the control section (CPU) of the source device can recognize whether or not the sink device is an eHDMI compliant device, on the basis of the output signal SG414 of the comparator 424.

Likewise, as described above, the sink device compares the DC potential of the reserved line 501 that has passed the lowpass filter formed by the resistor 452 and the capacitor 453, with the reference voltage Vref3 by the comparator 454. If the source device is an eHDMI compliant device and has the pullup resistor 421, the voltage of the reserved line 501 is 2.5 V. However, if the source device is an eHDMI non-compliant device and does not have the pullup resistor 421, the voltage of the reserved line 501 is 0 V due to the presence of the pulldown resistor 451.

Hence, if the reference voltage Vref3 is set as, for example, 1.25 V, the output signal SG416 of the comparator 454 becomes high level when the source device is an eHDMI compliant device, and otherwise becomes low level. Consequently, the control section (CPU) of the sink device can recognize whether or not the source device is an e-HDMI device, on the basis of output signal SG416 of the comparator 454.

According to the example of configuration shown in FIG. 9, in the case of an interface in which a single HDMI cable performs the transmission of image (video) and audio data, the exchange and authentication of connected device information, the communication of device control data, and LAN communication, LAN communication is performed by means of bidirectional communication via a single pair of differential transmission paths, and the connection status of the interface is notified by means of the DC bias potential of at least one of the transmission paths, thereby enabling spatial separation with no SCL line and SDA line physically used for LAN communication. As a result, a circuit for LAN communication can be formed without regard to the electrical specifications defined for DDC, thereby realizing stable and reliable LAN communication at low cost.

It should be noted that the pullup resistor 421 shown in FIG. 9 may be provided not within the source device but within the HDMI cable. In such a case, the respective terminals of the pullup resistor 421 are connected to the reserved line 501, and a line (signal line) connected to the power supply (power supply potential), respectively, of the lines provided within the HDMI cable.

Further, the pulldown resistor 451 and the resistor 463 shown in FIG. 9 may be provided not within the sink device but within the HDMI cable. In such a case, the respective terminals of the pulldown resistor 451 are connected to the reserved line 501, and a line (ground line) connected to the ground (reference potential), respectively, of the lines provided within the HDMI cable. Also, the respective terminals of the resistor 463 are connected to the HPD line 502, and a line (ground line) connected to the ground (reference potential), respectively, of the lines provided within the HDMI cable.

Next, transmission modes for 3D image data will be described. First, a description will be given of the case in which the 3D image data of an original signal is formed by left-eye (L) image and right-eye (R) image data. Here, the description is directed to the case in which the left-eye (L) and right-eye (R) image data are each image data in a 1920×1080p pixel format. When transmitting this original signal via a baseband digital interface, for example, the following six transmission modes are conceivable.

Modes (1) to (3) are the most desirable modes because transmission is possible without causing degradation in the quality of the original signal. However, since twice the current transmission bandwidth is necessary, these modes are possible when sufficient transmission bandwidth is available. Also, Modes (4) to (6) are modes for transmitting 3D image data with the current transmission bandwidth of 1920×1080p.

Mode (1) is a mode in which, as shown in FIG. 11(a), the pixel data of left eye image data and the pixel data of right eye image data are switched sequentially at every TMDS clock. In this case, while the frequency of the pixel clock may be the same as in the related art, a circuit for pixel-by-pixel switching is necessary. It should be noted that while the number of pixels in the horizontal direction is 3840 pixels in FIG. 11(a), two lines of 1920 pixels may be used.

Mode (2) is a mode in which, as shown in FIG. 11(b), one line of left eye image data and one line of right eye image data are transmitted alternately, and lines are switched by a line memory. In this case, as the video format, it is necessary to define a new video format of 1920×2160.

Mode (3) is a mode in which, as shown in FIG. 11(c), left eye image data and right eye image data are switched sequentially field by field. In this case, while a field memory is necessary for the switching process, signal processing in the source device becomes simplest.

Mode (4) is a mode in which, as shown in FIG. 12(a), one line of left eye image data and one line of right eye image data are transmitted alternately. In this case, the lines of the left eye image data and right eye image data are each thinned to ½. This mode corresponds to the very video signal in the stereoscopic image display mode called "phase difference plate mode" described above, and while it is a mode that makes signal processing in the display section of the sink device simplest, the vertical resolution becomes half with respect to the original signal.

Mode (5) is a mode in which, as shown in FIG. 12(b), the data of each line of left eye image data is transmitted in the first half of the vertical direction, and the data of each line of left eye image data is transmitted in the second half of the vertical direction. In this case, as in the above-described mode (4), while the vertical resolution becomes half with respect to the original signal since the lines of the left eye image data and right eye image data are thinned to ½, there is no need for line-by-line switching.

Mode (6) is the "Side By Side" mode currently used for experimental broadcasting, in which, as shown in FIG. 12(c), the pixel data of left eye image data is transmitted in the first half of the horizontal direction, and the pixel data of right eye image data is transmitted in the second half of the horizontal direction. In this case, since the pixel data in the horizontal direction is thinned to ½ in each of the left eye image data and the right eye image data, the horizontal resolution becomes ½ in comparison to Mode (4) and Mode (5) described above. However, since the contents can be judged even with sink devices that do not support 3D image data, the mode has high compatibility with the display sections of sink devices in the related art.

When one of Modes (1) to (6) described above is selected, the 3D signal processing section 229 of the disc player 210 described above performs a process of generating synthesized data (see FIGS. 11(a) to 11(c) and FIGS. 12(a) to 12(c)) appropriate to the selected transmission mode, from the 3D image data (left eye (L) image and right eye (R) image data) of the original signal. Also, in that case, the 3D signal processing section 254 of the television receiver 250 described above performs a process of separating and extracting the left eye (L) image data and the right eye (R) image data from the synthesized data.

Next, a description will be given of transmission data and its packing format in Modes (1) to (6) described above.

Figure 13:
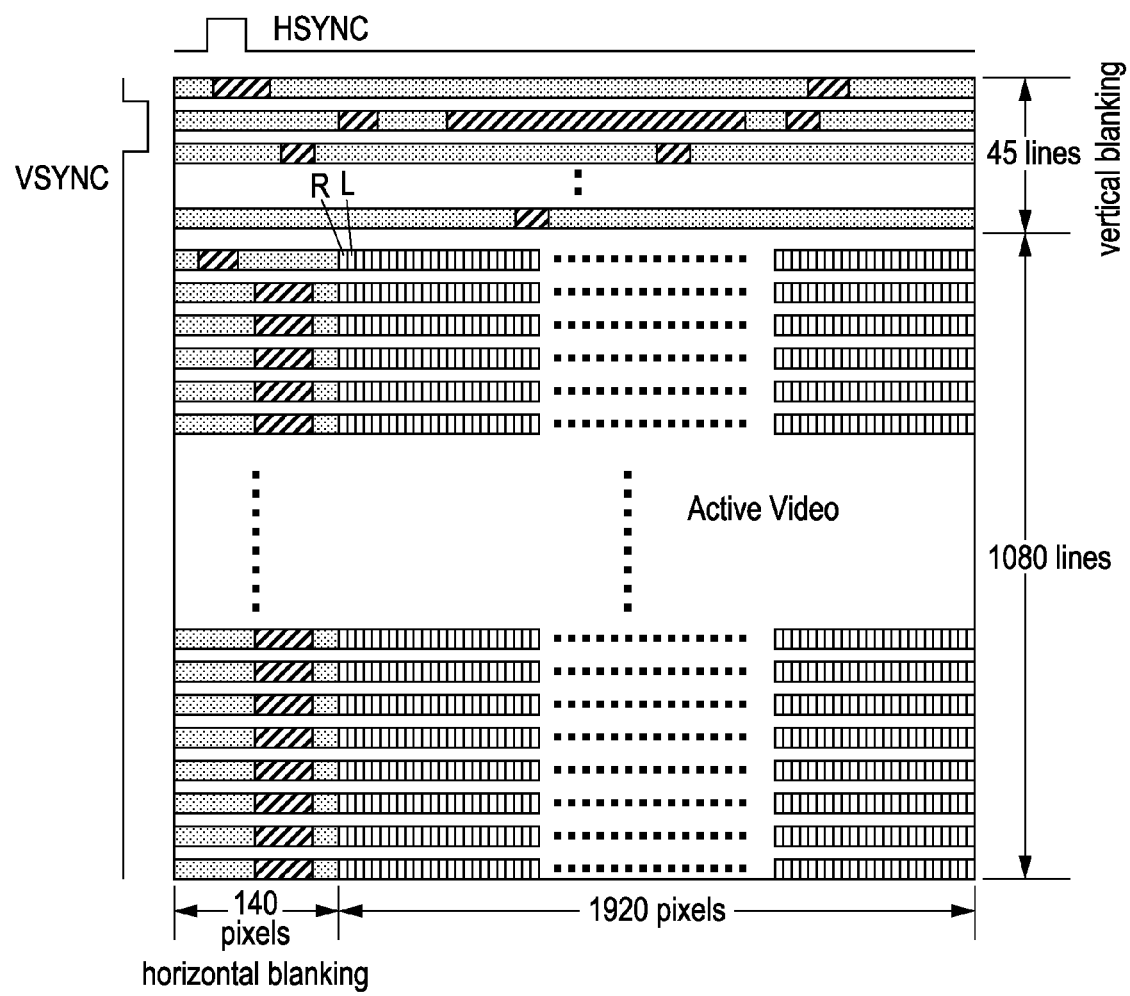
FIG. 13 is a diagram showing an example of TMDS transmission data in a mode (Mode (1)) in which the pixel data of left eye image data and the pixel data of right eye image data are transmitted while being switched sequentially at every TMDS clock.

FIG. 13 shows an example of TMDS transmission data in Mode (1). In this case, the data of 3840 pixels×1080 lines of active pixels (synthesized data of left eye (L) image data and right eye (R) image data) is placed in the Active Video period of 1920 pixels×1080 lines.

Figure 14:
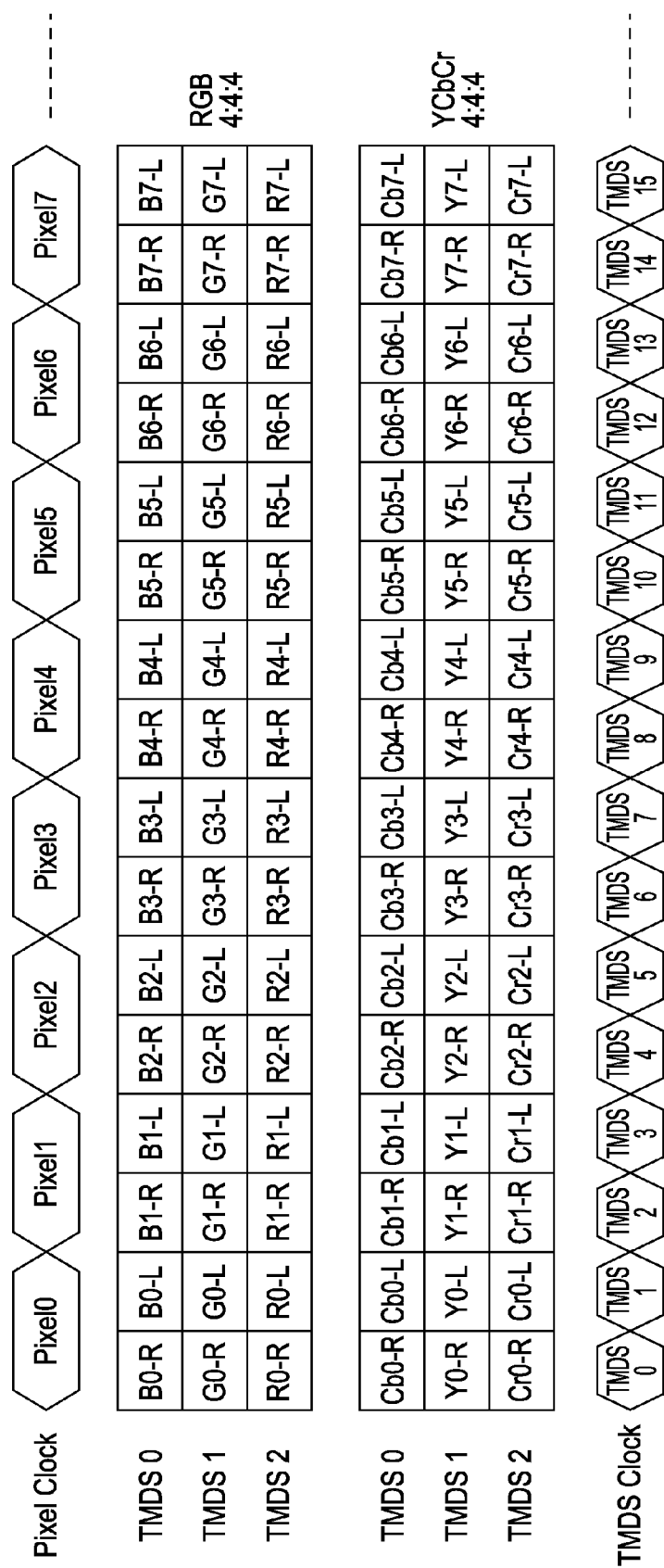
FIG. 14 is a diagram showing an example of packing format when transmitting 3D image data in Mode (1) on three TMDS channels #0, #1, and #2 of HDMI.

FIG. 14 shows an example of packing format when transmitting 3D image data in Mode (1) on the three TMDS channels #0, #1, and #2 of HDMI. Two modes, RGB 4:4:4 and YCbCr 4:4:4, are shown as transmission modes for image data. Here, the relationship between a TMDS clock and a pixel clock is such that TMDS clock=2×pixel clock.

In the RGB 4:4:4 mode, 8-bit blue (B) data, 8-bit green (G) data, and 8-bit red (R) data, which constitute the pixel data of right eye (R) image data, are placed in the data areas in the first half of individual pixels in the TMDS channels #0, #1, and #2, respectively. Also, in the RGB 4:4:4 mode, 8-bit blue (B) data, 8-bit green (G) data, and 8-bit red (R) data, which constitute the pixel data of left eye (L) image data, are placed in the data areas in the second half of individual pixels in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of right eye (R) image data, are placed in the data areas in the first half of individual pixels in the TMDS channels #0, #1, and #2, respectively. Also, in the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the data areas in the second half of individual pixels in the TMDS channels #0, #1, and #2, respectively.

It should be noted that in this Mode (1), left eye image data may be placed in the data area in the first half of each pixel, and right eye image data may be placed in the data area in the second half of each pixel.

Figure 15:
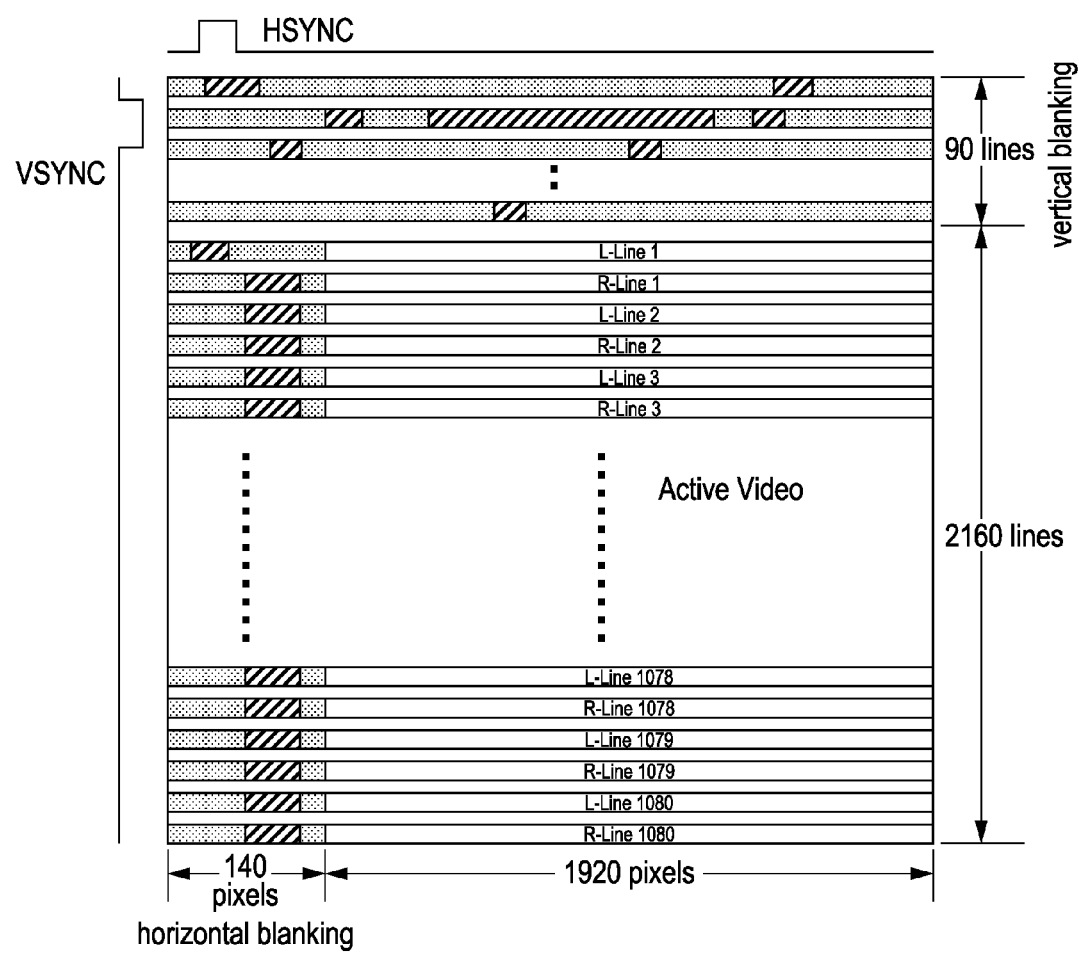
FIG. 15 is a diagram showing an example of TMDS transmission data in a mode (Mode (2)) in which one line of left eye image data and one line of right eye image data are transmitted alternately.

FIG. 15 shows an example of TMDS transmission data in Mode (2). In this case, the data of 1920 pixels×2160 lines of active pixels (synthesized data of left eye (L) image data and right eye (R) image data) is placed in the Active Video period of 1920 pixels×2160 lines.

Figure 16:
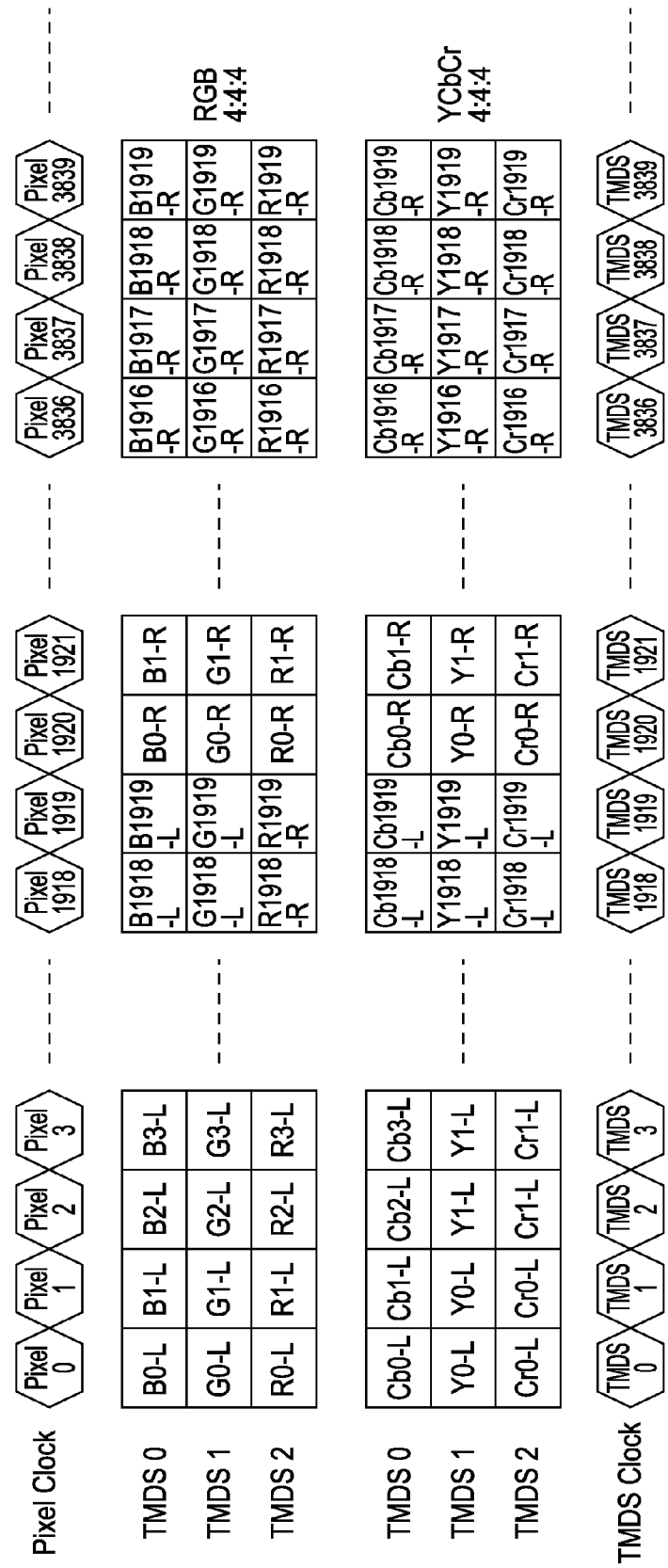
FIG. 16 is a diagram showing an example of packing format when transmitting 3D image data in Mode (2) on three TMDS channels #0, #1, and #2 of HDMI.

FIG. 16 shows an example of packing format when transmitting 3D image data in Mode (2) on the three TMDS channels #0, #1, and #2 of HDMI. Two modes, RGB 4:4:4 and YCbCr 4:4:4, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data, which constitute the pixel data of left eye (L) image data, are placed in the data areas of individual pixels in odd-numbered lines in the TMDS channels #0, #1, and #2, respectively. Also, in this RGB 4:4:4 mode, 8-bit blue (B) data, 8-bit green (G) data, and 8-bit red (R) data, which constitute the pixel data of right eye (R) image data, are placed in the data areas of individual pixels in even-numbered lines in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the data areas of individual pixels in odd-numbered lines in the TMDS channels #0, #1, and #2, respectively. Also, in this YCbCr 4:4:4 mode, 8-bit blue chrominance (Cb) data, 8-bit luminance (Y) data, and 8-bit red chrominance (Cr) data, which constitute the pixel data of right eye (R) image data, are placed in the data areas of individual pixels in even-numbered lines in the TMDS channels #0, #1, and #2, respectively.

It should be noted that in this Mode (2), right eye image data may be placed in odd-numbered lines, and left eye image data may be placed in even-numbered lines.

Figure 17:
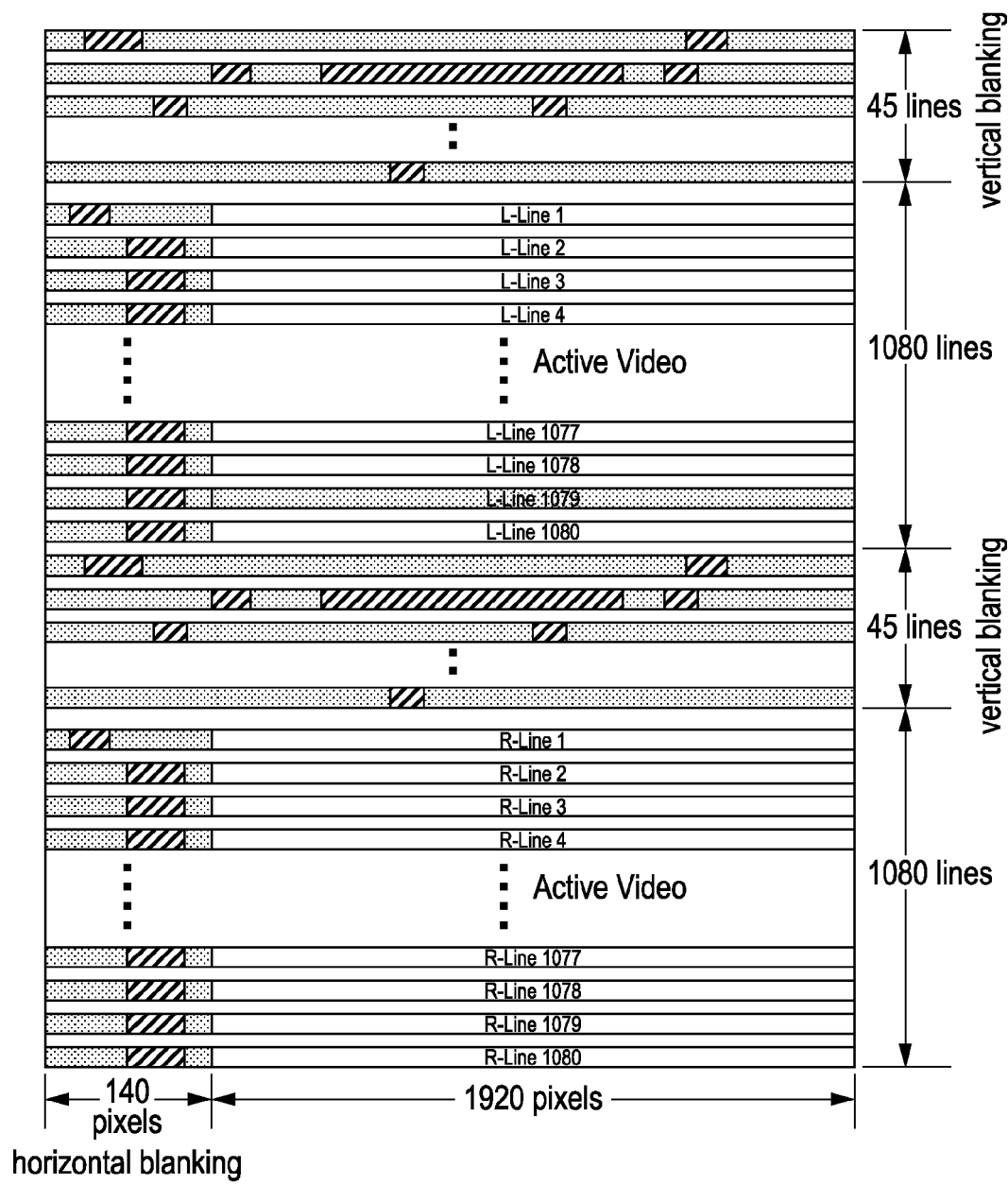
FIG. 17 is a diagram showing an example of TMDS transmission data in a mode (Mode (3)) in which left eye image data and right eye image data are switched sequentially field by field.

FIG. 17 shows an example of TMDS transmission data in Mode (3). In this case, the left eye (L) image data of 1920 pixels×1080 lines of active pixels is placed in the odd-numbered fields of the Active Video period of 1920 pixels× 1080 lines. Also, the right eye (R) image data of 1920 pixels×1080 lines of active pixels is placed in the even-numbered fields of the Active Video period of 1920 pixels×1080 lines.

Figure 18:
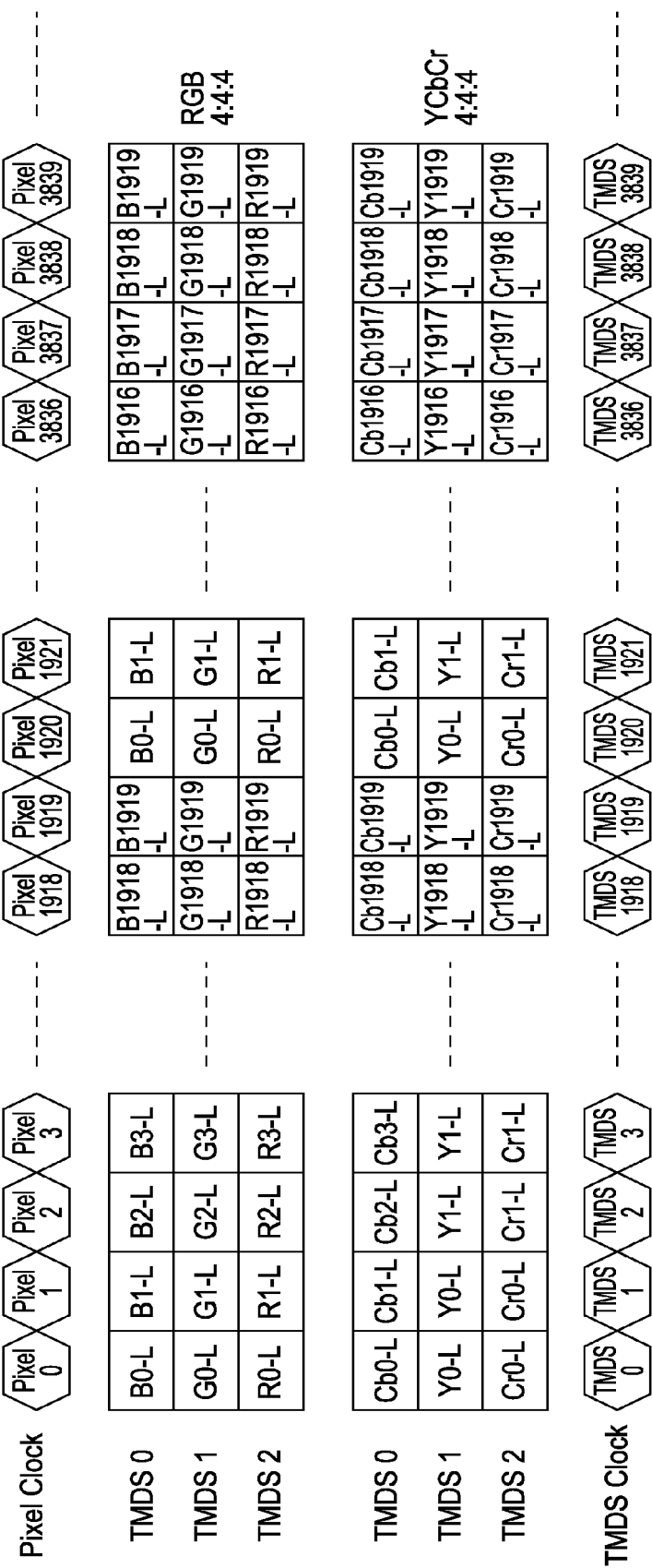
FIG. 18 is a diagram showing an example of the packing format in odd-numbered fields when transmitting 3D image data in Mode (3) on three TMDS channels #0, #1, and #2 of HDMI.
Figure 19:
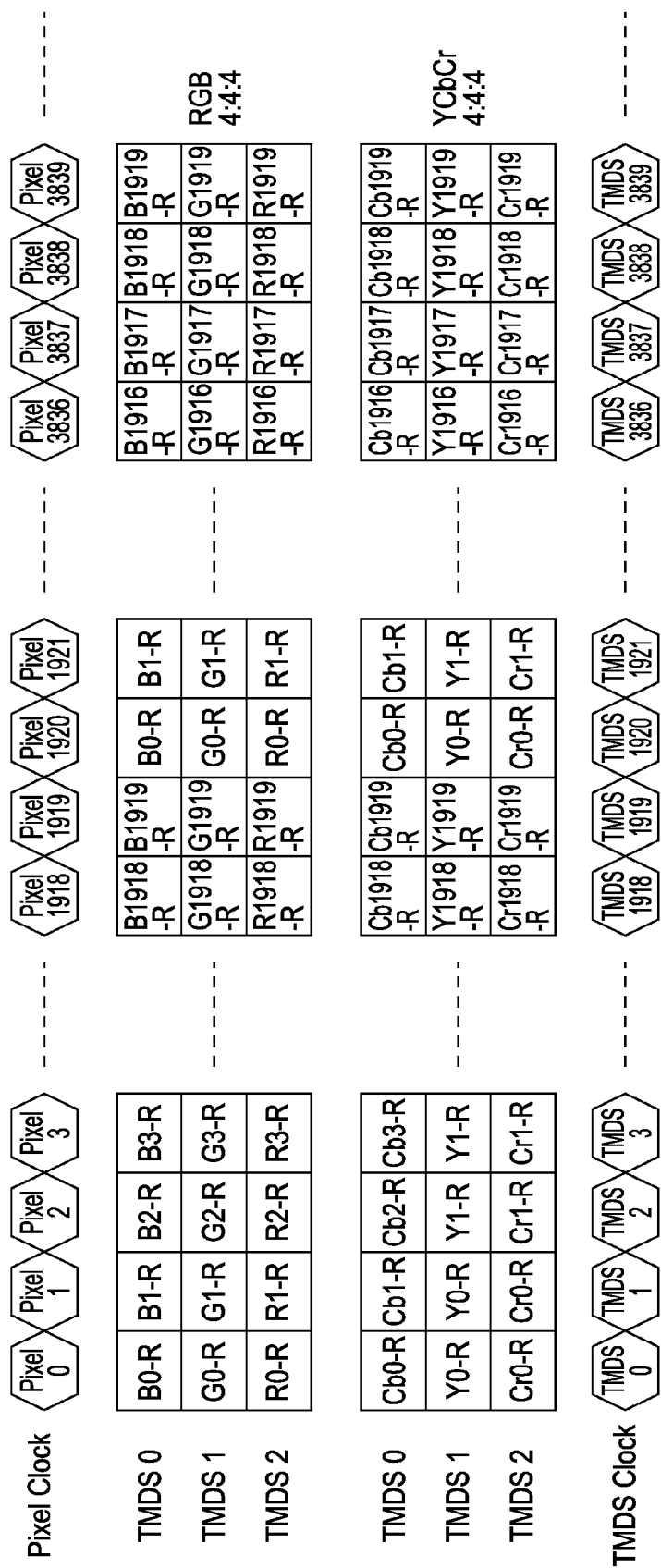
FIG. 19 is a diagram showing an example of the packing format in even-numbered fields when transmitting 3D image data in Mode (3) on three TMDS channels #0, #1, and #2 of HDMI.

FIG. 18 and FIG. 19 show an example of packing format when transmitting 3D image data in Mode (3) on the three TMDS channels #0, #1, and #2 of HDMI. Two modes, RGB 4:4:4 and YCbCr 4:4:4, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data, which constitute the pixel data of left eye (L) image data, are placed in the data areas of individual pixels in odd-numbered fields in the TMDS channels #0, #1, and #2, respectively. Also, in this RGB 4:4:4 mode, 8-bit blue (B) data, 8-bit green (G) data, and 8-bit red (R) data, which constitute the pixel data of right eye (R) image data, are placed in the data areas of individual pixels in even-numbered fields in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the data areas of individual pixels in odd-numbered fields in the TMDS channels #0, #1, and #2, respectively. Also, in this YCbCr 4:4:4 mode, 8-bit blue chrominance (Cb) data, 8-bit luminance (Y) data, and 8-bit red chrominance (Cr) data, which constitute the pixel data of right eye (R) image data, are placed in the data areas in the second half of individual pixels in even-numbered fields in the TMDS channels #0, #1, and #2, respectively.

It should be noted that in this Mode (3), right eye image data may be placed in the data areas of individual pixels in odd-numbered fields, and left eye image data may be placed in the data areas of individual pixels in even-numbered fields.

Figure 20:
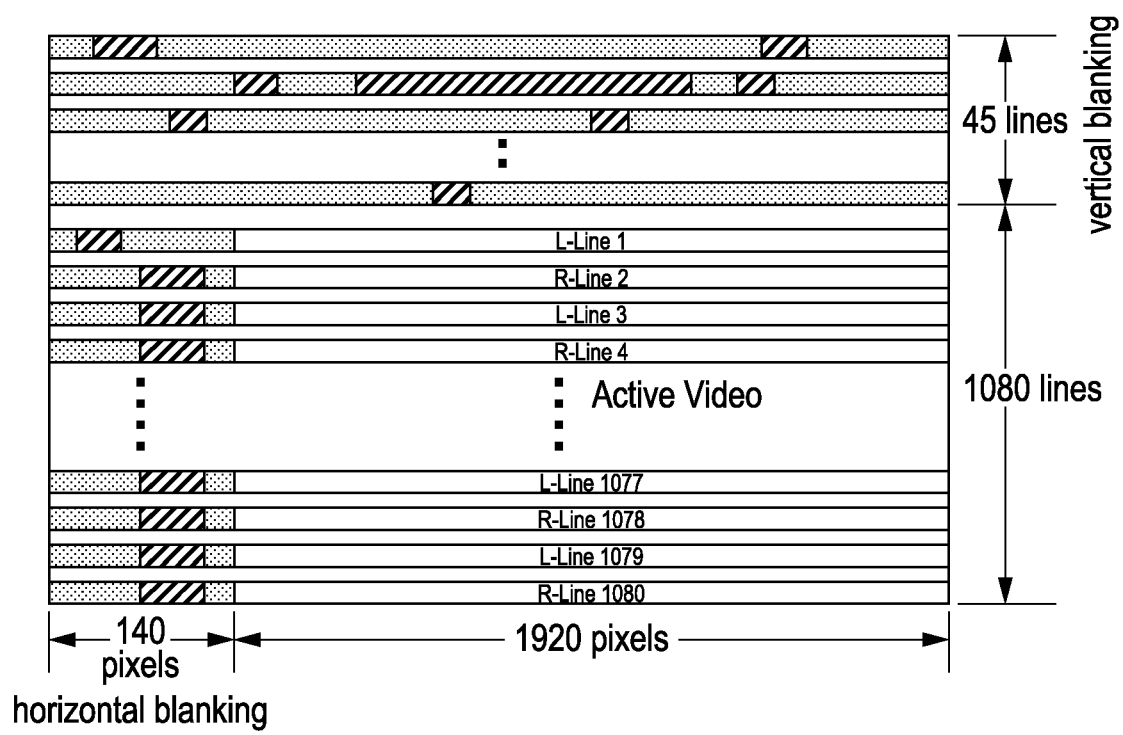
FIG. 20 is a diagram showing an example of TMDS transmission data in a mode (Mode (4)) in which one line of left eye image data and one line of right eye image data are transmitted alternately.

FIG. 20 shows an example of TMDS transmission data in Mode (4). In this case, the data of 1920 pixels×1080 lines of active pixels (synthesized data of left eye (L) image data and right eye (R) image data) is placed in the Active Video period of 1920 pixels×1080 lines.

It should be noted that in the case of this Mode (4), as described above, the lines in the vertical direction of each of left eye image data and right eye image data are thinned to ½. Here, the left eye image data to be transmitted is either odd-numbered lines or even-numbered lines and, likewise, the right eye image data to be transmitted is either odd-numbered lines or even-numbered lines. Therefore, there are four possible combinations, in which both the left eye image data and the right eye image data is odd-numbered lines, both the left eye image data and the right eye image data is even-numbered lines, the left eye image data is odd-numbered lines and the right eye image data is even-numbered lines, and the left eye image data is even-numbered lines and the right eye image data is odd-numbered lines. FIG. 20 shows the case in which the left eye image data is odd-numbered lines and the right eye image data is even-numbered lines.

Figure 21:
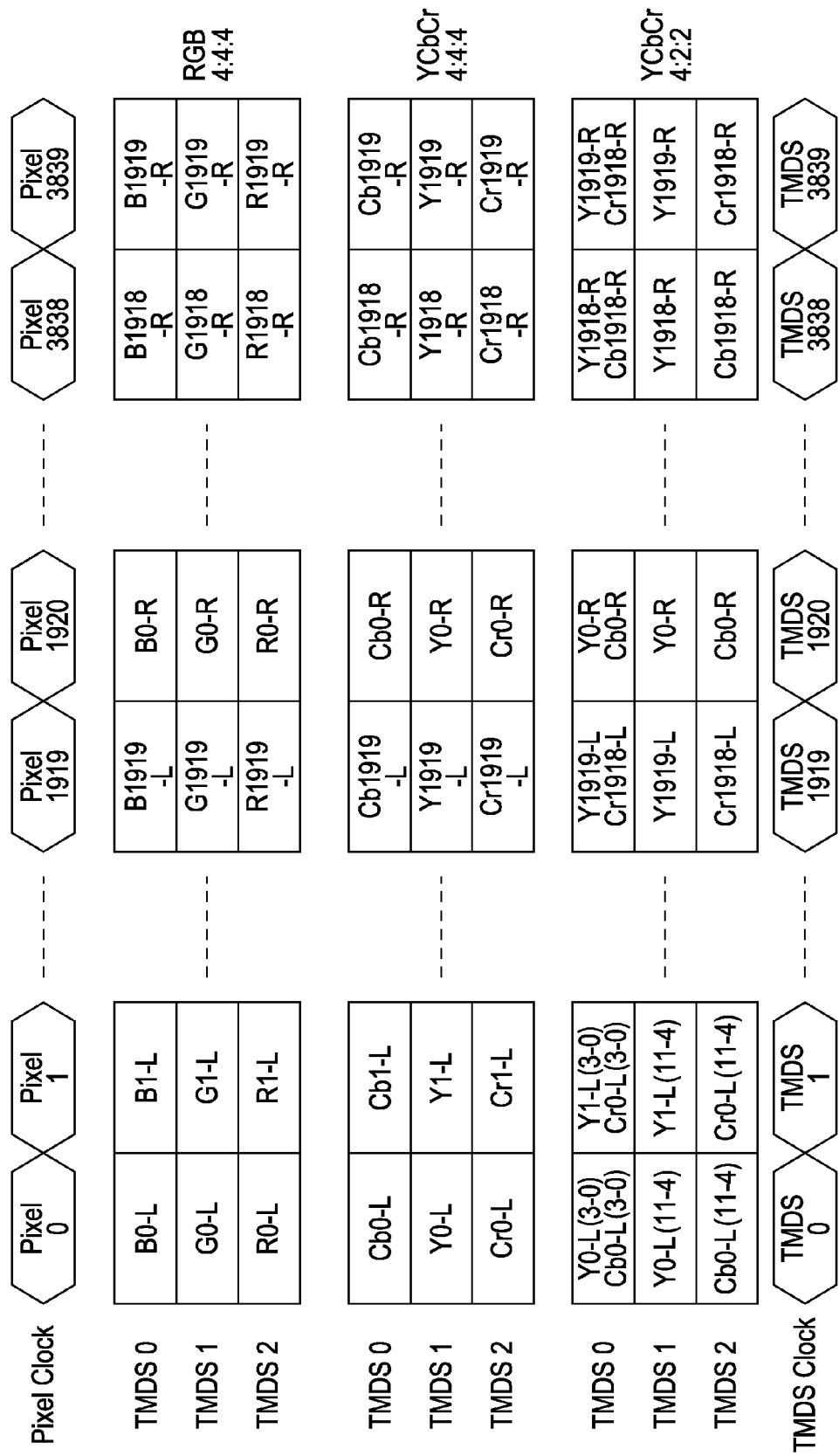
FIG. 21 is a diagram showing an example of packing format when transmitting 3D image data in Mode (4) on three TMDS channels #0, #1, and #2 of HDMI.

FIG. 21 shows an example of packing format when transmitting 3D image data in Mode (4) on the three TMDS channels #0, #1, and #2 of HDMI. Three modes, RGB 4:4:4, YCbCr 4:4:4, and YCbCr 4:2:2, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data, which constitute the pixel data of left eye (L) image data, are placed in the data areas of individual pixels in odd-numbered lines in the TMDS channels #0, #1, and #2, respectively. Also, in this RGB 4:4:4 mode, 8-bit blue (B) data, 8-bit green (G) data, and 8-bit red (R) data, which constitute the pixel data of right eye (R) image data, are placed in the data areas of individual pixels in even-numbered lines in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the data areas of individual pixels in odd-numbered lines in the TMDS channels #0, #1, and #2, respectively. Also, in this YCbCr 4:4:4 mode, 8-bit blue chrominance (Cb) data, 8-bit luminance (Y) data, and 8-bit red chrominance (Cr) data, which constitute the pixel data of right eye (R) image data, are placed in the data areas of individual pixels in even-numbered lines in the TMDS channels #0, #1, and #2, respectively.

In the YCbCr 2:2:2 mode, in the data areas of individual pixels in odd-numbered lines in the TMDS channel #0, the data of bit 0 to bit 3 of luminance (Y) data constituting the pixel data of left eye (L) image data is placed, and also the data of bit 0 to bit 3 of blue chrominance (Cb) data and the data of bit 0 to bit 3 of red chrominance (Cr) data are placed alternately pixel by pixel. Also, in the YCbCr 4:2:2 mode, in the data areas of individual pixels in odd-numbered lines in the TMDS channel #1, the data of bit 4 to bit 11 of luminance (Y) data of left eye (L) image data is placed. Also, in the YCbCr 4:2:2 mode, in the data areas of individual pixels in odd-numbered lines in the TMDS channel #2, the data of bit 4 to bit 11 of blue chrominance (Cb) data and data of bit 4 to bit 11 of red chrominance (Cr) data of left eye (L) image data are placed alternately pixel by pixel.

Also, in the YCbCr 4:2:2 mode, in the data areas of individual pixels in even-numbered lines in the TMDS channel #0, the data of bit 0 to bit 3 of luminance (Y) data constituting the pixel data of right eye (R) image data is placed, and also the data of bit 0 to bit 3 of blue chrominance (Cb) data and the data of bit 0 to bit 3 of red chrominance (Cr) data are placed alternately pixel by pixel. Also, in the YCbCr 4:2:2 mode, in the data areas of individual pixels in even-numbered lines in the TMDS channel #1, the data of bit 4 to bit 11 of luminance (Y) data of right eye (R) image data is placed. Also, in the YCbCr 4:2:2 mode, in the data areas of individual pixels in even-numbered lines in the TMDS channel #2, the data of bit 4 to bit 11 of blue chrominance (Cb) data and data of bit 4 to bit 11 of red chrominance (Cr) data of right eye (R) image data are placed alternately pixel by pixel.

It should be noted that in this Mode (4), right eye image data may be placed in odd-numbered lines, and left eye image data may be placed in even-numbered lines.

Figure 22:
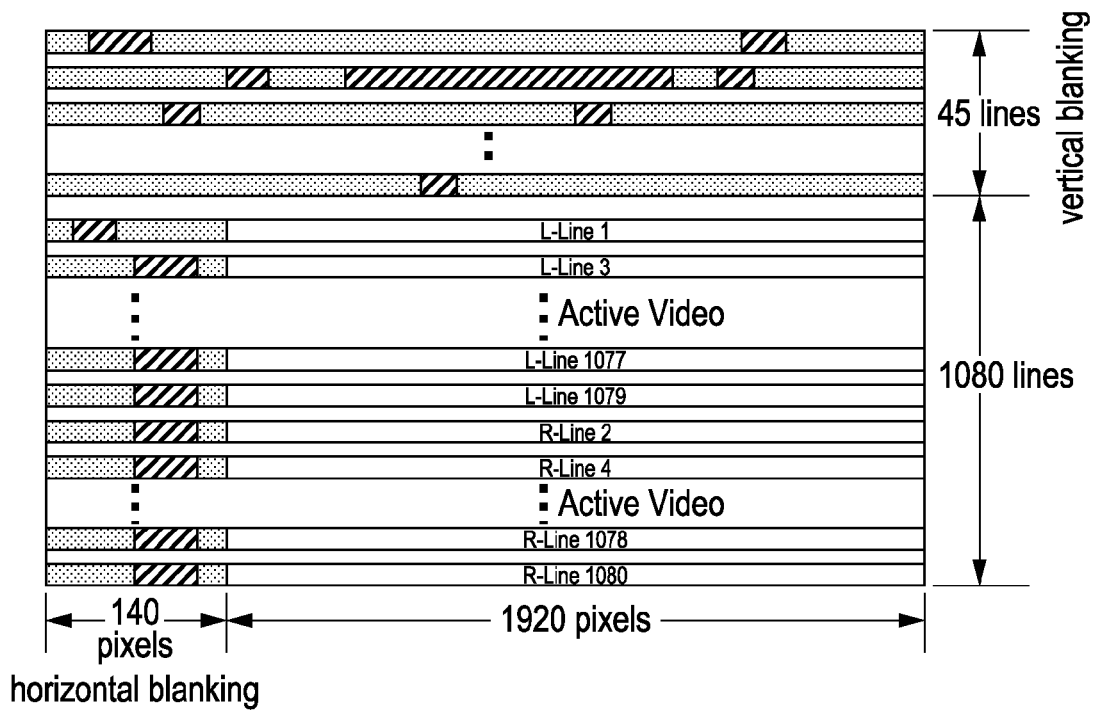
FIG. 22 is a diagram showing an example of TMDS transmission data in a mode (Mode (5)) in which the data of each line of left eye image data is transmitted in the first half of the vertical direction, and the data of each line of left eye image data is transmitted in the second half of the vertical direction.

FIG. 22 shows an example of TMDS transmission data in Mode (5). In this case, the data of 1920 pixels×1080 lines of active pixels (synthesized data of left eye (L) image data and right eye (R) image data) is placed in the Active Video period of 1920 pixels×1080 lines.

It should be noted that in the case of this Mode (5), as described above, the lines in the vertical direction of each of left eye image data and right eye image data are thinned to ½. Here, the left eye image data to be transmitted is either odd-numbered lines or even-numbered lines and, likewise, the right eye image data to be transmitted is either odd-numbered lines or even-numbered lines. Therefore, there are four possible combinations, in which both the left eye image data and the right eye image data is odd-numbered lines, both the left eye image data and the right eye image data is even-numbered lines, the left eye image data is odd-numbered lines and the right eye image data is even-numbered lines, and the left eye image data is even-numbered lines and the right eye image data is odd-numbered lines. FIG. 22 shows the case in which the left eye image data is odd-numbered lines and the right eye image data is even-numbered lines.

Figure 23:
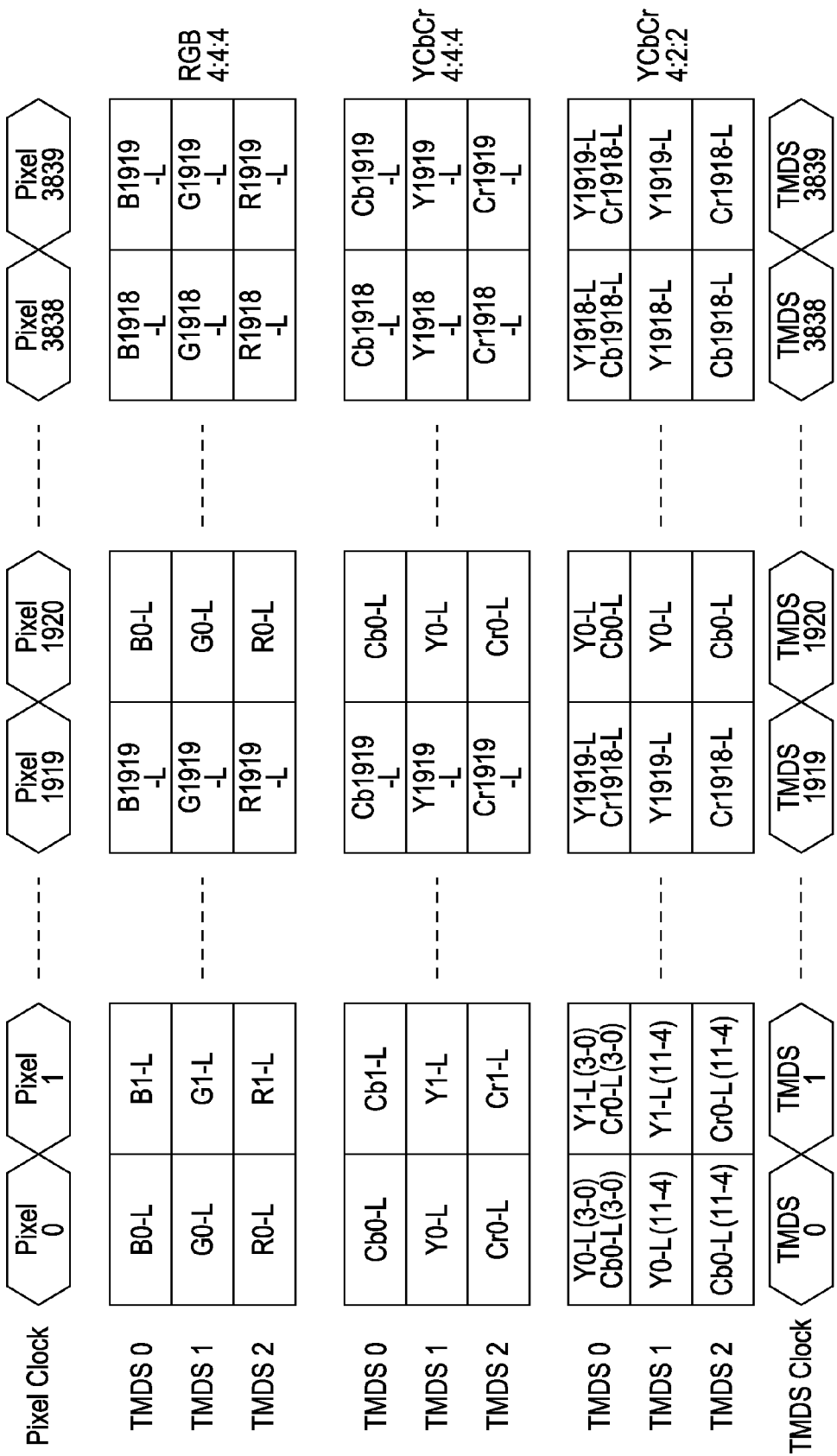
FIG. 23 is a diagram showing an example of packing format in the first vertical half when transmitting 3D image data in Mode (5) on three TMDS channels #0, #1, and #2 of HDMI.
Figure 24:
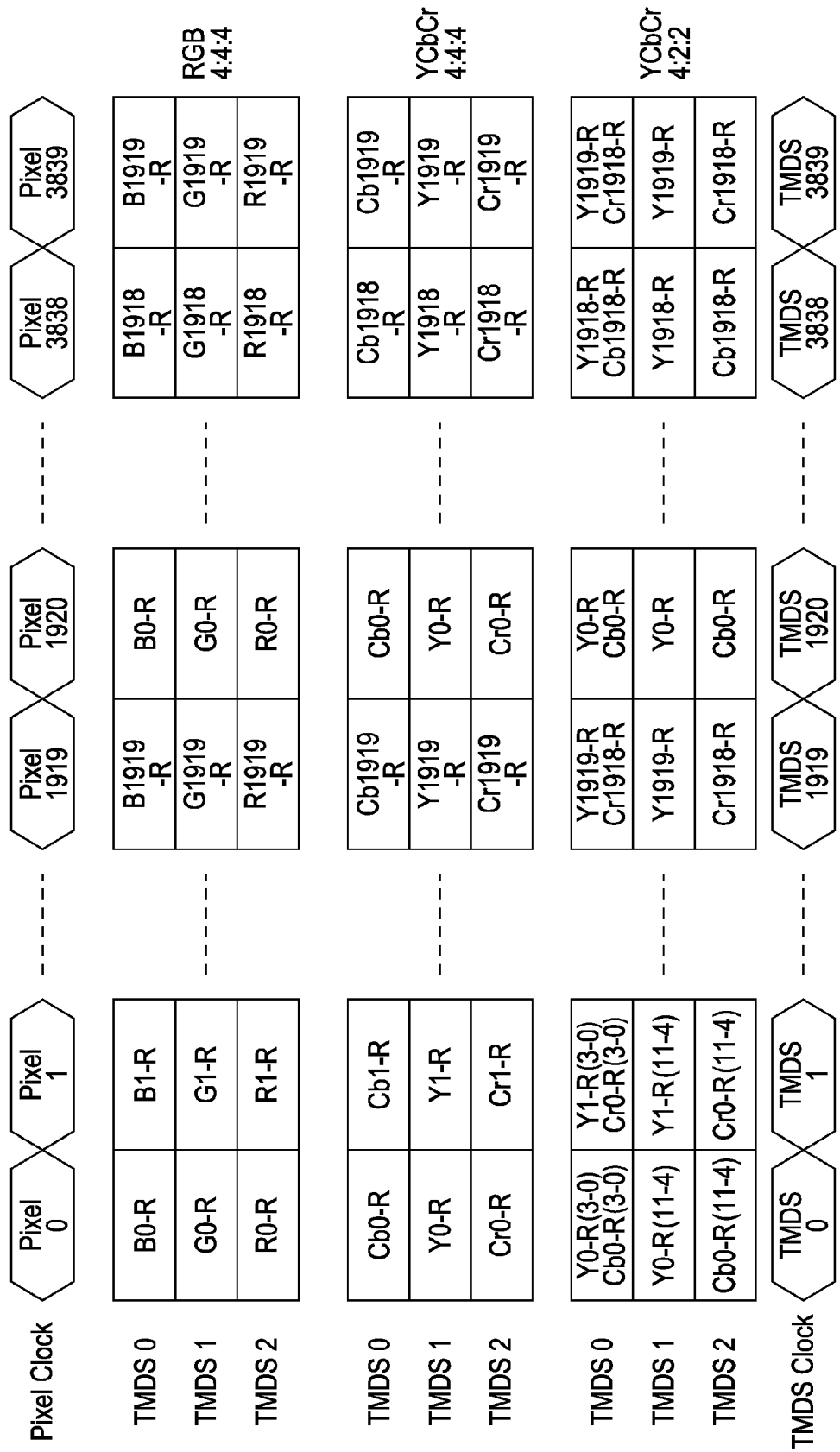
FIG. 24 is a diagram showing an example of packing format in the second vertical half when transmitting 3D image data in Mode (5) on three TMDS channels #0, #1, and #2 of HDMI.

FIG. 23 and FIG. 24 show an example of packing format when transmitting 3D image data in Mode (5) on the three TMDS channels #0, #1, and #2 of HDMI. Three modes, RGB 4:4:4, YCbCr 4:4:4, and YCbCr 4:2:2, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data, which constitute the pixel data of left eye (L) image data, are placed in the first vertical half of the data areas of individual pixels in the TMDS channels #0, #1, and #2, respectively. Also, in the RGB 4:4:4 mode, 8-bit blue (B) data, 8-bit green (G) data, and 8-bit red (R) data, which constitute the pixel data of right eye (R) image data, are placed in the second vertical half of the data areas of individual pixels in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the first vertical half of the data areas of individual pixels in the TMDS channels #0, #1, and #2, respectively. Also, in the YCbCr 4:4:4 mode, 8-bit blue chrominance (Cb) data, 8-bit luminance (Y) data, and 8-bit red chrominance (Cr) data, which constitute the pixel data of right eye (R) image data, are placed in the second vertical half of the data areas of individual pixels in the TMDS channels #0, #1, and #2, respectively.

In the YCbCr 4:2:2 mode, in the first vertical half of the data areas of individual pixels in the TMDS channel #0, the data of bit 0 to bit 3 of luminance (Y) data constituting the pixel data of left eye (L) image data is placed, and also the data of bit 0 to bit 3 of blue chrominance (Cb) data and the data of bit 0 to bit 3 of red chrominance (Cr) data are placed alternately pixel by pixel.

Also, in the YCbCr 4:2:2 mode, in the first vertical half of the data areas of individual pixels in the TMDS channel #1, the data of bit 4 to bit 11 of the luminance (Y) data of left eye (L) image data is placed. Also, in the YCbCr 4:2:2 mode, in the first vertical half of the data areas of individual pixels in the TMDS channel #2, the data of bit 4 to bit 11 of blue chrominance (Cb) data and data of bit 4 to bit 11 of red chrominance (Cr) data of left eye (L) image data are placed alternately pixel by pixel.

Also, in the YCbCr 4:2:2 mode, in the second vertical half of the data areas of individual pixels in the TMDS channel #0, the data of bit 0 to bit 3 of luminance (Y) data constituting the pixel data of right eye (R) image data is placed, and also the data of bit 0 to bit 3 of blue chrominance (Cb) data and the data of bit 0 to bit 3 of red chrominance (Cr) data are placed alternately pixel by pixel.

Also, in the YCbCr 4:2:2 mode, in the second vertical half of the data areas of individual pixels in the TMDS channel #1, the data of bit 4 to bit 11 of the luminance (Y) data of right eye (R) image data is placed. Also, in the YCbCr 4:2:2 mode, in the second vertical half of the data areas of individual pixels in the TMDS channel #2, the data of bit 4 to bit 11 of blue chrominance (Cb) data and data of bit 4 to bit 11 of red chrominance (Cr) data of right eye (R) image data are placed alternately pixel by pixel.

It should be noted that in this Mode (5), right eye image data may be placed in the first vertical half of the data areas of individual pixels, and left eye image data may be placed in the second vertical half of the data areas of individual pixels.

Figure 25:
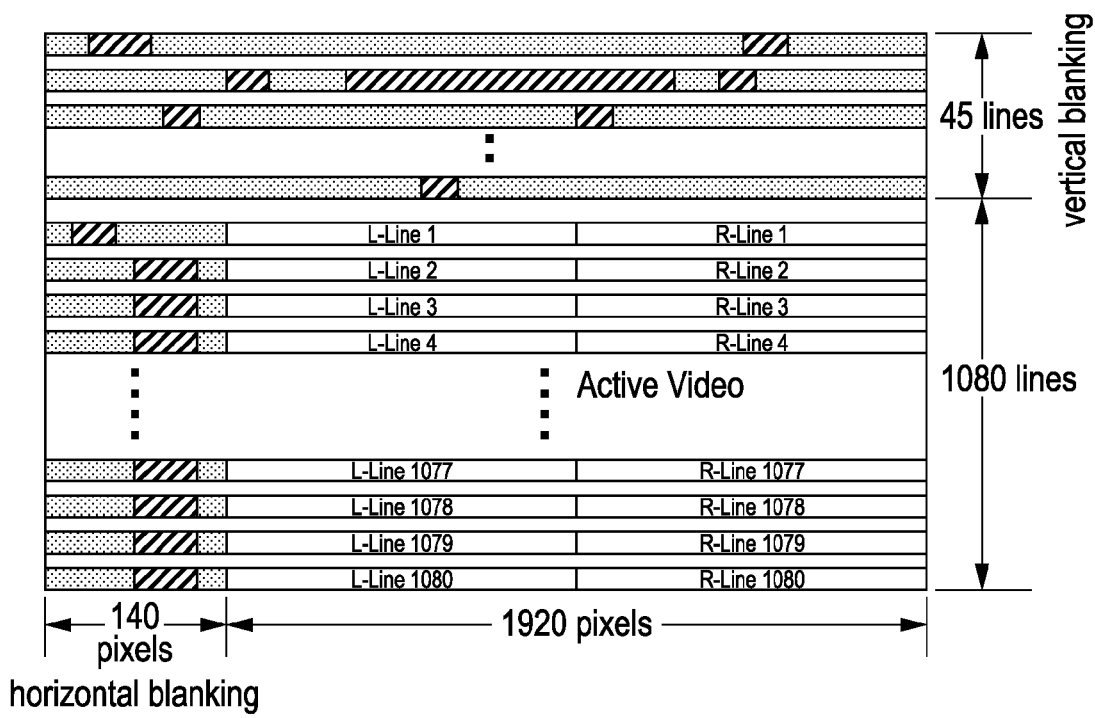
FIG. 25 is a diagram showing an example of TMDS transmission data in a mode (Mode (6)) in which the pixel data of left eye image data is transmitted in the first half of the horizontal direction, and the pixel data of left eye image data is transmitted in the second half of the horizontal direction.

FIG. 25 shows an example of TMDS transmission data in Mode (6). In this case, the data of 1920 pixels×1080 lines of active pixels (synthesized data of left eye (L) image data and right eye (R) image data) is placed in the Active Video period of 1920 pixels×1080 lines.

It should be noted that in the case of this Mode (6), as described above, the pixel data in the horizontal direction of each of left eye image data and right eye image data is thinned to ½. Here, the left eye image data to be transmitted is either odd-numbered pixels or even-numbered pixels and, likewise, the right eye image data to be transmitted is either odd-numbered pixels or even-numbered pixels. Therefore, there are four possible combinations, in which both the left eye image data and the right eye image data are odd-numbered pixels, both the left eye image data and the right eye image data are even-numbered pixels, the left eye image data are odd-numbered pixels and the right eye image data are even-numbered pixels, and the left eye image data are even-numbered pixels and the right eye image data are odd-numbered pixels.

Figure 26:
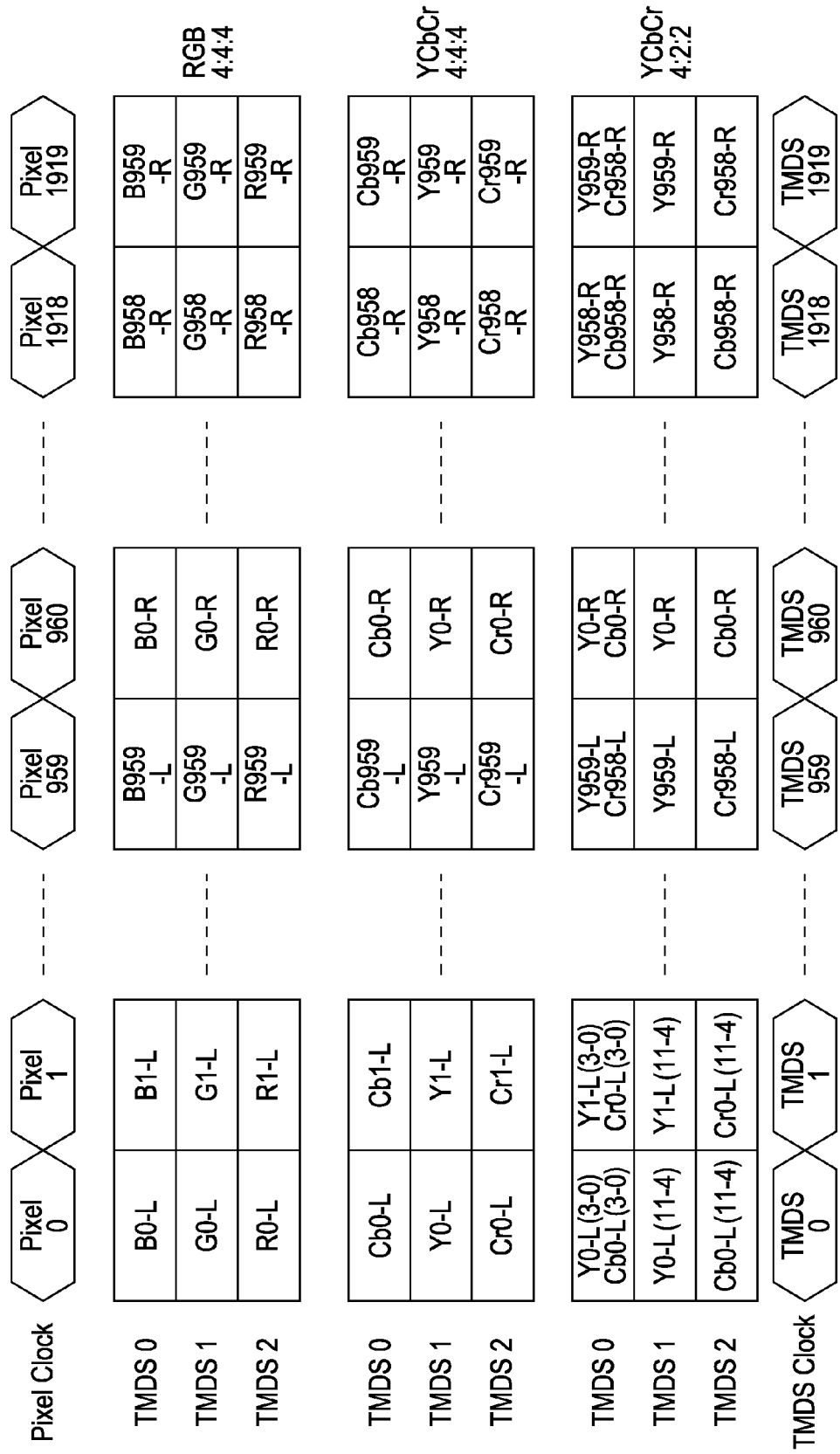
FIG. 26 is a diagram showing an example of packing format when transmitting 3D image data in Mode (6) on three TMDS channels #0, #1, and #2 of HDMI.

FIG. 26 shows an example of packing format when transmitting 3D image data in Mode (6) on the three TMDS channels #0, #1, and #2 of HDMI. Three modes, RGB 4:4:4, YCbCr 4:4:4, and YCbCr 4:2:2, are shown as transmission modes for image data. Here, the relationship between a TMDS clock and a pixel clock is such that TMDS clock=pixel clock.

In the RGB 4:4:4 mode, 8-bit blue (B) data, 8-bit green (G) data, and 8-bit red (R) data, which constitute the pixel data of left eye (L) image data, are placed in the first horizontal half of the data areas of individual pixels in the TMDS channels #0, #1, and #2, respectively. Also, in the RGB 4:4:4 mode, 8-bit blue (B) data, 8-bit green (G) data, and 8-bit red (R) data, which constitute the pixel data of right eye (R) image data, are placed in the second horizontal half of the data areas of individual pixels in the TMDS channels #0, #1, and #2, respectively.

In the YCbCr 4:4:4 mode, 8-bit blue chrominance (Cb) data, 8-bit luminance (Y) data, and 8-bit red chrominance (Cr) data, which constitute the pixel data of left eye (L) image data, are placed in the first horizontal half of the data areas of individual pixels in the TMDS channels #0, #1, and #2, respectively. Also, in the YCbCr 4:4:4 mode, 8-bit blue chrominance (Cb) data, 8-bit luminance (Y) data, and 8-bit red chrominance (Cr) data, which constitute the pixel data of right eye (R) image data, are placed in the second horizontal half of the data areas of individual pixels in the TMDS channels #0, #1, and #2, respectively.

In the YCbCr 4:2:2 mode, in the first horizontal half of the data areas of individual pixels in the TMDS channel #0, the data of bit 0 to bit 3 of luminance (Y) data constituting the pixel data of left eye (L) image data is placed, and also the data of bit 0 to bit 3 of blue chrominance (Cb) data and the data of bit 0 to bit 3 of red chrominance (Cr) data are placed alternately pixel by pixel.

Also, in the YCbCr 4:2:2 mode, in the first horizontal half of the data areas of individual pixels in the TMDS channel #1, the data of bit 4 to bit 11 of the luminance (Y) data of left eye (L) image data is placed. Also, in the YCbCr 4:2:2 mode, in the first horizontal half of the data areas of individual pixels in the TMDS channel #2, the data of bit 4 to bit 11 of blue chrominance (Cb) data and data of bit 4 to bit 11 of red chrominance (Cr) data of left eye (L) image data are placed alternately pixel by pixel.

Also, in the YCbCr 4:2:2 mode, in the second horizontal half of the data areas of individual pixels in the TMDS channel #0, the data of bit 0 to bit 3 of luminance (Y) data constituting the pixel data of right eye (R) image data is placed, and also the data of bit 0 to bit 3 of blue chrominance (Cb) data and the data of bit 0 to bit 3 of red chrominance (Cr) data are placed alternately pixel by pixel.

Also, in the YCbCr 4:2:2 mode, in the second horizontal half of the data areas of individual pixels in the TMDS channel #1, the data of bit 4 to bit 11 of the luminance (Y) data of right eye (R) image data is placed. Also, in the YCbCr 4:2:2 mode, in the second horizontal half of the data areas of individual pixels in the TMDS channel #2, the data of bit 4 to bit 11 of blue chrominance (Cb) data and data of bit 4 to bit 11 of red chrominance (Cr) data of right eye (R) image data are placed alternately pixel by pixel.

It should be noted that in this Mode (6), right eye image data may be placed in the first vertical half of the data areas of individual pixels, and left eye image data may be placed in the second vertical half of the data areas of individual pixels.

Figure 27:
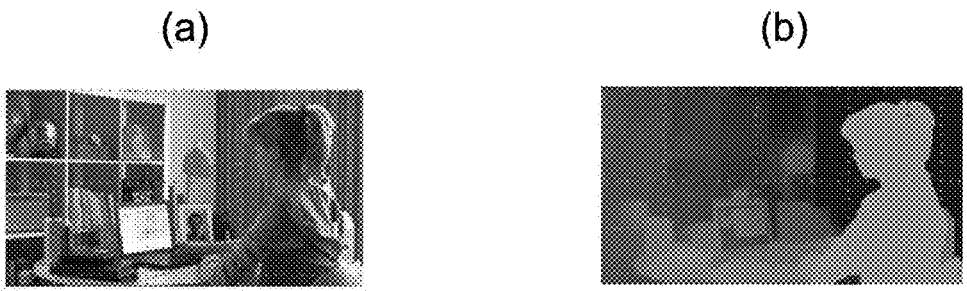
FIG. 27 is a diagram showing two-dimensional (2D) image data and depth data that constitute 3D image data in the MPEG-C mode.

Next, a description will be given of the case of MPEG-C mode in which the 3D image data of an original signal is formed by two-dimensional (2D) image data (see FIG. 27(*a*)), and depth data (see FIG. 27(*b*)) corresponding to each pixel.

In the case of this MPEG-C mode, two-dimensional image data in the 4:4:4 mode is converted into the 4:2:2 mode, depth data is placed in the free space, and synthesized data of the two-dimensional image data and the depth data is transmitted on the TMDS channels of HDMI. That is, in this case, pixel data constituting two-dimensional image data and depth data corresponding to the pixel data are placed in the data area of each pixel (image).

Figure 28:
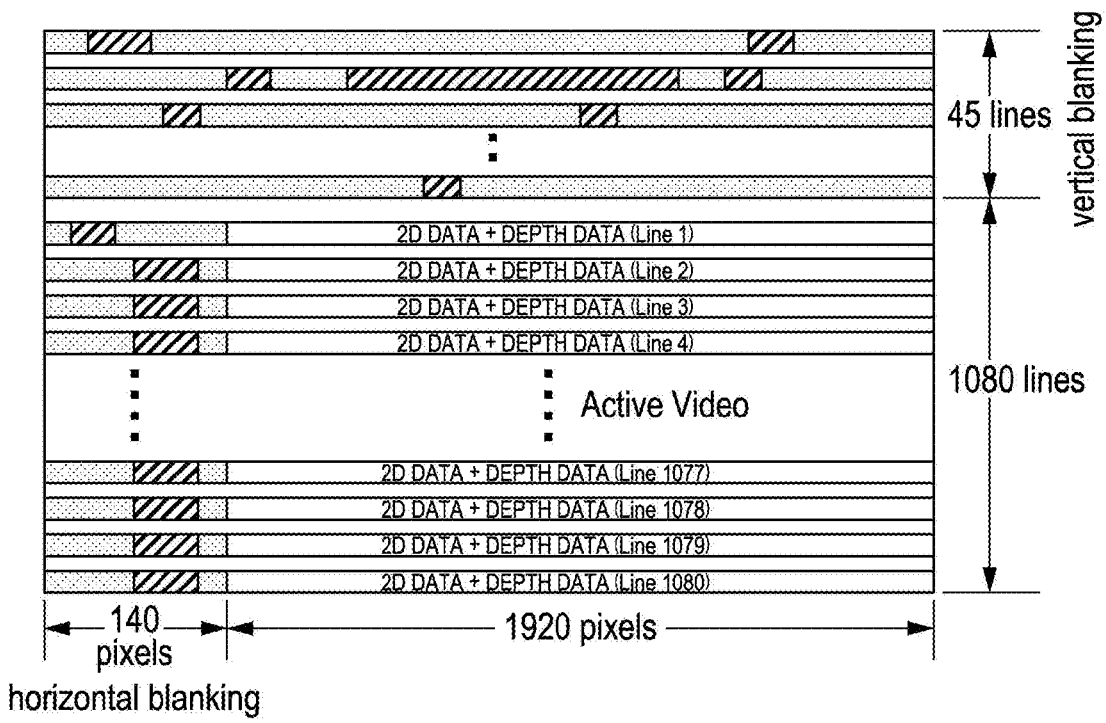
FIG. 28 is a diagram showing an example of TMDS transmission data in the MPEG-C mode.

FIG. 28 shows an example of TMDS transmission data in the MPEG-C mode. In this case, the data of 1920 pixels× 1080 lines of active pixels (synthesized data of two-dimensional image data and depth data) is placed in the Active Video period of 1920 pixels×1080 lines.

Figure 29:
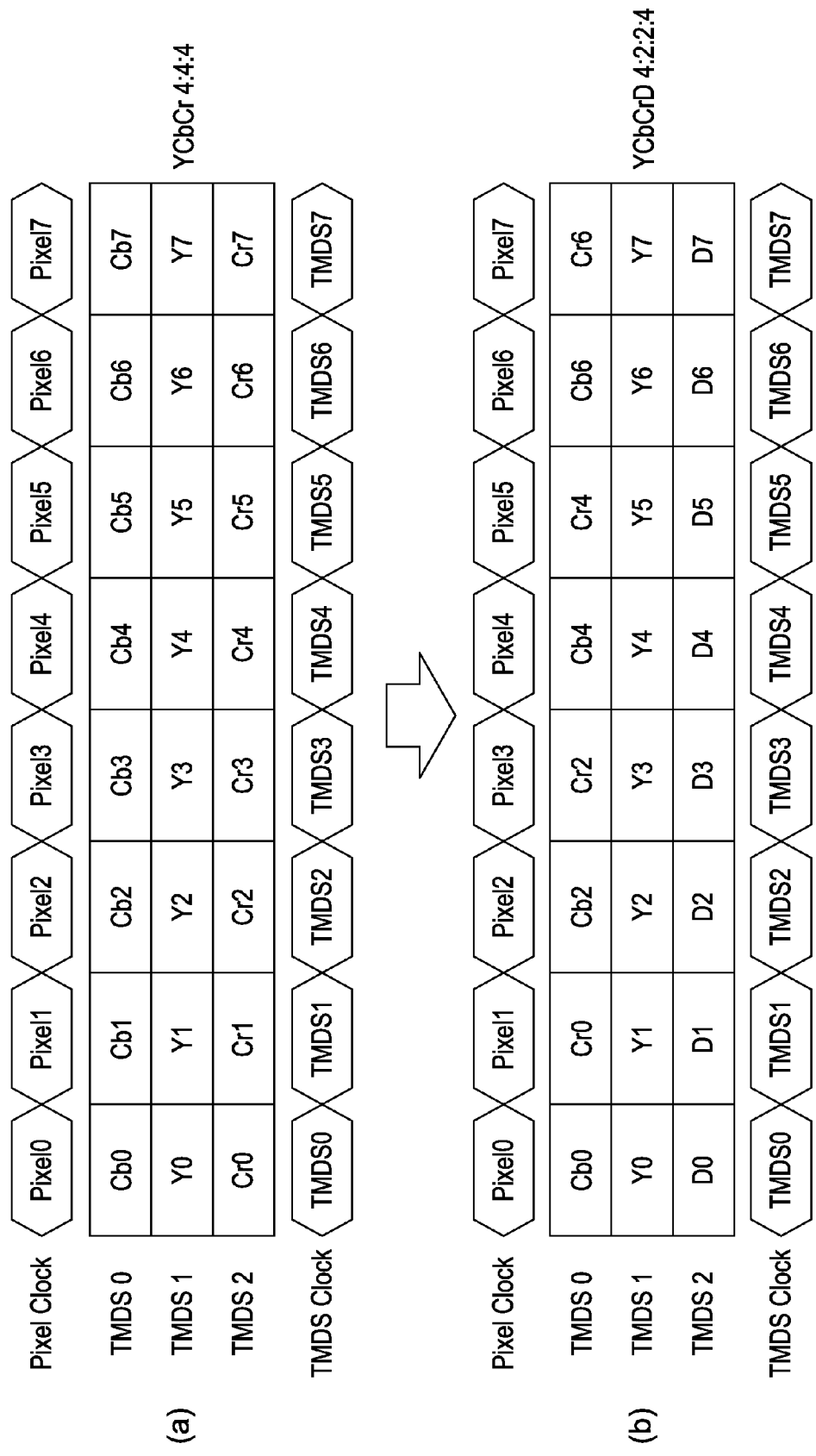
FIG. 29 shows an example of packing format when transmitting 3D image data in the MPEG-C mode on three TMDS channels #0, #1, and #2 of HDMI.

FIG. 29 shows an example of packing format when transmitting 3D image data in the MPEG-C mode on the three TMDS channels #0, #1, and #2 of HDMI. Here, the relationship between a TMDS clock and a pixel clock is such that TMDS clock=pixel clock.

FIG. 29(*a*) shows, for the purpose of comparison, the packing format of two-dimensional image data in the YCbCr 4:4:4 mode. In the data areas of individual pixels in the TMDS channels #0, #1, and #2, 8-bit blue chrominance (Cb) data, 8-bit luminance (Y) data, and 8-bit red chrominance (Cr) data, which constitute the pixel data of two-dimensional image data, are placed respectively.

FIG. 29(*b*) shows the packing format of the synthesized data of two-dimensional image data and depth data. In the data areas of individual pixels in the TMDS channel #0, 8-bit blue chrominance (Cb) data and 8-bit red chrominance (Cr) data are placed alternately pixel by pixel. Also, 8-bit depth data (D) is placed in the data areas of individual pixels in the TMDS channel #1.

In this way, since an 8-bit luminance signal and 8-bit depth data are transmitted by a single pixel clock, the mode shown in FIG. 29(*b*) is called "YCbCrD4:2:2:4" mode. In this mode, while the pixel data of the chrominance signals Cb and Cr is thinned to ½, no thinning is performed with respect to depth data. This is because depth data is 8-bit data related to luminance (Y) data, and thus needs to keep a quality equivalent to the luminance (Y) data without being thinned.

Figure 30:
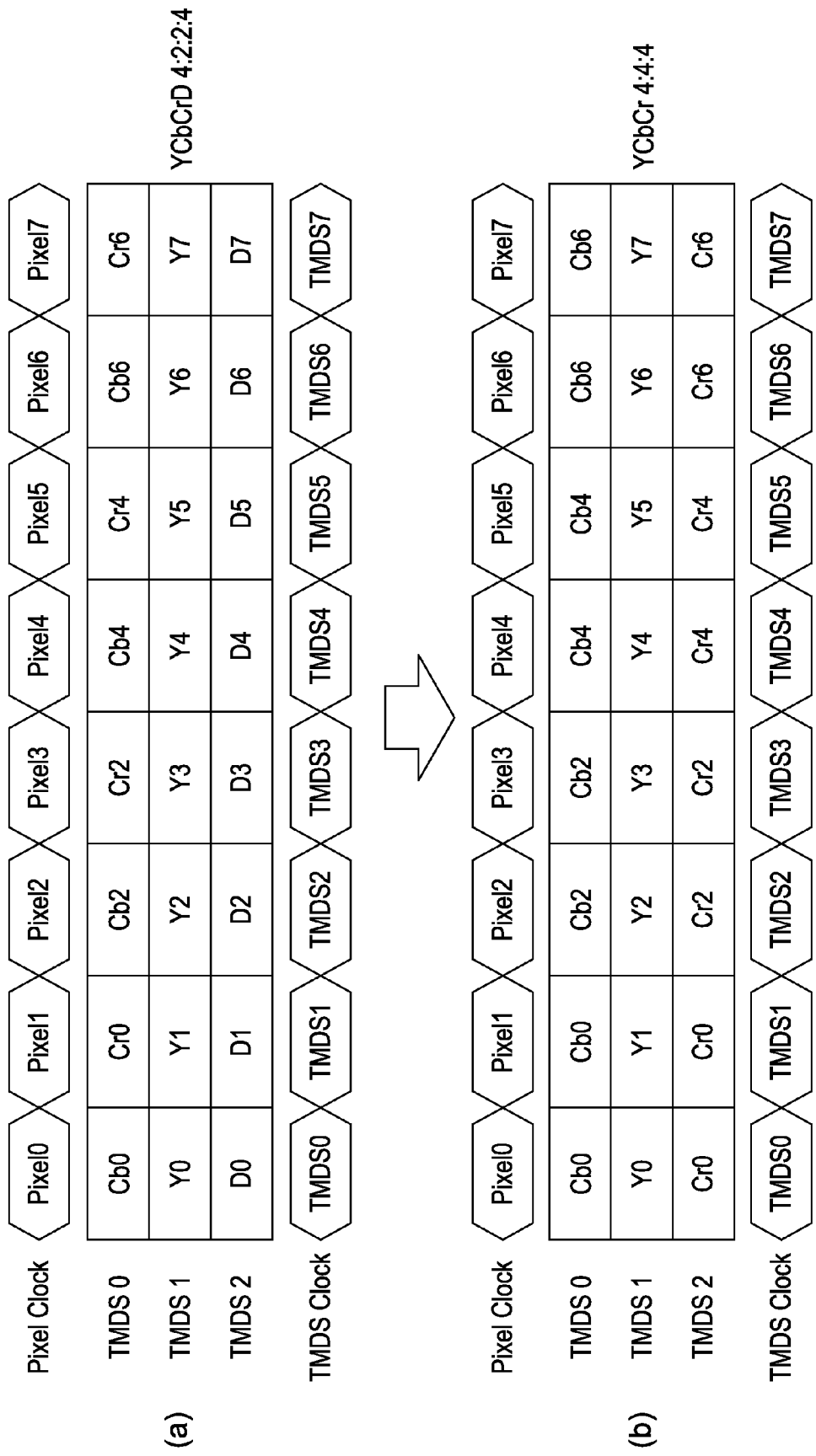
FIG. 30 is a diagram for explaining a decoding process in a sink device (television receiver) that has received 3D image data in the MPEG-C mode.

When the MPEG-C mode is selected, the 3D signal processing section (encoding section) 229 of the disc player 210 described above performs a process of generating synthesized data corresponding to the "YCbCrD4:2:2:4" mode described above, from the 3D image data (two-dimensional image data and depth data) of the original signal. Also, in that case, the 3D signal processing section (decoding section) 254 of the television receiver 250 described above performs a process of separating and extracting the two-dimensional image data and the depth data from the synthesized data in the "YCbCrD4:2:2:4" mode shown in FIG. 30(*a*). Then, with regard to the two-dimensional image data, the 3D signal processing section 254 performs an interpolation process on the chrominance data Cb and Cr for conversion into two-dimensional data in the YCbCr4:4:4 mode. Further, the 3D signal processing section 254 performs a computation using the two-dimensional image data and the depth data, thereby generating left eye (L) image data and right eye (R) image data.

In the AV system 200 shown in FIG. 1, the CPU 214 of the disc player 210 recognizes the 3D image data transmission modes or the like that can be supported by the television receiver 250, on the basis of E-EDID read from the HDMI receiving section 252 of the television receiver 250.

Figure 31:
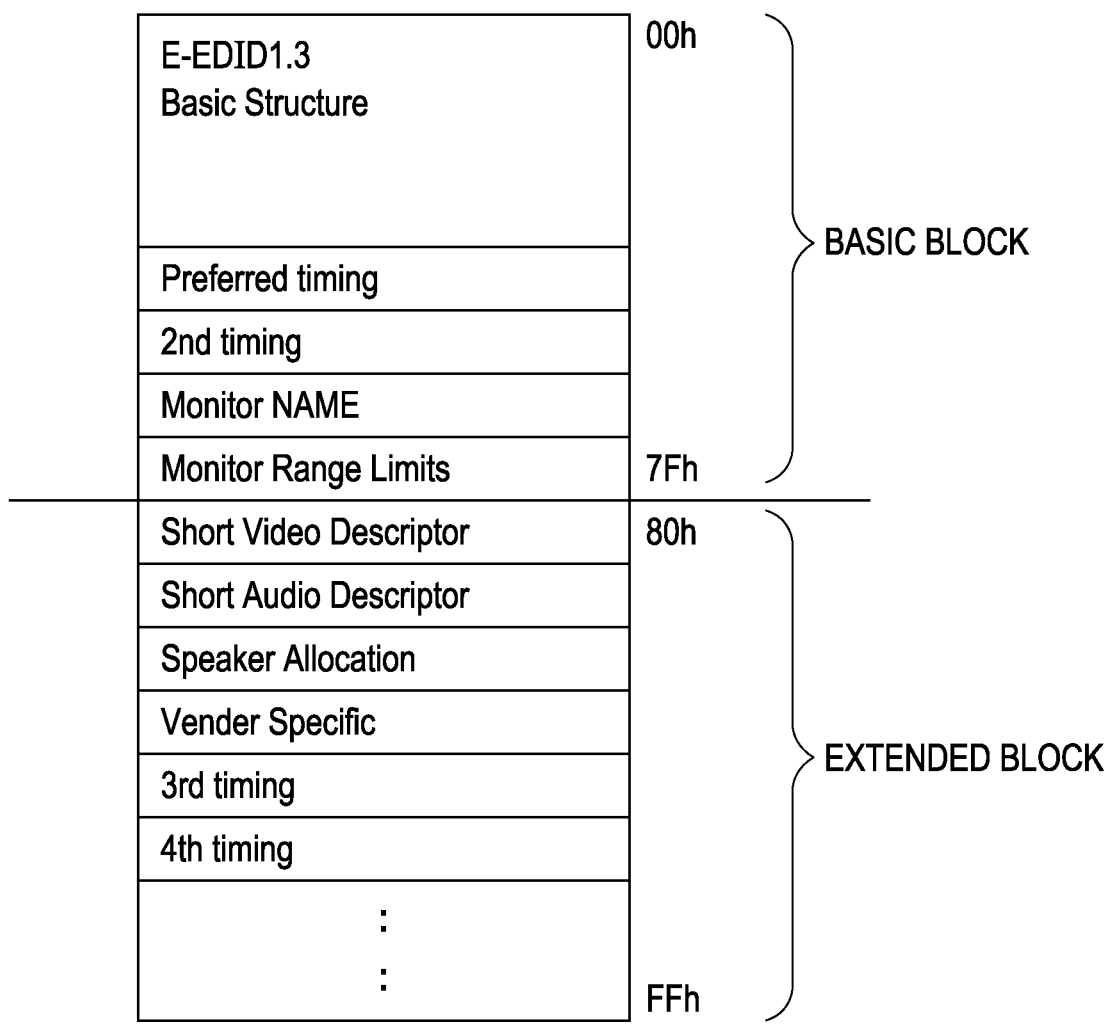
FIG. 31 is a diagram showing an example of the data structure of E-EDID stored in a sink device (television receiver).

FIG. 31 shows an example of the data structure of E-EDID. This E-EDID is formed by a basic block and an extended block. Placed at the beginning of the basic block is data defined by the E-EDID 1.3 standard represented by "E-EDID 1.3 Basic Structure", followed by timing information for maintaining compatibility with the EDID of the past which is represented by "Preferred timing", and timing information for maintaining compatibility with the EDID of the past which is represented by "2nd timing" and different from "Preferred timing".

Also, in the basic block, placed in order following "2nd timing" are information represented by "Monitor NAME" which is indicative of the name of a display apparatus, and information represented by "Monitor Range Limits" which is indicative of the number of displayable pixels in the case when aspect ratios are 4:3 and 16:9.

Placed at the beginning of the extended block is "Short Video Descriptor". This is information indicative of displayable image size (resolution), frame rate, and interlaced/progressive. Subsequently, "Short Audio Descriptor" is placed. This is information such as audio codec modes that can be played back, sampling frequency, cutoff frequency, and codec bit count. Subsequently, information related to right and left loudspeakers represented by "Speaker Allocation" is placed.

Also, in the extended block, placed following "Speaker Allocation" are data represented by "Vender Specific" and uniquely defined for each manufacture, timing information for maintaining compatibility with the EDID of the past which is represented by "3rd timing", and timing information for maintaining compatibility with the EDID of the past which is represented by "4th timing".

In this embodiment, data areas extended for storing 3D (stereo) image data are defined in this "Vender Specific" area. FIG. 32 shows an example of the data structure of the "Vender Specific" area. This "Vender Specific" area is provided with 0th block through N-th block each being a block of one byte. Data areas for 3D image/audio information to be stored by the sink device (the television receiver 250 in this embodiment) are defined in the 8th byte to the 11th byte following the already-defined 0th byte to 7th byte.

First, the 0th byte to the 7th byte will be described. In the 0th byte placed at the beginning of data represented by "Vender Specific", there are placed a header represented by "Vender-Specific tag code (=3)" which is indicative of the data area of data "Vender Specific", and information represented by "Length (=N)" which is indicative of the length of data "Vender Specific".

Also, in the 1st byte to the 3rd byte, there is placed information represented by "24bit IEEE Registration Identifier (0x000C03) LSB first" which is indicative of a number "0x000C03" registered for HDMI(R). Further, in the 4th byte and 5th byte, there are placed pieces of information represented by "A," "B," "C," and "D" each indicating the physical address of the sink device of 24 bits.

In the 6th byte, there are placed a flag represented by "Supports-AI" which is indicative of functions supported by the sink device, pieces of information represented by "DC-48 bit," "DC-36 bit," and "DC-30 bit" each specifying the number of bits per pixel, a flag represented by "DC-Y444" which is indicative of whether the sink device supports transmission of an image in YCbCr4:4:4, and a flag represented by "DVI-Dual" which is indicative of whether the sink device supports dual DVI (Digital Visual Interface).

Also, in the 7th byte, there is placed information represented by "Max-TMDS-Clock" which is indicative of the maximum frequency of TMDS pixel clock.

Next, the 8th byte to the 11th byte will be described. In the 8th byte to the 10th byte, information related to a 3D image is stored. The 8th byte indicates support of RGB 4:4:4, the 9th byte indicates support of YCbCr 4:4:4, and the 10th byte indicates support of YCbCr 4:2:2. Written in the 7th bit to the 1st bit of each of the 8th byte to the 10th byte is data indicating 6 types (the video formats (RGB 4:4:4 format, YCbCr 4:4:4 format, and YCbCr 4:2:2 format) in Modes (1) to (6) described above) of 3D image supported by the sink device.

The 7th bit indicates support/no support for a mode (Mode (1): "Pixel ALT") in which the pixel data of left eye image data and the pixel data of right eye image data are transmitted while being switched sequentially at every TMDS clock. The 6th bit indicates support/no support for a mode (Mode (2): "Simul") in which one line of left eye image data and one line of right eye image data are transmitted alternately.

The 5th bit indicates support/no support for a mode (Mode (3): "Field Seq.") in which left eye image data and right eye image data are transmitted while being switched sequentially field by field. The 4th bit indicates support/no support for a mode (Mode (4): "Line Seq.") in which left eye image data and right eye image data are each thinned to ½ in the vertical direction, and one line of the left eye image data and one line of the right eye image data are transmitted alternately.

The 3rd bit indicates support/no support for a mode (Mode (5): "Top & Bottom") in which left eye image data and right eye image data are each thinned to ½ in the vertical direction, and each line of the left eye image data is transmitted in the first half and each line of the left eye image data is transmitted in the second half. The 2nd bit indicates support/no support for a mode (Mode (6): "Side by Side") in which left eye image data and right eye image data are each thinned to ½ in the horizontal direction, and each pixel data of the left eye image data is transmitted in the first half and each pixel data of the left eye image data is transmitted in the second half.

The 1st bit indicates support/no support for a transmission mode (MPEG-C mode) based on two-dimensional image (main image) and depth data specified in MPEG-C. The subsequent bits can be assigned when modes other than this are proposed.

In the 11th byte, information related to 3D audio is stored. The 7th bit to the 5th bit indicate transmission formats for 3D audio which are supported by the sink device. For example, the 7th bit indicates support for Method A, the 6th bit indicates support for Method B, and the 5th bit indicates support for Method C. The subsequent bits can be assigned when modes other than these are proposed. It should be noted that description of Methods A to C is omitted.

In the AV system 200 shown in FIG. 1, after confirming connection of the television receiver (sink device) 250 by the HPD line, by using the DDC, the CPU 214 of the disc player 210 reads the E-EDID, and therefore 3D image/audio information from the television receiver 250, and recognizes the transmission modes for 3D image/audio data supported by the television receiver (sink device).

In the AV system 200 shown in FIG. 1, when transmitting 3D image/audio data (3D image data and 3D audio data) to the television receiver (sink device) 250, the disc player (source device) 210 selects and transmits one of 3D image/audio data transmission modes that can be supported by the television receiver 250, on the basis of the 3D image/audio information read from the television receiver 250 as previously described above.

At that time, the disc player (source device) 210 transmits information related to the image/audio format currently being transmitted, to the television receiver (sink device) 250. In this case, the disc player 210 transmits the information to the television receiver 250 by inserting the information in the blanking period of 3D image data (video signal) transmitted to the television receiver 250. Here, the disc player 210 inserts information related to the format of image/audio currently being transmitted, in the blanking period of the 3D image data by using, for example, an AVI (Auxiliary Video Information) InfoFrame packet, Audio InfoFrame packet, or the like of HDMI.

An AVI InfoFrame packet is placed in the Data Island period described above. FIG. 33 shows an example of the data structure of an AVI InfoFrame packet. In HDMI, additional information related to an image can be transmitted from the source device to the sink device by means of the AVI InfoFrame packet.

The 0th byte defines "Packet Type" indicative of the kind of data packet. The "Packet Type" of an AVI InfoFrame packet is "0x82". The 1st byte describes version information of packet data definition. While currently being "0x02" for an AVI InfoFrame packet, this becomes "0x03" as shown in the figure if a transmission mode for 3D image data is defined in accordance with this invention. The 2nd byte describes information indicative of packet length. While currently being "0x0D" for an AVI InfoFrame, this becomes "0x0E" as shown in the figure if 3D image output format information is defined in the 17th bit in accordance with this invention. Since individual AVI InfoFrames are defined in CEA-861-D Section 6-4, description thereof is omitted.

The 17th byte will be described. The 17th byte specifies one of 3D image data transmission modes selected by the source device (the disc player 210 in this embodiment). The 7th bit indicates a mode (Mode (1): "Pixel ALT") in which the pixel data of left eye image data and the pixel data of right eye image data are transmitted while being switched sequentially at every TMDS clock. The 6th bits indicates a mode (Mode (2): "Simul") in which one line of left eye image data and one line of right eye image data are transmitted alternately.

The 5th bit indicates a mode (Mode (3): "Field Seq.") in which left eye image data and right eye image data are transmitted while being switched sequentially field by field. The 4th bit indicates a mode (Mode (4): "Line Seq.") in which left eye image data and right eye image data are each thinned to ½ in the vertical direction, and one line of the left eye image data and one line of the right eye image data are transmitted alternately. The 3rd bit indicates a mode (Mode (5): "Top & Bottom") in which left eye image data and right eye image data are each thinned to ½ in the vertical direction, and each line of the left eye image data is transmitted in the first half and each line of the left eye image data is transmitted in the second half.

The 2nd bit indicates a mode (Mode (6): "Side by Side") in which left eye image data and right eye image data are each thinned to ½ in the horizontal direction, and each pixel data of the left eye image data is transmitted in the first half and each pixel data of the left eye image data is transmitted in the second half. The 1st bit indicates a transmission mode (MPEG-C mode) based on two-dimensional image and depth data specified in MPEG-C.

Therefore, in the case when any one of bits from the 7th bit to the 1st bit is set, the sink device (the television receiver 250 in this embodiment) can determine that 3D image data is being transmitted. Further, Mode (1) uses a video format of 3840×1080, and Mode (2) uses a video format of 1920× 2160. Thus, as the video format to be specified in bits VIC6 to VIC0 of the 7th byte of an AVI Infoframe, a video format corresponding to a mode is selected from among the video formats shown in FIG. 34. Further, the 6th bit and 5th bit of the 4th byte of an AVI Infoframe specify RGB 4:4:4/YCbCr 4:4:4/YCbCr 4:2:2.

Also, Deep Color information must be transmitted by a packet different from an AVI InfoFrame. Thus, as shown in FIG. 35, in the case of Modes (1) to (3), 48bit (0x7) is specified in bits CD3 to CD0 of a General Control Protocol packet.

An Audio InfoFrame packet is placed in the Data Island period described above. FIG. 36 shows the data structure of an Audio InfoFrame packet. In HDMI, additional information related to audio can be transmitted from the source device to the sink device by means of the Audio InfoFrame packet.

The 0th byte define "Packet Type" indicative of the kind of data packet, which is "0x84" for an Audio InfoFrame used in this invention. The 1st byte describes version information of packet data definition. While currently being "0x01" for an Audio InfoFrame packet, this becomes "0x02" as shown in the figure if a transmission for 3D audio data is defined in accordance with this invention. The 2nd byte describes information indicative of packet length. For an Audio InfoFrame, this is currently "0x0A".

3D audio output format information according to this invention is defined in the 9th byte. The 7th bit to the 5th bit indicate one transmission mode selected from among 3D audio data transmission modes that are supported by the sink device. For example, the 7th bit, the 6th bit, and the 5th bit indicate transmission according to Method A, Method B, and Method C, respectively.

Figure 37:
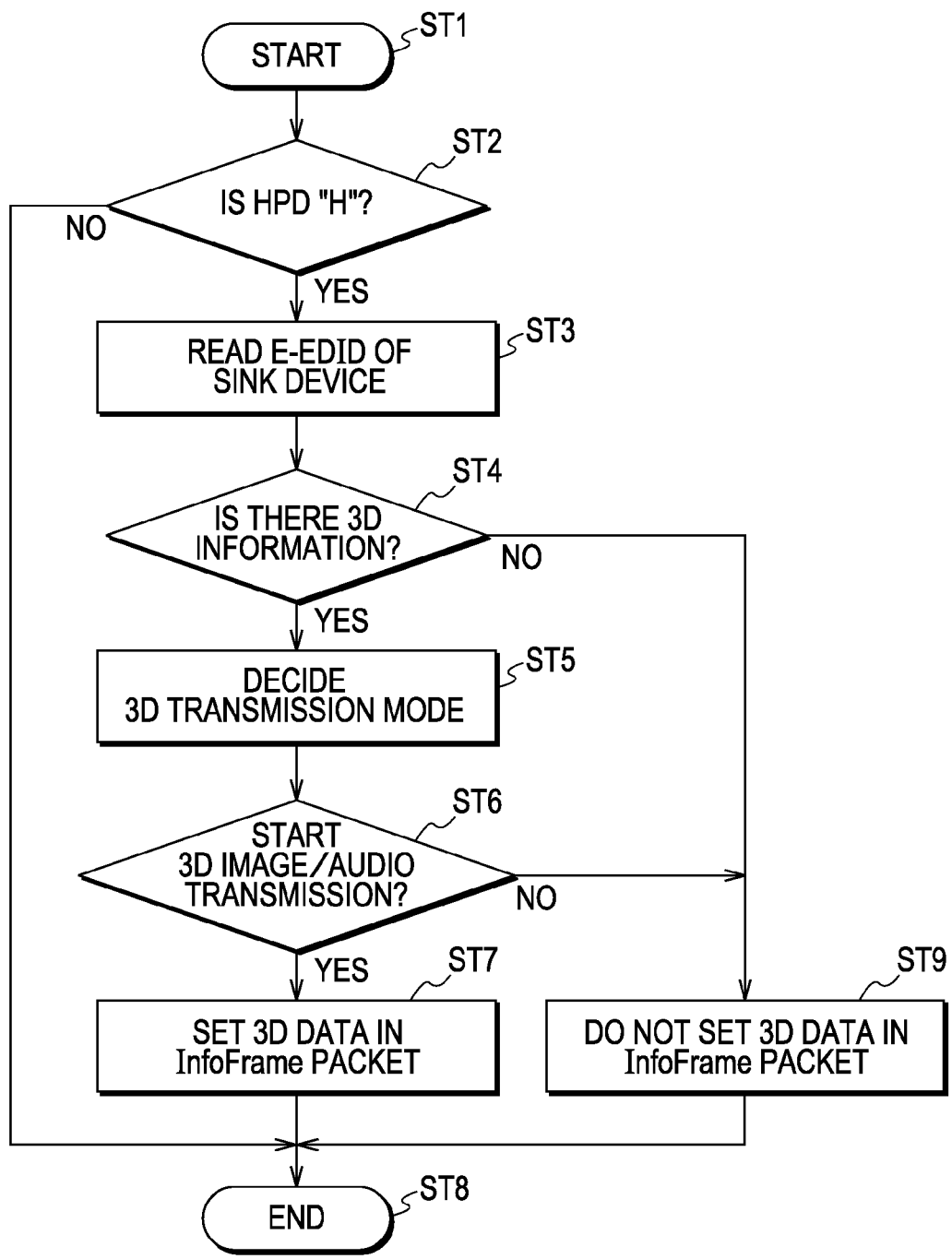
FIG. 37 is a flowchart showing a procedure in a disc player (source device) at the time of connection of a television receiver (sink device).

Next, referring to the flowchart in FIG. 37, a description will be given of processing at the time of connection of the television receiver (sink device), in the disc player (source device) 210 (CPU 221) in the AV system 200 shown in FIG. 1.

In step ST1, the disc player 210 starts processing, and thereafter, moves to a process in step ST2. In step ST2, the disc player 210 determines whether or not an HPD signal is at high level "H". If the HPD signal is not at high level "H", the television receiver (sink device) 250 is not connected to the disc player 210. At this time, the disc player 210 immediately proceeds to step ST8, and ends processing.

If the HPD signal is at high level "H", in step ST3, the disc player 210 reads the E-EDID (see FIG. 31 and FIG. 32) of the television receiver (sink device) 250. Then, in step ST4, the disc player 210 determines whether or not there is 3D image/audio information.

If there is no 3D image/audio information, in step ST9, the disc player 210 sets data indicating non-transmission of 3D image/audio in the AVI Infoframe packet and the Audio InfoFrame packet, and thereafter proceeds to step ST8 and ends processing. Here, setting of data indicating non-transmission of 3D image/audio means setting all of the 7th bit to 4th bit of the 17th byte of the AVI InfoFrame packet (see FIGS. 33) to "0", and setting all of the 7th bit to 5th bit of the 9th byte of the Audio InfoFrame packet (see FIGS. 36) to "0".

Also, if there is 3D image/audio information in step ST4, in step ST5, the disc player 210 decides the transmission mode for 3D image/audio data. Then, in step ST6, the disc player 210 determines whether or not to start transmission of 3D image/audio data. If transmission of 3D image/audio data is not to be started, in step ST9, the disc player 210 sets data indicating non-transmission of 3D image/audio in the AVI Infoframe packet and the Audio InfoFrame packet, and thereafter proceeds to step ST8 and ends processing.

If transmission of 3D image/audio data is to be started in step ST6, in step ST7, the disc player 210 sets data indicating a transmission mode for 3D image/audio in the AVI Infoframe packet and the Audio InfoFrame packet, and thereafter proceeds to step ST8 and ends processing.

Figure 38:
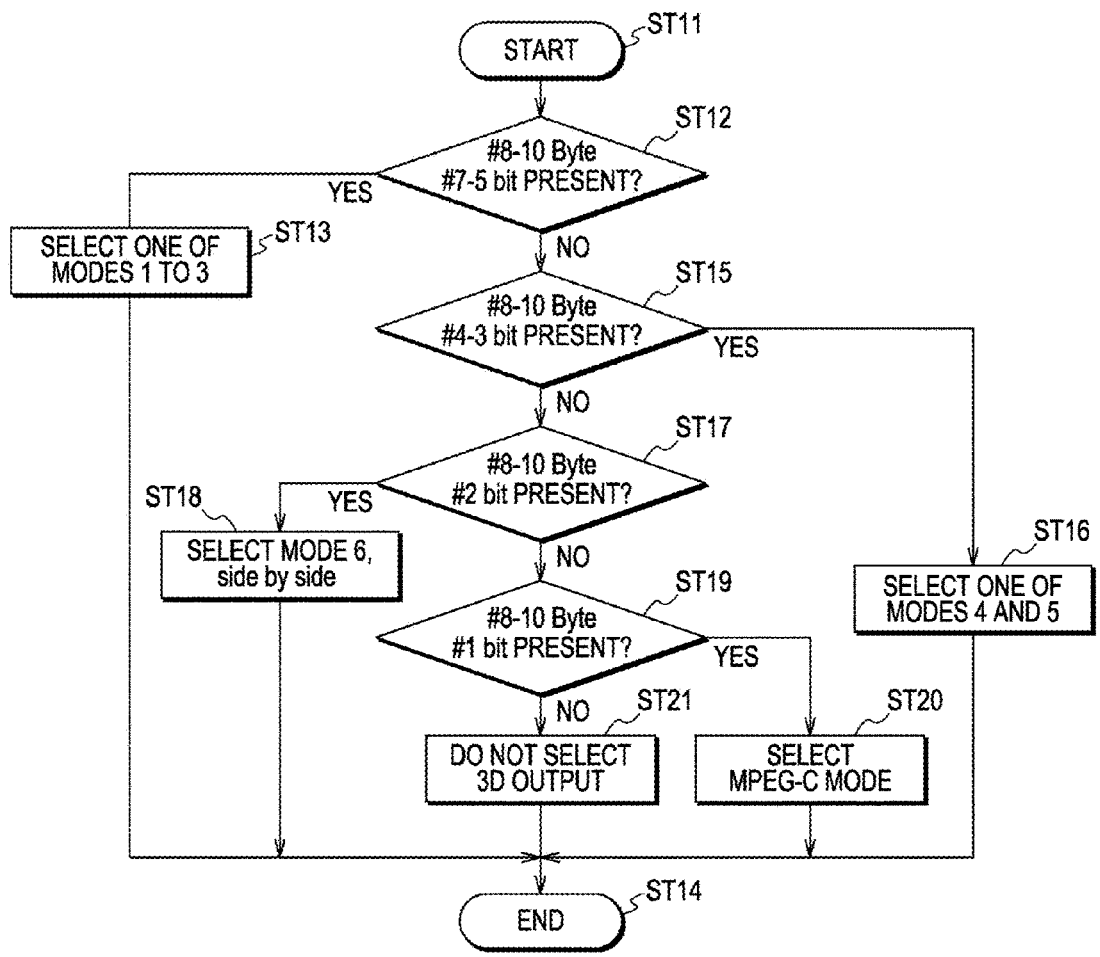
FIG. 38 is a diagram showing the procedure of a decision process for a 3D image data transmission mode in a disc player (source device).

Next, referring to the flowchart in FIG. 38, a description will be given of a decision process (the process in step ST5 in FIG. 37) for a 3D image data transmission mode in the disc player (source device) 210 in the AV system 200 shown in FIG. 1.

In step ST11, the disc player 210 starts processing, and thereafter, moves to a process in step ST12. In this step ST12, the disc player 210 judges whether or not the 7th bit to the 5th bit in the 8th to 10th bytes of the Vender Specific area are set. The transmission modes relating to these bit settings are modes in which left eye image and right eye image data of the highest image quality are transmitted without degradation, and are modes that require the simplest processing in the sink device. Accordingly, if the 7th bit to the 5th bit are set, in step ST13, the disc player 210 selects one transmission mode from among the transmission modes, Modes (1) to (3), which are set by these bits, and thereafter, in step ST14, ends the processing.

If the 7th bit to the 5th bit are not set, the disc player 210 moves to a process in step ST15. In this step ST15, the disc player 210 judges whether or not the 4th bit to the 3rd bit in the 8th to 10th bytes of the Vender Specific area are set. The transmission modes relating to these bit settings are modes in which independent left eye image and right eye image data of the next highest image quality are transmitted sequentially line by line, and in which processing in the sink device is done in units of two frames and thus a memory is required. If the 4th bit to the 3rd bit are set, in step ST16, the disc player 210 selects one transmission mode from among Modes (4) or (5) set by these bits, and thereafter, in step ST14, ends the processing.

If the 4th bit to the 3rd bit are not set, the disc player 210 moves to a process in step ST17. In this step ST17, the disc player 210 judges whether or not the 2nd bit in the 8th to 10th bytes of the Vender Specific area is set. The transmission mode relating to this bit setting is a mode in which independent left eye image and right eye image data of the next highest image quality are transmitted within the same frame by a mode called "Side by Side" while each having their horizontal resolution cut in half, and which requires a process of expanding the horizontal resolution by two times as the processing in the sink device. If the 2nd bit is set, in step ST18, the disc player 210 selects the transmission mode set by this bit, Mode (6), and thereafter, in step ST14, ends the processing.

If the 2nd bit is not set, the disc player 210 moves to a process in step ST19. In this step ST19, the disc player 210 judges whether or not the 1st bit in the 8th to 10th bytes of the Vender Specific area is set. The transmission mode relating to this bit setting is the MPEG-C mode in which two-dimensional image data as image data common to the left eye and the right eye, and depth data for the left eye and the right eye are transmitted separately. In this mode, left eye image data and right eye image data need to be generated from these two-dimensional image data and depth data through processing in the sink device, and thus the processing becomes complex. If the 1st bit is set, in step ST20, the disc player 210 selects the transmission mode set by this bit, the MPEG-C mode, and thereafter, in step ST14, ends the processing.

If the 1st bit is not set, the disc player 210 moves to a process in step ST21. In this step ST21, the disc player 210 judges that no mode exists which allows transmission of 3D image data, sets 3D non-selection, and thereafter, in step ST14, ends the processing.

As described above, in the AV system 200 shown in FIG. 1, when transmitting 3D image/audio data from the disc player 210 to the television receiver 250, the disc player 210 receives information on 3D image/audio data transmission modes that can be supported by the television receiver 250, and transmits the transmission mode for the 3D image/audio data to be transmitted. Also, at that time, the disc player 210 transmits transmission mode information on the 3D image/audio data to be transmitted, to the television receiver 250 by using an AVI InfoFrame packet or an Audio InfoFrame packet. Therefore, transmission of 3D image/audio data between the disc player 210 and the television receiver 250 can be performed in a favorable manner.

It should be noted that in the above-described embodiment, the disc player (source device) 210 transmits transmission mode information on the 3D image/audio data to be transmitted to the television receiver 250, to the television receiver 250 by using an AVI InfoFrame packet or an Audio InfoFrame packet and inserting the packet in the blanking period of image data (video signal).

For example, the disc player (source device) 210 may transmit transmission mode information on the 3D image/audio data to be transmitted to the television receiver 250, to the television receiver 250 via the CEC line 84 that is a control data line of the HDMI cable 350. Also, for example, the disc player 210 may transmit transmission mode information on the 3D image/audio data to be transmitted to the television receiver 250, to the television receiver 250 via a bidirectional communication path formed by the reserved line and HPD line of the HDMI cable 350.

Also, in the above-described embodiment, the E-EDID of the television receiver 250 contains information on 3D image/audio data transmission modes supported by the television receiver 250, and the disc player 210 reads the E-EDID via the DDC 83 of the HDMI cable 350 to thereby acquire the information on 3D image/audio data transmission modes supported by the television receiver 250.

However, the disc player 210 may receive information on 3D image/audio data transmission mode(s) supported by the television receiver 250, from the television receiver 250 via the CEC line 84 that is a control data line of the HDMI cable 350, or via a bidirectional communication path formed by the reserved line and HPD line of the HDMI cable 350.

It should be noted that the above-described embodiment uses an HDMI transmission path. However, examples of baseband digital interface include, other than HDMI, a DVI (digital Visual Interface), a DP (Display Port) interface, and a wireless interface using 60 GHz millimeter waves. This invention can be similarly applied to the case of transmitting 3D image/audio data by these digital interfaces.

In the case of DVI, as in HDMI described above, 3D image/audio data transmission modes supported by the receiving apparatus are stored in an area called E-EDID included in the receiving apparatus. Therefore, in the case of this DVI, as in the case of HDMI described above, when transmitting 3D image/audio data to the receiving apparatus, the transmitting apparatus can read the above-described 3D image/audio information from the E-EDID of the receiving apparatus to decide the transmission mode.

Figure 39:
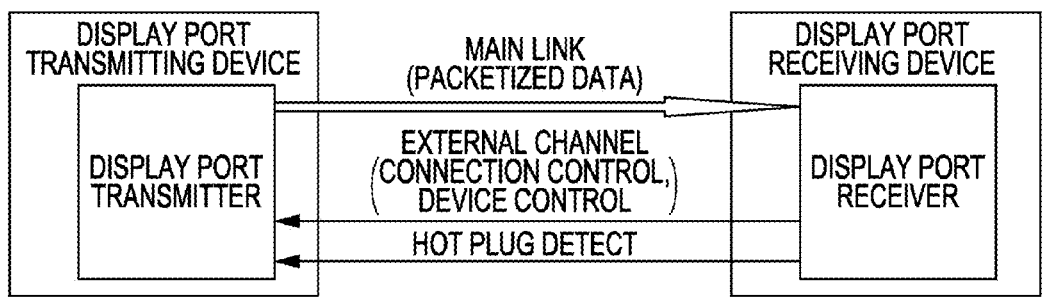
FIG. 39 is a diagram showing an example of the configuration of a DP system using a DP interface as a baseband digital interface.

FIG. 39 shows an example of the configuration of a DP system using a DP interface. In this DP system, a display port transmitting device and a display port receiving device are connected via an DP interface. Further, the display port transmitting device includes a display port transmitter, and the display port receiving device includes a display port receiver.

A main link is formed by one, two, or four double-ended differential-signal pairs (pair lanes), and has no dedicated clock signal. Instead, a clock is embedded in the 8B/10B-encoded data stream. For the DP interface, two transmission speeds are specified. One has a bandwidth of 2.16 Gbps per pair lane. The other hand a bandwidth of 1.296 Gbps per pair lane. Therefore, the theoretical upper-limit transmission bit rate of the transmission path of this DP interface is 2.16 Gbps per port, or a maximum of 8.64 Gbps with four ports.

In this DP interface, unlike HDMI, transmission speed and pixel frequency are independent from each other, and pixel depth, resolution, frame frequency, and the presence/absence and amount of additional data, such as audio data and DRM information in the transfer stream, can be freely adjusted.

Also, the DP interface has, separately from the main link, a half-duplex, bidirectional external (auxiliary) channel with 1-Mbit/sec bandwidth and 500-msec maximum latency, and exchange of information related to functions is performed between the transmitting device and the receiving device through this bidirectional communication. In this invention, transmission of information related to 3D image/audio is performed by using this DP external (auxiliary) channel. It should be noted that in the case of this DP interface, although not shown, information on 3D image/audio data transmission modes supported by the receiving device is recorded in the EDID similarly to HDMI.

Figure 40:
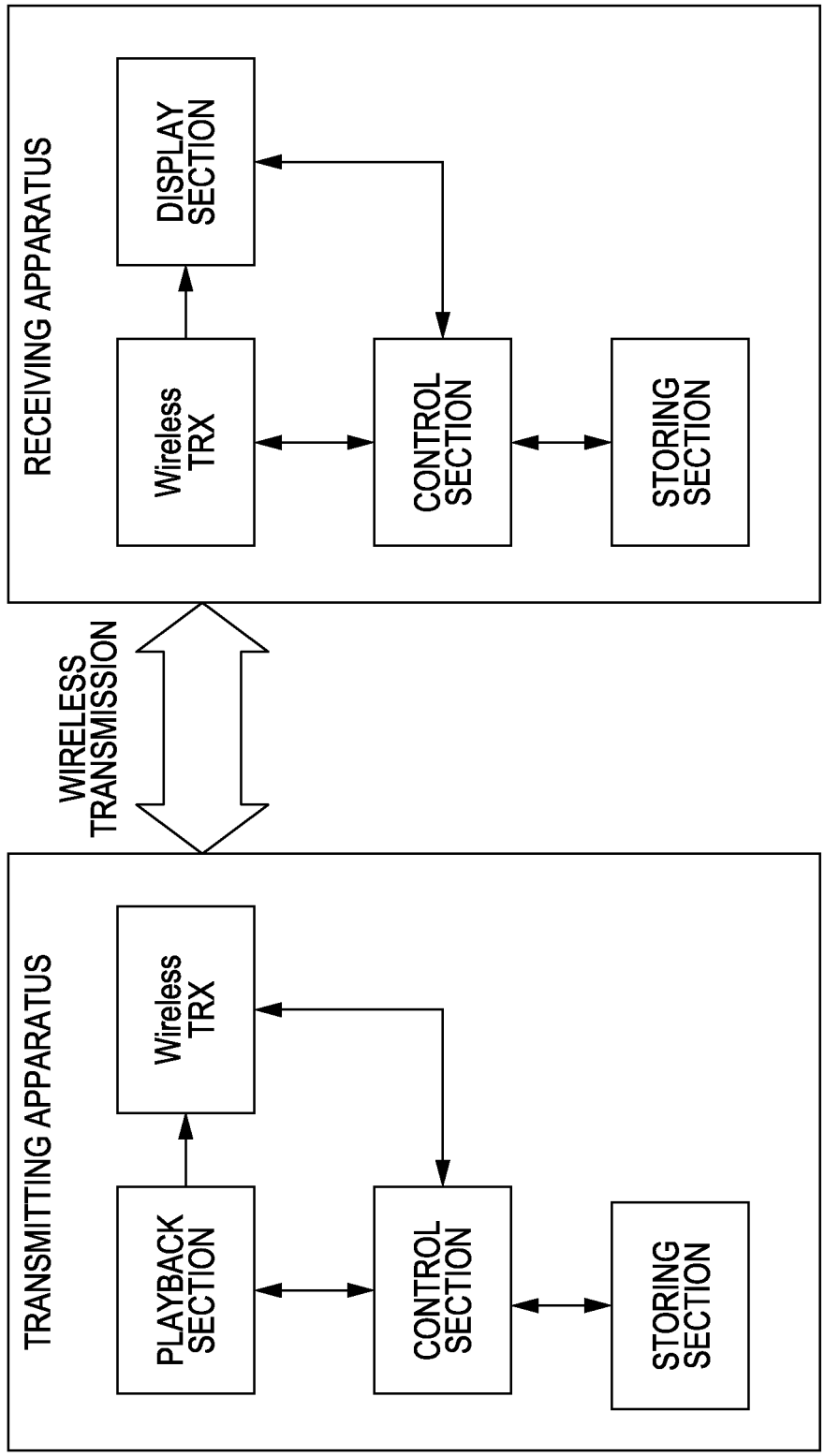
FIG. 40 is a diagram showing an example of the configuration of a wireless system using a wireless interface as a baseband digital interface.

FIG. 40 shows an example of the configuration of a wireless system using a wireless interface. The transmitting apparatus includes an image/audio data playback section, a wireless transmitting/receiving section, a storing section, and a control section that controls these. Also, the receiving apparatus includes a video/audio output section, a wireless transmitting/receiving section, a storing section, and a control section that controls these. The transmitting apparatus and the receiving apparatus are connected to each other via a wireless transmission path.

In this invention, information on 3D image/audio data transmission modes that can be supported by the receiving apparatus is stored in the storing section of the receiving apparatus, and is transmitted to the transmitting apparatus via a wireless transmission path. Also, 3D image/audio data transmission mode information from the transmitting apparatus is multiplexed with a video/audio/control signal and transmitted to the receiving apparatus via a wireless transmission path.

In the case of a cable or wireless connection, the theoretical upper-limit transmission rates on individual transmission paths (10.2 Gbps for HDMI, 3.96 Gbps for DVI, 2.16 Gbps per port or a maximum of 8.64 Gbps with four ports for DP, and 1 Gbps or 10 Gbps for Gigabit Ether/optical fiber) are specified.

However, in the case of these transmission paths, there are times when the upper-limit transmission rate is not reached due to the transmission path length, electrical characteristics of the transmission path, or the like, and the transmission rate required for transmission of the 3D image data to be transmitted by the transmitting apparatus may not be attained in some cases. At that time, it is necessary to select the transmission mode for 3D image data appropriately.

Figure 41:
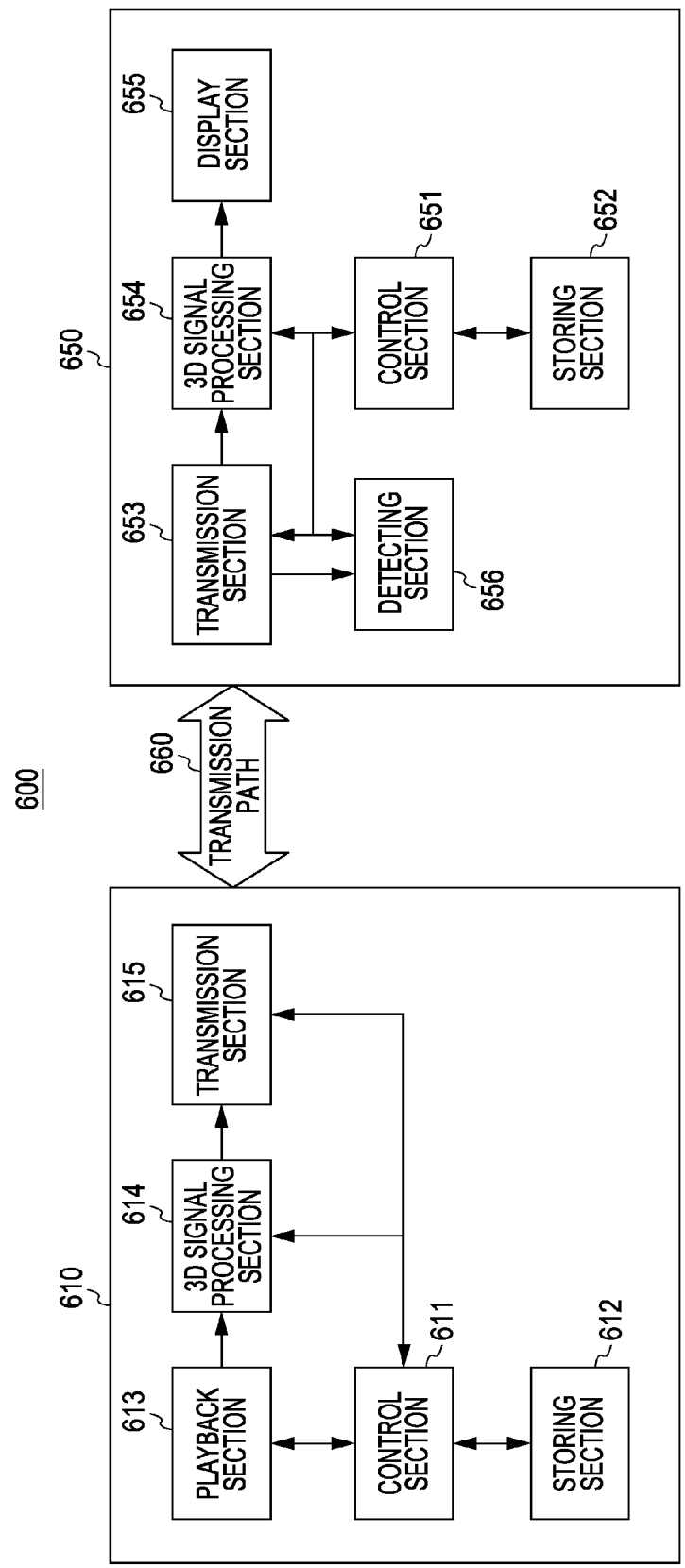
FIG. 41 is a diagram showing an example of the configuration of a transmission system that decides the transmission mode for 3D image data by checking the transmission rate of a transmission path.
Figure 42:
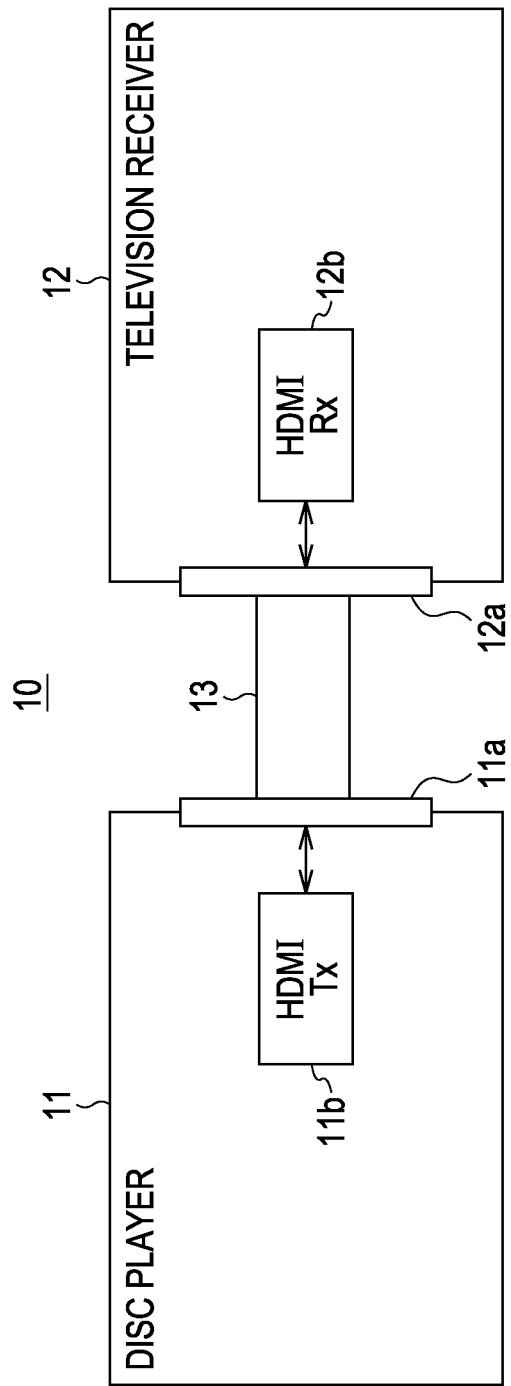
FIG. 42 is a diagram showing an example of the configuration of an AV system using an HDMI interface according to the related art.
Figure 43:
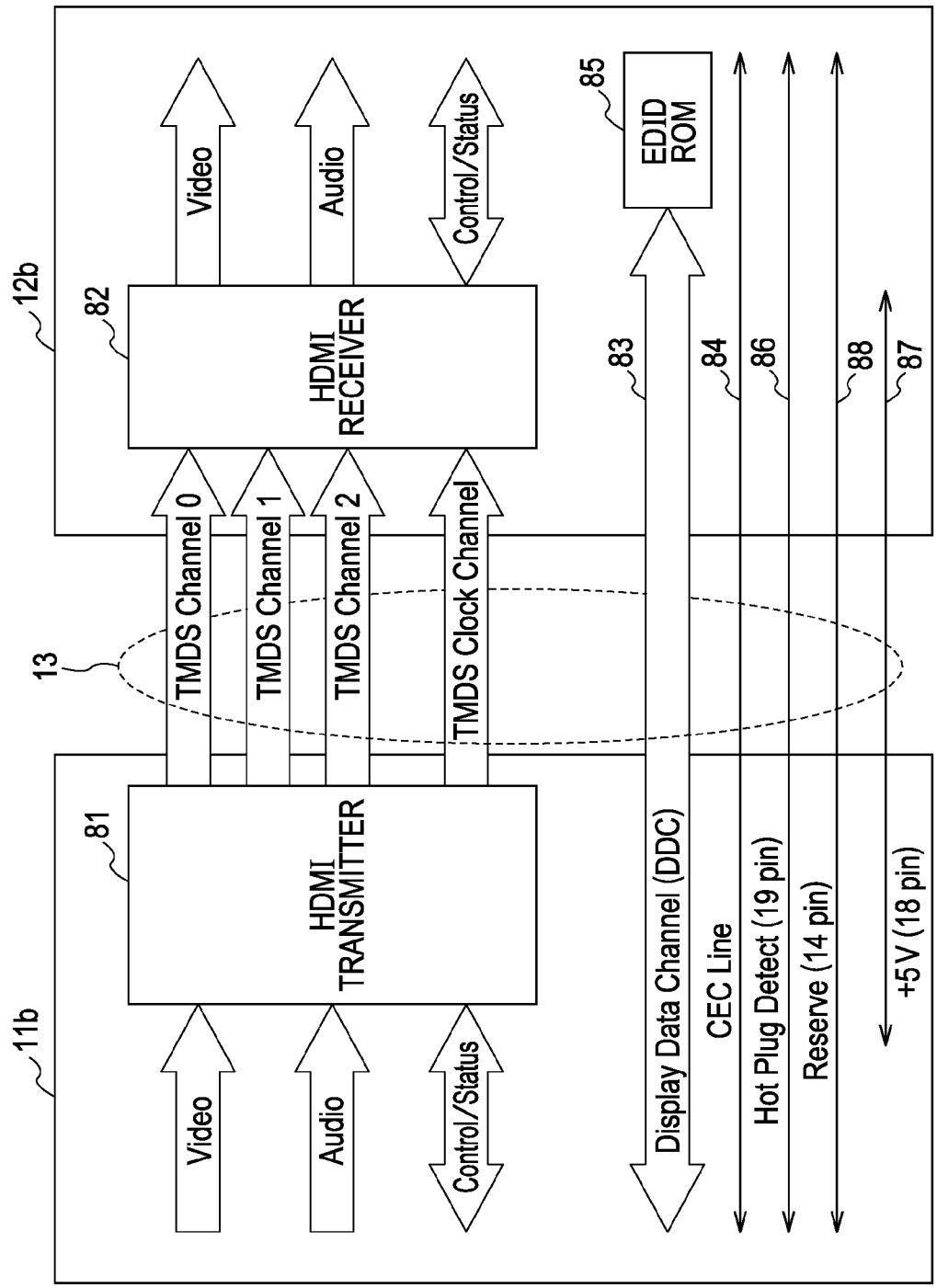
FIG. 43 is a block diagram showing an example of the configuration of the HDMI transmitting section of a disc player (source device), and the HDMI receiving section of a television receiver (sink device).
Figure 44:
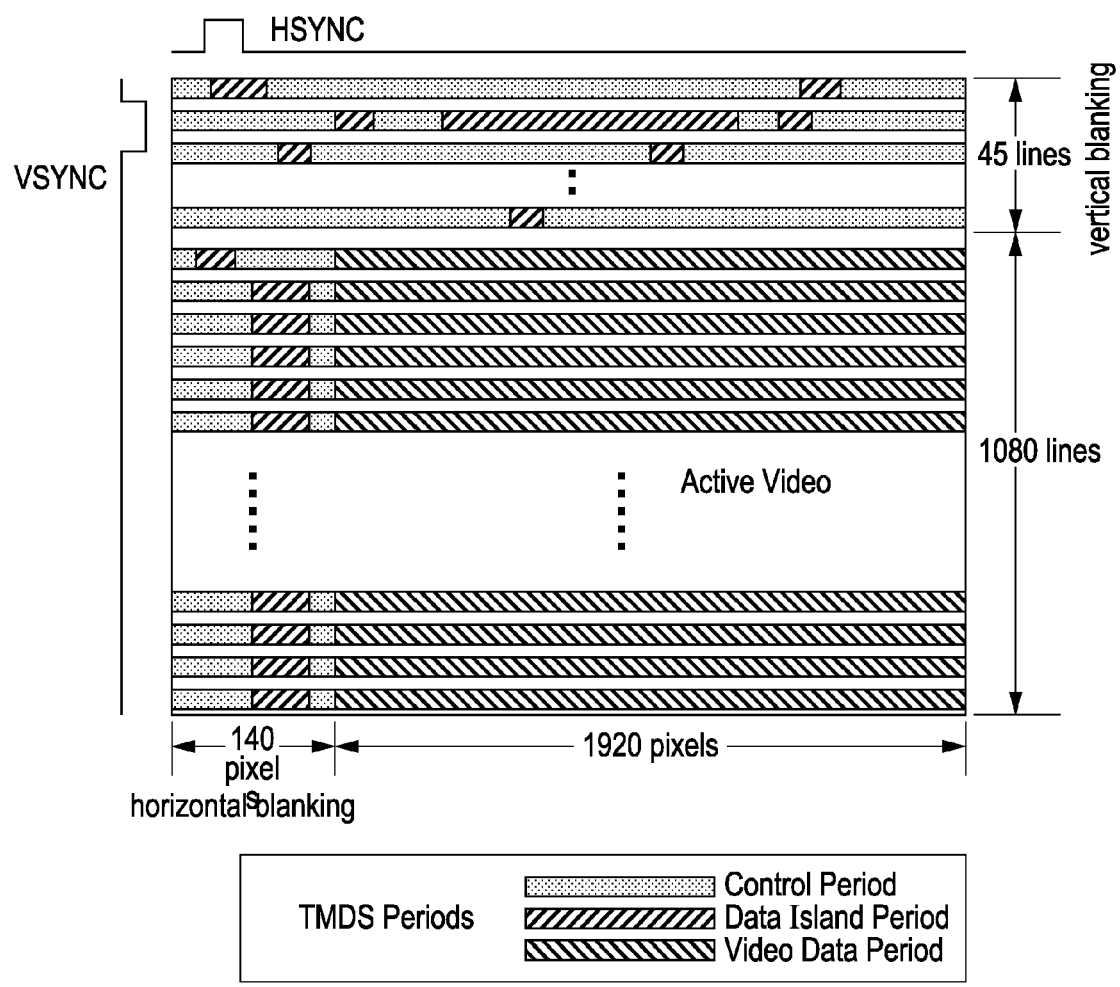
FIG. 44 is a diagram showing an example of TMDS transmission data in the case when image data in a horizontal×vertical format of 1920 pixels×1080 lines is transmitted.
Figure 45:
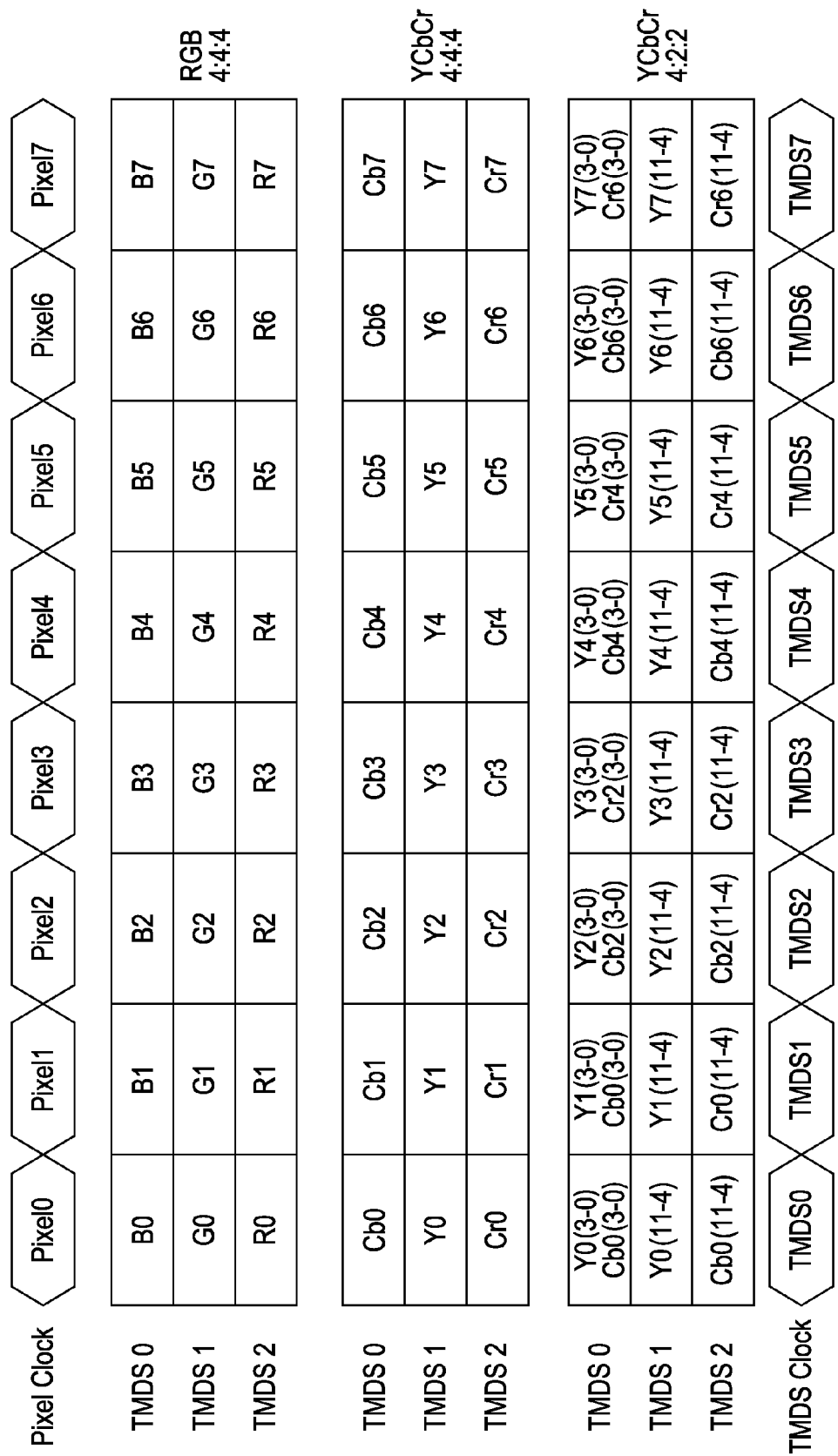
FIG. 45 is a diagram showing an example of packing format when transmitting image data (24 bits) on three TMDS channels #0, #1, and #2 of HDMI.
Figure 46:
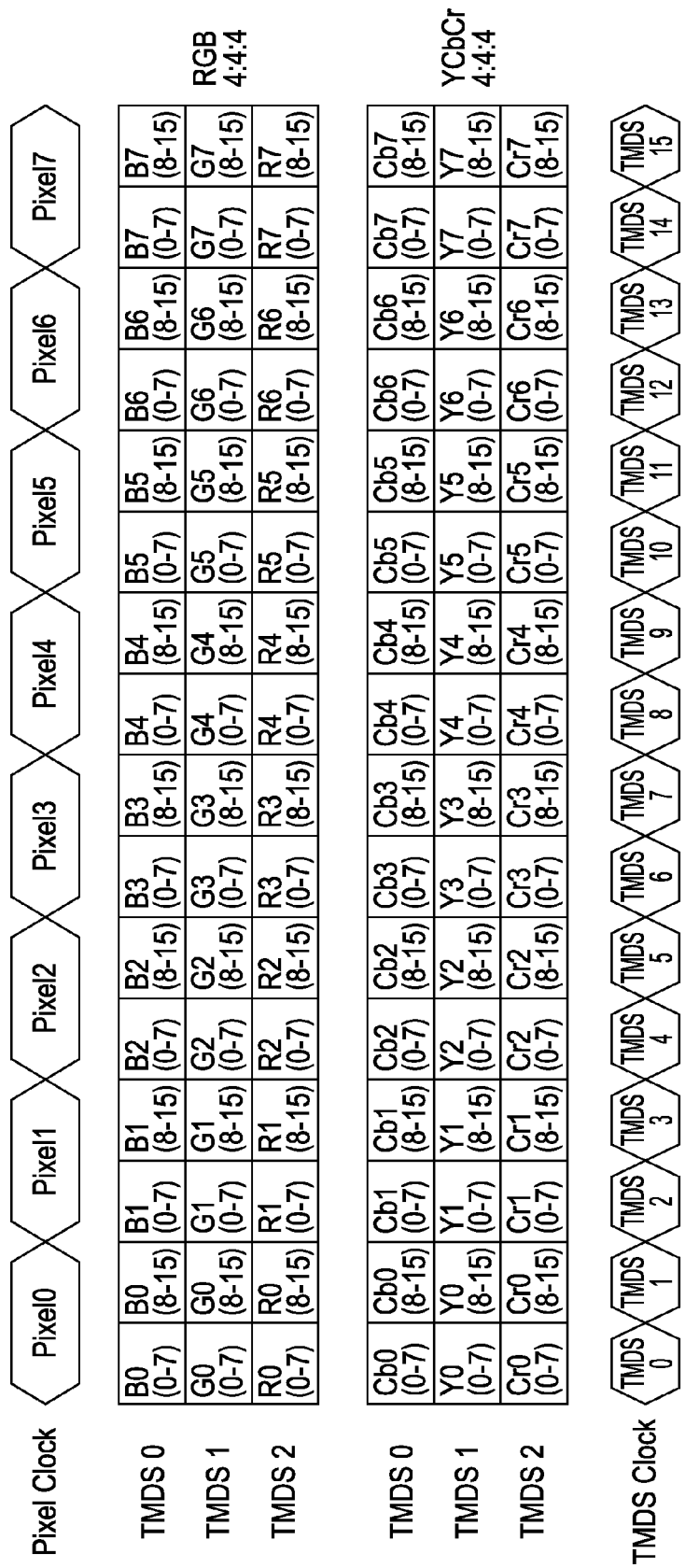
FIG. 46 is a diagram showing an example of packing format when transmitting deep color image data (48 bits) on three TMDS channels #0, #1, and #2 of HDMI.

FIG. 41 shows an example of the configuration of a transmission system 600, which decides the transmission mode for 3D image data by checking the transmission rate of a transmission path. The transmission system 600 is configured such that a transmitting apparatus 610 and a receiving apparatus 650 are connected via a transmission path 660.

The transmitting apparatus 610 has a control section 611, a storing section 612, a playback section 613, a 3D signal processing section 614, and a transmission section 615. The control section 611 controls the operations of individual sections of the transmitting apparatus 610. The playback section 613 plays back 3D image data to be transmitted, from a recording medium such as an optical disc, an HDD, or a semiconductor memory. The 3D signal processing section 614 processes the 3D image data (for example, left eye image data and right eye image data) played back by the playback section 613, into a state (see FIG. 11, FIG. 12, and FIG. 28) that conforms to a transmission mode specified from the control section 611.

The transmission section 615 transmits the 3D image data obtained by the 3D signal processing section 614 to the receiving apparatus 650. Also, the transmission section 615 transmits transmission mode information on the 3D image data to be transmitted, to the receiving apparatus 650 by using, for example, an AVI InfoFrame packet or the like. Also, the transmission section 615 receives information on 3D image data transmission modes supported by the receiving apparatus 650 and transmission rate information, which are transmitted from the receiving apparatus 650, and supplies these information to the control section 611.

The receiving apparatus 650 has a control section 651, a storing section 652, a transmission section 653, a 3D signal processing section 654, an output section 655, and a detecting section 656. The control section 611 controls the operations of individual sections of the receiving apparatus 650. Information on 3D image data transmission modes supported by the receiving apparatus 650 is stored in the storing section 652.

The transmission section 653 receives 3D image data transmitted from the transmitting apparatus 653. Also, the transmission section 653 receives 3D image data transmission mode information transmitted from the transmitting apparatus 653, and supplies the information to the control section 651. Also, the transmission section 653 transmits information on 3D image data transmission modes supported by the receiving apparatus 650, which is stored in the storing section 652, to the transmitting apparatus 610.

Also, the transmission section 653 transmits transmission rate information obtained by the control section 651 to the transmitting apparatus 610. That is, the detecting section 656 determines the status of the transmission path 660 on the basis of, for example, bit error information or the like supplied from the transmission section 653. The control section 651 judges the quality of the transmission path 660 on the basis of the result of determination by the detecting section 656, and if the transmission rate of the transmission path 660 falls below the transmission rate required for the 3D image data transmission mode notified from the transmitting apparatus 610, transmits transfer rate information to that effect to the transmitting apparatus 610 via the transmission section 653.

The 3D signal processing section 654 processes 3D image data received by the transmission section 653, and generates left eye image data and right eye image data. The control section 651 controls the operation of the 3D signal processing section 654 on the basis of 3D image data transmission mode information that is transmitted from the transmitting apparatus 610. The display section 656 displays a stereoscopic image based on the left eye image data and the right eye image data generated by the 3D signal processing section 654.

The operation of the transmission system 600 shown in FIG. 41 will be described. In the transmitting apparatus 610, 3D image data played back by the playback section 613 are (left eye image data and right eye image data, or two-dimensional image data and depth data) supplied to the 3D signal processing section 614. In the control section 611, on the basis of information on 3D image data transmission modes supported by the receiving apparatus 650, which is received from the receiving apparatus 650, a predetermined transmission mode is selected from among the transmission modes supported by the receiving apparatus 650.

In the 3D signal processing section 614, the 3D image data played back in the playback section 613 is processed into a state that conforms to the transmission mode selected in the control section 611. The 3D image data processed in the 3D signal processing section 614 is transmitted to the receiving apparatus 650 via the transmission path 660 by the transmission section 615. Also, information on the transmission mode selected in the control section 611 is transmitted to the receiving apparatus 650 from the transmission section 615.

In the receiving apparatus 650, in the transmission section 653, 3D image data transmitted from the transmitting apparatus 610 is received, and this 3D image data is supplied to the 3D signal processing section 654. Also, in the transmission section 653, transmission mode information on the 3D image data transmitted from the transmitting apparatus 610 is received, and this transmission mode information is supplied to the control section 651. In the 3D signal processing section 654, under control of the control section 651, the 3D image data received in the transmission section 653 is subjected to processing according to its transmission mode, and left eye image data and right eye image data are generated.

The left eye image data and right eye image data are supplied to the display section 655. Then, in the display section 656, a stereoscopic image based on the left eye image data and the right eye image data generated in the 3D signal processing section 654 is displayed (see FIG. 2).

Also, in the receiving apparatus 650, in the detecting section 656, the status of the transmission path 660 is determined on the basis of, for example, bit error information or the like supplied from the transmission section 653, and the result of determination is supplied to the control section 651. In the control section 651, the quality of the transmission path 660 is judged on the basis of the result of determination in the detecting section 656. Then, if the transmission rate of the transmission path 660 falls below the transmission rate required for the 3D image data transmission mode notified from the transmitting apparatus 610, transfer rate information to that effect is generated from the control section 651, and this transmission rate information is transmitted from the transmission section 653 to the transmitting apparatus 610.

In the transmitting apparatus 610, in the transmission section 650, the transmission rate information transmitted from the receiving apparatus 650 is received, and this transmission rate information is supplied to the control section 611. In the control section 611, on the basis of the transmission rate information, the selection of a 3D image data transmission mode is changed so that the transmission rate falls within the transmission rate of the transmission path 660. In the 3D signal processing section 614, 3D image data played back in the playback section 613 is processed into a state that conforms to the changed transmission mode. Then, the processed 3D image data is transmitted to the receiving apparatus 650 via the transmission path 660 by the transmission section 615. Also, information on the transmission mode changed in the control section 611 is transmitted from the transmission section 615 to the receiving apparatus 650.

In the transmission system 600 shown in FIG. 41, as described above, on the basis of transmission rate information transmitted from the receiving apparatus 650, the transmitting apparatus 610 can select a transmission mode of which the required transmission rate falls within the transmission rate of the transmission path 660, as the transmission mode for 3D image data to be transmitted. Therefore, stereo image data can be transmitted in a favorable manner at all times irrespective of a change in the status of the transmission path.

It should be noted that in the above-described case, the transmission rate information transmitted from the receiving apparatus 650 to the transmitting apparatus 610 is one indicating that the transmission rate of the transmission path 660 falls below the transmission rate required by the 3D image data transmission mode notified from the transmitting apparatus 610. However, this transmission rate information may be one indicating the transmission rate of the transmission path 660.

Also, in the above-described case, if the transmission rate of the transmission path 660 falls below the transmission rate required by the 3D image data transmission mode notified from the transmitting apparatus 610, transmission rate information to that effect is transmitted from the receiving apparatus 650 to the transmitting apparatus 610. However, the following configuration is also possible. That is, in that case, of the E-EDID stored in the storing section 652, information on 3D image data transmission modes that can be supported by the receiving apparatus 650 is rewritten so that only transmission modes falling within the transmission rate of the transmission path 660 are valid.

In this case, the receiving apparatus 650 needs to notify the transmitting apparatus 610 of the change to the E-EDID. For example, in the case where the transmission path 660 is an HDMI interface, the HPD signal is temporarily controlled to "L", and the transmitting apparatus 610 is controlled to read the E-EDID again.

It should be noted that the above-described embodiment is directed to the case in which left eye image data and right eye image data, or two-dimensional image data and depth data which constitute 3D image data are processed and then transmitted on TMDS channels of HDMI. However, it is also conceivable to transmit two kinds of data constituting 3D image data via separate transmission paths.

For example, in the case where 3D image data is formed by left eye image data and right eye image data, one of these may be transmitted on TMDS channels, and the other may be transmitted via a bidirectional communication path formed by predetermined lines (reserved line and HPD line in this embodiment) of the HDMI cable 350. Also, for example, in the case where 3D image data is formed by two-dimensional image data and depth data, the two-dimensional data may be transmitted on TMDS channels, and the depth data may be transmitted via a bidirectional communication path formed by predetermined lines (reserved line and HPD line in this embodiment) of the HDMI cable 350, or during the Data Island period of HDMI.

Also, the above-described embodiment is directed to the case in which the disc player 210 is used as the transmitting apparatus (source device), and the television receiver 250 is used as the receiving apparatus (sink device). However, this invention can be applied similarly to cases in which other types of transmitting apparatus and receiving apparatus are used.

INDUSTRIAL APPLICABILITY

This invention aims to transmit 3D image data in a favorable manner from a transmitting apparatus to a receiving apparatus by a transmission mode selected on the basis of information on 3D image data transmission modes supported by the receiving apparatus, and can be applied to, for example, a 3D image data transmission system formed by a transmitting apparatus and a receiving apparatus that are of different manufactures.

EXPLANATION OF REFERENCE NUMERALS

200 AV system, 210 disc player, 211 HDMI terminal, 212 HDMI transmitting section, 213 high-speed data line interface, 214 CPU, 215 CPU bus, 216 SDRAM, 217 flash ROM, 218 remote control receiving section, 219 remote control transmitter, 220 IED interface, 221 BD drive, 222 internal bus, 223 Ethernet interface, 224 network terminal, 225 MPEG decoder, 226 graphics generating circuit, 227 video output terminal, 228 audio output terminal, 229 3D signal processing section, 230 DTCP circuit, 250 television receiver, 251 HDMI terminal, 252 HDMI receiving section, 253 high-speed data line interface, 254 3D signal processing section, 255 antenna terminal, 256 digital tuner, 257 demultiplexer, 258 MPEG decoder, 259 video signal processing circuit, 260 graphics generating circuit, 261 panel driver circuit, 262 display panel, 263 audio signal processing circuit, 264 audio amplifier circuit, 265 loudspeaker, 170 internal bus, 271 CPU, 272 flash ROM, 273 DRAM, 274 Ethernet interface, 275 network terminal, 276 remote control receiving section, 277 remote control transmitter, 278 DTCP circuit, 350 HDMI cable, 600 transmission system, 610 transmitting apparatus, 611 control section, 612 storing section, 613 playback section, 614 3D signal processing section, 615 transmission section, 650 receiving apparatus, 651 control section, 652 storing section, 653 transmission section, 654 3D signal processing section, 655 display section, 656 detecting section

The invention claimed is:

1. A system comprising:

a transmitting apparatus and a receiving apparatus, wherein the transmitting apparatus includes a first processor configured to control:

a data transmitting section that transmits stereo image data for displaying a stereoscopic image, to the receiving apparatus via a transmission path, a transmission-mode-information receiving section that receives transmission mode information transmitted from the receiving apparatus via the transmission path, the transmission mode information indicating transmission modes for stereo image data that can be supported by the receiving apparatus, a transmission mode selecting section that selects a transmission mode as a transmission mode for the stereo image data transmitted by the data transmitting section, from among the transmission modes for stereo image data that can be supported by the receiving apparatus, on the basis of the transmission mode information received by the transmission-mode-information receiving section, and a transmission-mode-information transmitting section that transmits the selected transmission mode for stereo image data with the stereo image data transmitted by the data transmitting section, to the receiving apparatus via the transmission path, and wherein the data transmitting section transmits the stereo image data to the receiving apparatus by a plurality of channels that are in the transmission path, and inserts the selected transmission mode in a blanking period of the stereo image data, wherein the receiving apparatus includes a second processor configured to control:

a data receiving section that receives the stereo image data from the transmitting apparatus via the transmission path;

a transmission-mode-information transmitting section that transmits the transmission mode information to the transmitting apparatus device via the transmission path, and a transmission mode receiving section that receives the selected transmission mode transmitted by the transmitting apparatus via the transmission path.

* * * * *